(12) United States Patent
Lemens et al.

(10) Patent No.: US 7,771,553 B2
(45) Date of Patent: *Aug. 10, 2010

(54) PROCESSING APPARATUS

(75) Inventors: Paul J. Lemens, Scottsdale, AZ (US);
Christopher A. Holman, Mesa, AZ (US); Adam J. Becker, Cave Creek, AZ (US); Andrew Goodfellow, Phoenix, AZ (US)

(73) Assignee: Esselte Corporation, Melville, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 11/970,759

(22) Filed: Jan. 8, 2008

(65) Prior Publication Data
US 2008/0099123 A1    May 1, 2008

Related U.S. Application Data

(63) Continuation of application No. 11/261,933, filed on Oct. 31, 2005, now Pat. No. 7,338,572.

(60) Provisional application No. 60/623,236, filed on Nov. 1, 2004.

(51) Int. Cl.
*B32B 37/00* (2006.01)

(52) U.S. Cl. .................... 156/227; 156/256; 156/442.1; 156/442.2; 156/443; 156/510; 156/555

(58) Field of Classification Search ............... 156/217, 156/227, 250, 256, 269, 290, 350, 441.5, 156/442.1, 442.2, 442.3, 443, 510, 522, 555, 156/582; 493/216, 405, 416
See application file for complete search history.

(56) References Cited

U.S. PATENT DOCUMENTS

| | | |
|---|---|---|
| 3,750,511 A | 8/1973 | Toensing |
| 3,850,775 A | 11/1974 | Bruneau et al. |
| 3,879,246 A | 4/1975 | Walker |
| 4,114,491 A | 9/1978 | Hashimoto et al. |
| 4,158,587 A | 6/1979 | Keller et al. |
| 4,233,104 A | 11/1980 | Fujishima et al. |
| 4,340,441 A | 7/1982 | Thwaites et al. |
| 4,464,221 A | 8/1984 | Garber |
| 4,545,838 A | 10/1985 | Minkus et al. |
| 4,593,589 A | 6/1986 | Gherardi |
| 4,949,606 A | 8/1990 | Pfeiffer |
| 5,001,953 A | 3/1991 | Pfeiffer |
| 5,029,429 A | 7/1991 | Noma et al. |
| 5,088,370 A | 2/1992 | Kondo |
| 5,421,947 A | 6/1995 | Green |
| 5,480,509 A | 1/1996 | Matsuo et al. |
| 5,639,335 A | 6/1997 | Achilles et al. |
| 5,662,976 A | 9/1997 | Popat et al. |
| 5,735,997 A | 4/1998 | Reinders |

(Continued)

FOREIGN PATENT DOCUMENTS

EP    0783940 A2    7/1997

(Continued)

*Primary Examiner*—James Sells
(74) *Attorney, Agent, or Firm*—Pillsbury Winthrop Shaw Pittman LLP

(57) ABSTRACT

The present invention relates to a processing apparatus, such as a laminator, for performing operations involving effecting adhesive bonding on substrates.

44 Claims, 58 Drawing Sheets

U.S. PATENT DOCUMENTS

| | | | |
|---|---|---|---|
| 5,788,806 | A | 8/1998 | Bradshaw et al. |
| 5,853,531 | A | 12/1998 | Murphy et al. |
| 6,080,251 | A | 6/2000 | Baker |
| 6,080,259 | A | 6/2000 | Nadeau |
| 6,086,698 | A | 7/2000 | Spitler |
| 6,148,708 | A | 11/2000 | Pfeiffer |
| 6,149,752 | A | 11/2000 | Matthews |
| 6,156,147 | A | 12/2000 | Spitler |
| 6,162,316 | A | 12/2000 | Spitler |
| 6,244,322 | B1 | 6/2001 | Paque |
| 6,264,296 | B1 | 7/2001 | Klinefelter et al. |
| 6,270,612 | B1 | 8/2001 | Bradshaw |
| RE37,345 | E | 9/2001 | Bradshaw et al. |
| 6,294,033 | B1 | 9/2001 | Fukuoka et al. |
| 6,315,020 | B1 | 11/2001 | Seki |
| 6,422,281 | B1 | 7/2002 | Ensign, Jr. et al. |
| 6,427,744 | B2 | 8/2002 | Seki et al. |
| 6,523,592 | B2 | 2/2003 | Kuki |
| 6,578,618 | B2 | 6/2003 | Ito et al. |
| 6,651,537 | B1 | 11/2003 | Pfeiffer |
| 6,672,354 | B2 | 1/2004 | Lemens et al. |
| 6,675,854 | B2 | 1/2004 | Worth |
| 6,698,487 | B2 | 3/2004 | Lemens et al. |
| 6,722,649 | B2 | 4/2004 | Yui |
| 6,742,428 | B2 | 6/2004 | Lemens et al. |
| 6,772,663 | B2 | 8/2004 | MacHamer |
| 6,781,339 | B1 | 8/2004 | Ikeguchi |
| 7,175,738 | B2 | 2/2007 | Lindsay |
| 7,338,572 | B2 * | 3/2008 | Lemens et al. .............. 156/227 |
| 2004/0055435 | A1 | 3/2004 | Hayashi et al. |

FOREIGN PATENT DOCUMENTS

| | | |
|---|---|---|
| EP | 0783940 A3 | 10/1997 |
| JP | 2002028978 | 1/2002 |

* cited by examiner

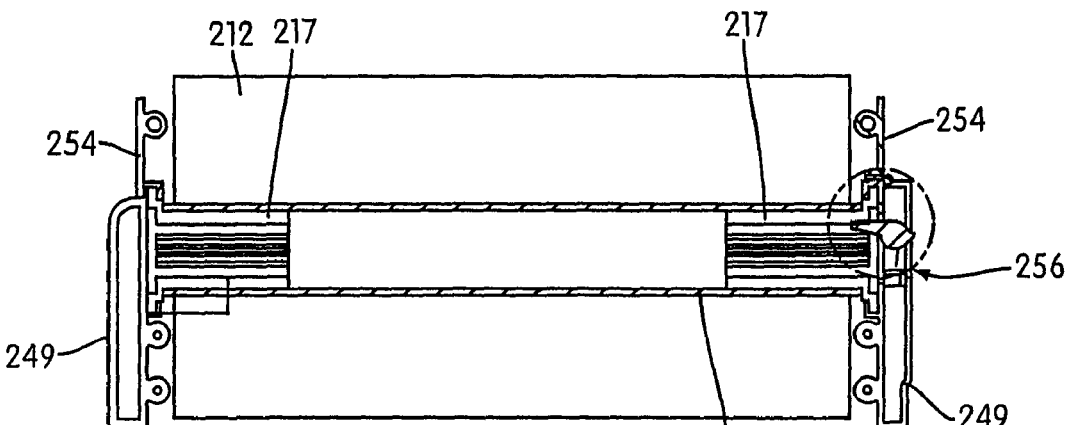
FIG. 42
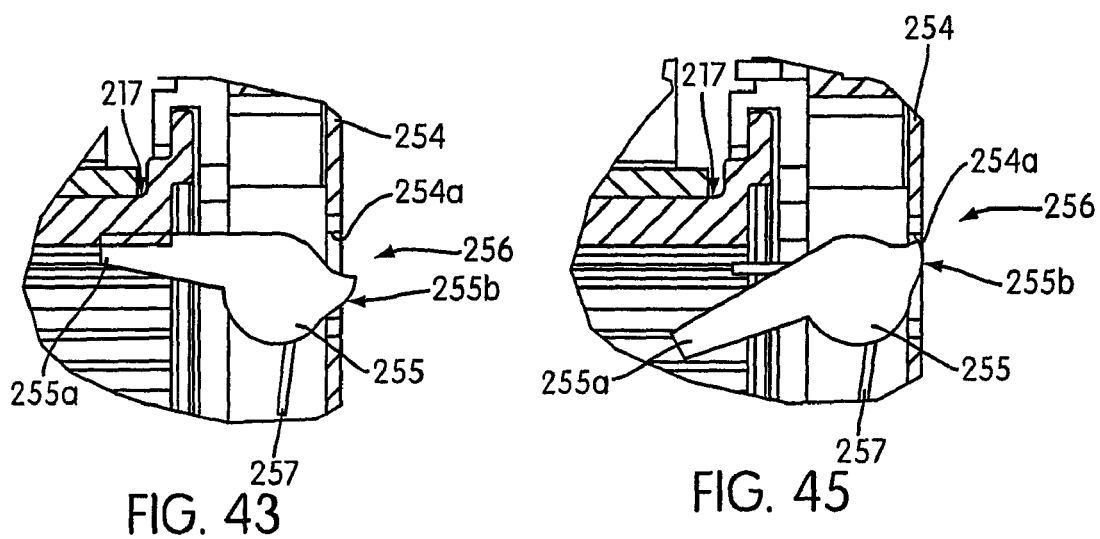
FIG. 43
FIG. 45
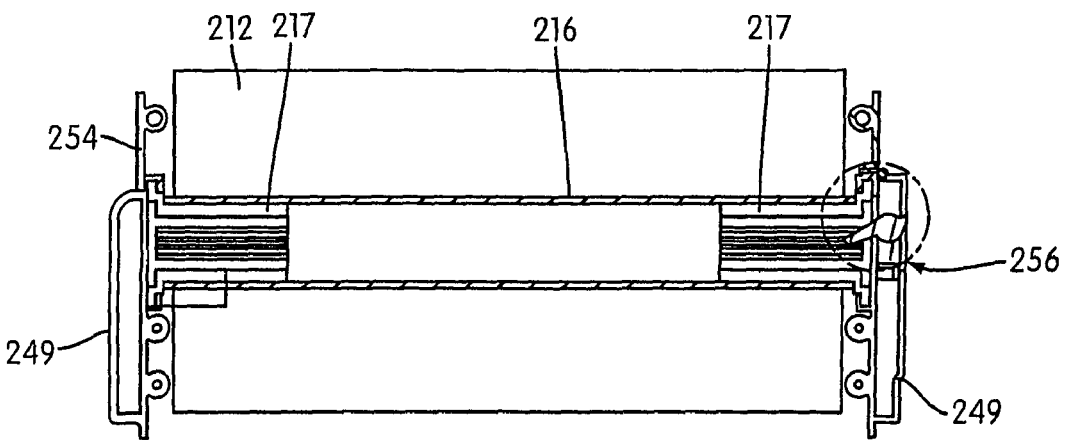
FIG. 44

PROCESSING APPARATUS

CROSS-REFERENCE TO RELATED APPLICATIONS

This application is a continuation application of U.S. patent application Ser. No. 11/261,933, filed Oct. 31, 2005, now U.S. Pat. No. 7,338,572, which further claims the benefit of priority from U.S. provisional patent application Ser. No. 60/623,236, filed Nov. 1, 2004. The contents of both of these application are incorporated herein by reference in their entirety.

BACKGROUND OF THE INVENTION

1. Field of the Invention

The present invention relates to a processing apparatus, such as a laminator, for performing operations involving effecting adhesive bonding on substrates.

2. Description of Related Art

The present invention relates to various improvements over known processing apparatus, such as laminators, adhesive transfer devices, magnet makers, and other such apparatus in which adhesive bonding is effected between substrates.

Known examples of such processing apparatus are disclosed, for example, in U.S. Pat. Nos. 6,270,612, RE37,345, 6,244,322, 6,422,281, 6,672,354, 6,675,854, 6,698,487, and 6,742,428.

BRIEF SUMMARY OF THE INVENTION

It is an aspect of the invention to provide an improved laminator in which stock material from a supply is folded over both opposing sides of a substrate. One aspect of the invention provides a laminator system for laminating opposing sides of a document. The laminator system includes a frame, a laminator unit provided on the frame, a pair of cooperating structures operable to feed substrates into the laminator unit, and a supply of stock material provided on the frame. The stock material has adhesive provided on an adhesive carrying surface thereof. A feeder system is operable to feed a selected length of the stock material from the supply in a feeding direction so that a leading portion of the selected length passes beyond the pair of cooperating structures and a trailing portion of the selected length extends from the pair of cooperating structures towards the supply with an intermediate portion of the selected length between the leading and trailing portions positioned adjacent the cooperating structures. The supply of stock material is oriented such that the adhesive carrying surface at the intermediate portion faces generally away from the cooperating structures. The pair of cooperating structures are oriented transversely with respect to the feeding direction. The laminator system includes a folder member that is movable between (a) a disengaged position enabling the stock material to pass beyond the pair of cooperating structures in the feeding direction, and (b) an engaged position urging the intermediate portion in between the cooperating structures in a transversely folded relation. This enables a lead end of the document to be received in the folded intermediate portion so that the cooperating structures can feed the document with the leading and trailing portions of the selected length on opposing sides thereof into the laminator unit. A cutter is positioned between the supply and the pair of cooperating structures in the feeding direction. The cutter is operable to cut the stock material transversely with respect to the feeding direction to cut the selected length of the stock material from a remainder of the stock material. The laminator unit is operable to activate the adhesive as the document and the leading and trailing portions of the selected length of the stock material are advanced therethrough, thereby bonding the leading and trailing portions to the opposing sides of the document.

It is another aspect of the invention to provide an improved cartridge for use in a document processing apparatus. The processing apparatus includes a frame constructed to receive the cartridge, a document processing unit provided on the frame for performing a processing operation wherein adhesive bonding is effected, a controller adapted to receive data and perform one or more operations based on the received data, and a data input for transmitting data to the controller. The cartridge includes a cartridge body constructed to be received in an operative position on the frame, and a supply of stock material received in the cartridge body. The stock material has adhesive provided on an adhesive carrying surface thereof. The cartridge includes a machine readable non-volatile memory containing stock material data relating to at least one characteristic of the supply of the stock material. The memory has a data output adapted to establish communication with the data input for enabling the stock material data to be transmitted to the controller for use by the controller.

This cartridge may have more than one supply of stock material, and thus this aspect of the invention is not limited to the particular type of system illustrated. For example, the cartridge may have two rolls of stock material, such as is disclosed in the patents mentioned above in the Background section. Also, the supplies need not be for laminating, and may be for other document processing operations, such as adhesive transfer and magnet making, as is discussed in the patents mentioned above in the Background section.

It is another aspect to provide a laminator system for laminating opposing sides of a document. The laminator system includes a frame; a laminator unit provided on the frame; a pair of cooperating structures operable to feed substrates into the laminator unit; and a cartridge tray movably received by the frame. The cartridge tray is movable between an open position and a closed position. The system also includes a cartridge that includes a cartridge body and a supply of stock material having adhesive provided on an adhesive carrying surface thereof. The cartridge tray is configured to receive the cartridge when the cartridge tray is in the open position, and position the cartridge into an operative position when the cartridge tray is in the closed position. The system further includes a feeder system operable to feed a selected length of the stock material from the cartridge in its operative position in a feeding direction so that a leading portion of the selected length passes beyond the pair of cooperating structures and a trailing portion of the selected length extends from the pair of cooperating structures towards the cartridge with an intermediate portion of the selected length between the leading and trailing portions positioned adjacent the cooperating structures. The stock material is oriented such that the adhesive carrying surface at the intermediate portion faces generally away from the cooperating structures. The pair of cooperating structures are oriented transversely with respect to the feeding direction to receive the intermediate portion of the selected length in a transversely folded relation and to receive a lead end of the document in the folded intermediate portion so that the cooperating structures can feed the document with the leading and trailing portions of the selected length on opposing sides thereof into the laminator unit. A cutter is positioned between the cartridge and the pair of cooperating structures in the feeding direction. The cutter is operable to cut the stock material transversely with respect to the feeding direction to cut the selected length of the stock material from a remainder of the stock material.

According to another aspect of the invention, the cartridge includes a cartridge body constructed to be received in an operative position on the frame; and a supply of stock material wound on a core. The core is rotatably received by the cartridge body. The stock material has adhesive provided on an adhesive carrying surface thereof. The cartridge also includes a supply brake having an engaged position wherein the brake resists rotation of the core, the supply brake being movable to a disengaged position to permit rotation of the core by a brake deactivator provided on the processing apparatus.

A cartridge for use in a document processing apparatus is provided in another aspect of the invention. The cartridge includes a cartridge body constructed to be received in an operative position on the frame; and a supply of stock material wound on a core, the core being rotatably received by the cartridge body. The stock material has adhesive provided on an adhesive carrying surface thereof. The cartridge also includes a lead end brake having an engaged position wherein the lead end brake resists retraction of a lead end of the supply into the cartridge body. The lead end brake is movable to a disengaged position to permit movement of the lead end of the supply by a brake deactivator provided on the frame.

According to another aspect of the invention, the laminating system includes a frame; a laminator unit provided on the frame; a pair of cooperating structures operable to feed substrates into the laminator unit; and a cartridge that includes (a) a cartridge body, (b) a supply of stock material wound on a core, the core being rotatably received by the cartridge body, the stock material having adhesive provided on an adhesive carrying surface thereof, and (c) a brake. The brake is selected from the group consisting of (1) a supply brake having an engaged position wherein the supply brake resists rotation of the core, the supply brake being movable to a disengaged position permitting rotation of the core, and (2) a lead end brake having an engaged position wherein the lead end brake resists retraction of a lead end of the supply. The system also includes a feeder system operable to feed a selected length of the stock material from the cartridge in an operative position in a feeding direction so that a leading portion of the selected length passes beyond the pair of cooperating structures and a trailing portion of the selected length extends from the pair of cooperating structures towards the cartridge with an intermediate portion of the selected length between the leading and trailing portions positioned adjacent the cooperating structures. The stock material is oriented such that the adhesive carrying surface at the intermediate portion faces generally away from the cooperating structures. The pair of cooperating structures are oriented transversely with respect to the feeding direction to receive the intermediate portion of the selected length in a transversely folded relation and to receive a lead end of the document in the folded intermediate portion so that the cooperating structures can feed the document with the leading and trailing portions of the selected length on opposing sides thereof into the laminator unit. A cutter is positioned between the supply and the pair of cooperating structures in the feeding direction. The cutter is operable to cut the stock material transversely with respect to the feeding direction to cut the selected length of the stock material from a remainder of the stock material. A brake deactivator is located on the frame. The brake deactivator is configured to engage the cartridge and deactivate the brake located on the cartridge when the cartridge is in the operative position.

According to another aspect of the invention, a processing apparatus for laminating opposing sides of a document with a supply of stock material having adhesive provided on an adhesive carrying surface thereof is provided. The supply of stock material is wound on a core and carried by a cartridge. The apparatus includes a frame; a laminator unit provided on the frame; a pair of cooperating structures operable to feed substrates into the laminator unit; and a feeder system operable to feed a selected length of the stock material from the cartridge in an operative position in a feeding direction so that a leading portion of the selected length passes beyond the pair of cooperating structures and a trailing portion of the selected length extends from the pair of cooperating structures towards the cartridge with an intermediate portion of the selected length between the leading and trailing portions positioned adjacent the cooperating structures. The stock material is oriented such that the adhesive carrying surface at the intermediate portion faces generally away from the cooperating structures. The pair of cooperating structures are oriented transversely with respect to the feeding direction to receive the intermediate portion of the selected length in a transversely folded relation and to receive a lead end of the document in the folded intermediate portion so that the cooperating structures can feed the document with the leading and trailing portions of the selected length on opposing sides thereof into the laminator unit. A cutter is positioned between the supply and the pair of cooperating structures in the feeding direction. The cutter is operable to cut the stock material transversely with respect to the feeding direction to cut the selected length of the stock material from a remainder of the stock material. A brake deactivator is located on the frame. The brake deactivator is configured to engage the cartridge and deactivate a brake located on the cartridge when the cartridge is in the operative position. The brake is selected from the group consisting of (1) a supply brake having an engaged position wherein the supply brake resists rotation of the core, the supply brake being movable to a disengaged position permitting rotation of the core, and (2) a lead end brake having an engaged position wherein the lead end brake resists retraction of a lead end of the supply.

According to an aspect of the invention, a processing apparatus for laminating opposing sides of a document with a supply of stock material having adhesive provided on an adhesive carrying surface thereof is provided. The apparatus includes a frame; a laminator unit provided on the frame; a pair of cooperating structures operable to feed substrates into the laminator unit; and a feeder system operable to feed a selected length of the stock material in a feeding direction so that a leading portion of the selected length passes beyond the pair of cooperating structures and a trailing portion of the selected length extends from the pair of cooperating structures towards the cartridge with an intermediate portion of the selected length between the leading and trailing portions positioned adjacent the cooperating structures. The stock material is oriented such that the adhesive carrying surface at the intermediate portion faces generally away from the cooperating structures. The pair of cooperating structures are oriented transversely with respect to the feeding direction to receive the intermediate portion of the selected length in a transversely folded relation and to receive a lead end of the document in the folded intermediate portion so that the cooperating structures can feed the document with the leading and trailing portions of the selected length on opposing sides thereof into the laminator unit. A cutter is positioned between the supply and the pair of cooperating structures in the feeding direction. The cutter is operable to cut the stock material transversely with respect to the feeding direction to cut the selected length of the stock material from a remainder of the stock material. A clamp is located on the frame and is movable between an engaging position and a non-engaging position. When the clamp is in the engaging position, the clamp engages a lead end of the supply.

According to an aspect of the invention, a laminator system for laminating opposing sides of a document is provided. The system includes a frame; a laminator unit provided on the frame; a pair of cooperating structures operable to feed substrates into the laminator unit; and a supply of stock material provided on the frame. The stock material has adhesive provided on an adhesive carrying surface thereof. The system also includes a feeder system operable to feed a selected length of the stock material from the supply in a feeding direction so that a leading portion of the selected length passes beyond the pair of cooperating structures and a trailing portion of the selected length extends from the pair of cooperating structures towards the supply with an intermediate portion of the selected length between the leading and trailing portions positioned adjacent the cooperating structures. The supply of stock material is oriented such that the adhesive carrying surface at the intermediate portion faces generally away from the cooperating structures. The pair of cooperating structures are oriented transversely with respect to the feeding direction. The system also includes a folder member that is movable between (a) a disengaged position enabling the stock material to pass beyond the pair of cooperating structures in the feeding direction, and (b) an engaged position urging the intermediate portion in between the cooperating structures in a transversely folded relation, thereby enabling a lead end of the document to be received in the folded intermediate portion so that the cooperating structures can feed the document with the leading and trailing portions of the selected length on opposing sides thereof into the laminator unit. A fence is positioned between the folder member and the cooperating structures. The fence is movable between (a) a closed position preventing the stock material from being engaged by the cooperating structures, and (b) an open position enabling the stock material to be engaged by the cooperating structures. A cutter is positioned between the supply and the pair of cooperating structures in the feeding direction. The cutter is operable to cut the stock material transversely with respect to the feeding direction to cut the selected length of the stock material from a remainder of the stock material. The laminator unit is operable to activate the adhesive as the document and the leading and trailing portions of the selected length of the stock material are advanced therethrough, thereby bonding the leading and trailing portions to the opposing sides of the document.

According to an aspect of the invention, a method for laminating a document is provided. The method includes providing a laminator system that includes (i) a frame; (ii) a laminator unit provided on the frame; (iii) a pair of cooperating structures operable to feed substrates into the laminator unit; (iv) a supply of stock material provided on the frame, the stock material having adhesive provided on an adhesive carrying surface thereof; (v) a feeder system operable to feed the stock material from the supply in a feeding direction; and (vi) a cutter positioned between the supply and the pair of cooperating structures in the feeding direction. The method also includes feeding a selected length of the stock material with the feeder system from the supply in the feeding direction so that a leading portion of the selected length passes beyond the pair of cooperating structures and a trailing portion of the selected length extends from the pair of cooperating structures towards the supply with an intermediate portion of the selected length between the leading and trailing portions positioned adjacent the cooperating structures. The supply of stock material is oriented such that the adhesive carrying surface at the intermediate portion faces generally away from the cooperating structures. The method further includes positioning a lead end of the document into the intermediate portion; feeding the document using the pair of cooperating structures with the leading and trailing portions of the selected length on opposing sides thereof into the laminator unit; feeding a remaining part of the trailing portion at a rate faster than said feeding the selected length of the stock material to create slack in the trailing portion; cutting the stock material with the cutter transversely with respect to the feeding direction to cut the selected length from the remainder of the stock material; and advancing the document and the leading and trailing portions of the selected length through the laminator unit and activating the adhesive with the laminator unit, thereby bonding the leading and trailing portions to the opposing sides of the document. The cutting and advancing are performed simultaneously while there is slack in the trailing portion.

Yet another aspect of the invention provides a cartridge tray for a laminator system. The tray includes a base, and a pair of sidewalls on opposite sides of the base. At least a portion of the sidewalls are movable between a first position and a second position, such that (1) when the sidewalls are in the first position, a cartridge of a first size is substantially centered in the cartridge tray by the sidewalls, and (2) when the sidewalls are in the second position, a cartridge of a second size that is different from the first size is substantially centered in the cartridge tray by the side walls.

These and other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings:

FIG. 42 is a cross-sectional view of the cartridge of FIG. 41 along line 42-42 with a supply brake in an engaged position;

FIG. 43 is an enlarged view of a portion of FIG. 42;

FIG. 44 is the cross-sectional view of FIG. 42 with the supply brake in a disengaged position;

FIG. 45 is an enlarged view of a portion of FIG. 44;

DETAILED DESCRIPTION OF EMBODIMENTS OF THE INVENTION

FIGS. 1-11 illustrate an embodiment of a document processing apparatus 10 for performing a processing operation on a selected document. The selected document or master may be any type of substrate desired to be processed, including, but not limited to, photographs, brochures, transparencies, articles, drawings, computer printouts, etc. In the illustrated embodiment, the document processing apparatus 10 is in the form of a laminator for laminating opposing sides of a document. However, it is contemplated that other variations of processing operations may be performed with the processing apparatus 10.

Figure 16:
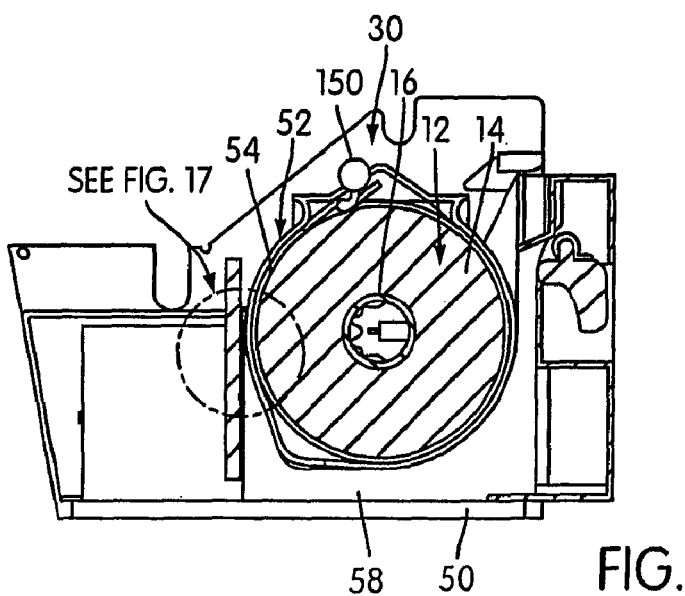
FIG. 16 a cross-sectional view through line 16-16 of FIG. 15.

As explained below, the laminator 10 is constructed for use with a single feed roll 12 which carries a supply of stock material 14 that is wound around a central core 16 (see FIGS. 11 and 16). The stock material 14 has an adhesive provided on an adhesive carrying surface 18 (see FIGS. 24 and 25) thereof. The supply of stock material 14 and the laminator 10 can together be referred to as a laminator system 20. In use, the laminator 10 is operable to unwind the supply of stock material 14 on the feed roll 12 and apply the stock material 14 to opposing sides of the document.

Figure 1:
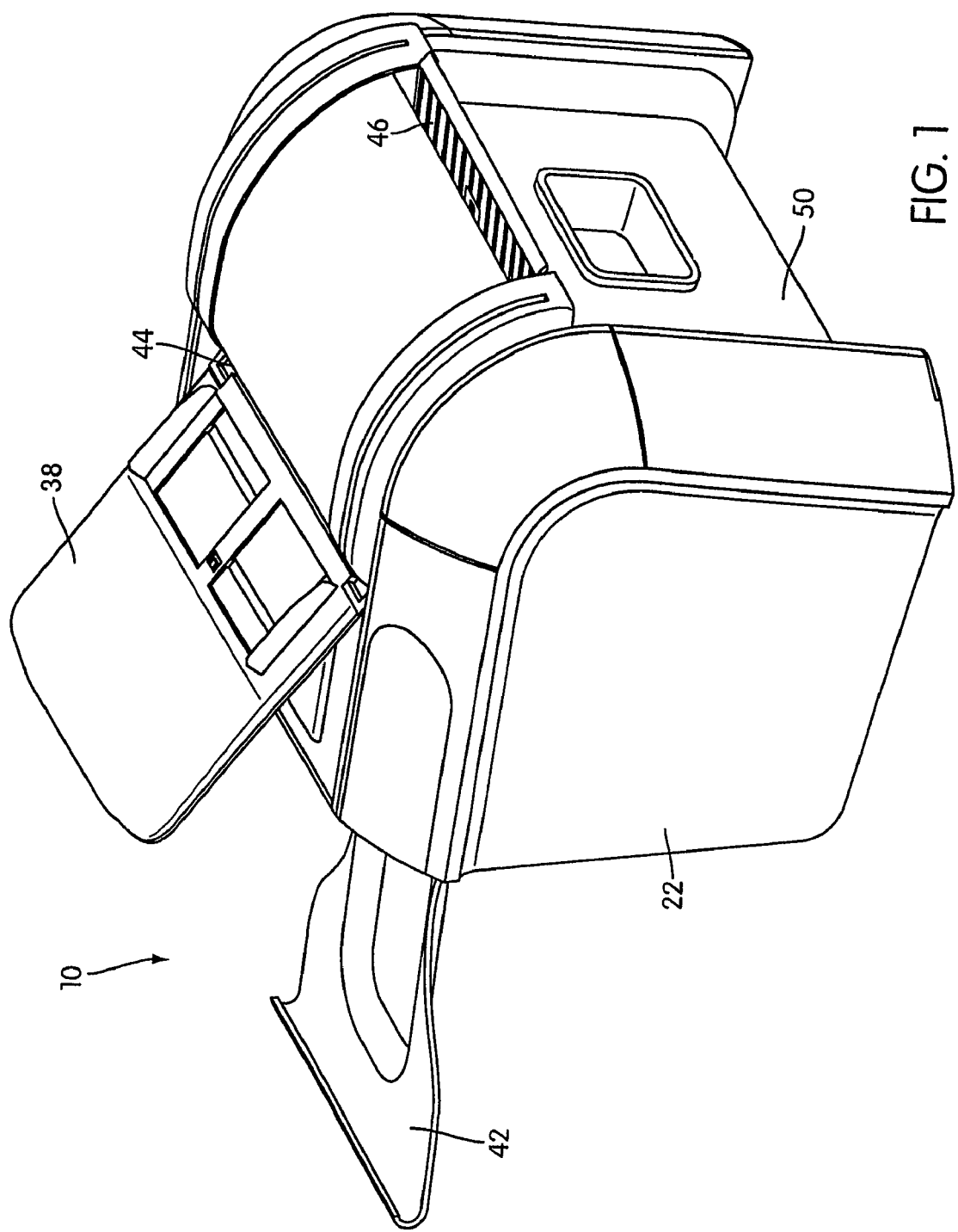
FIG. 1 is a front and left side perspective view of a document processing apparatus constructed in accordance with an embodiment of the present invention, the feed tray of the processing apparatus in a first position.
Figure 2:
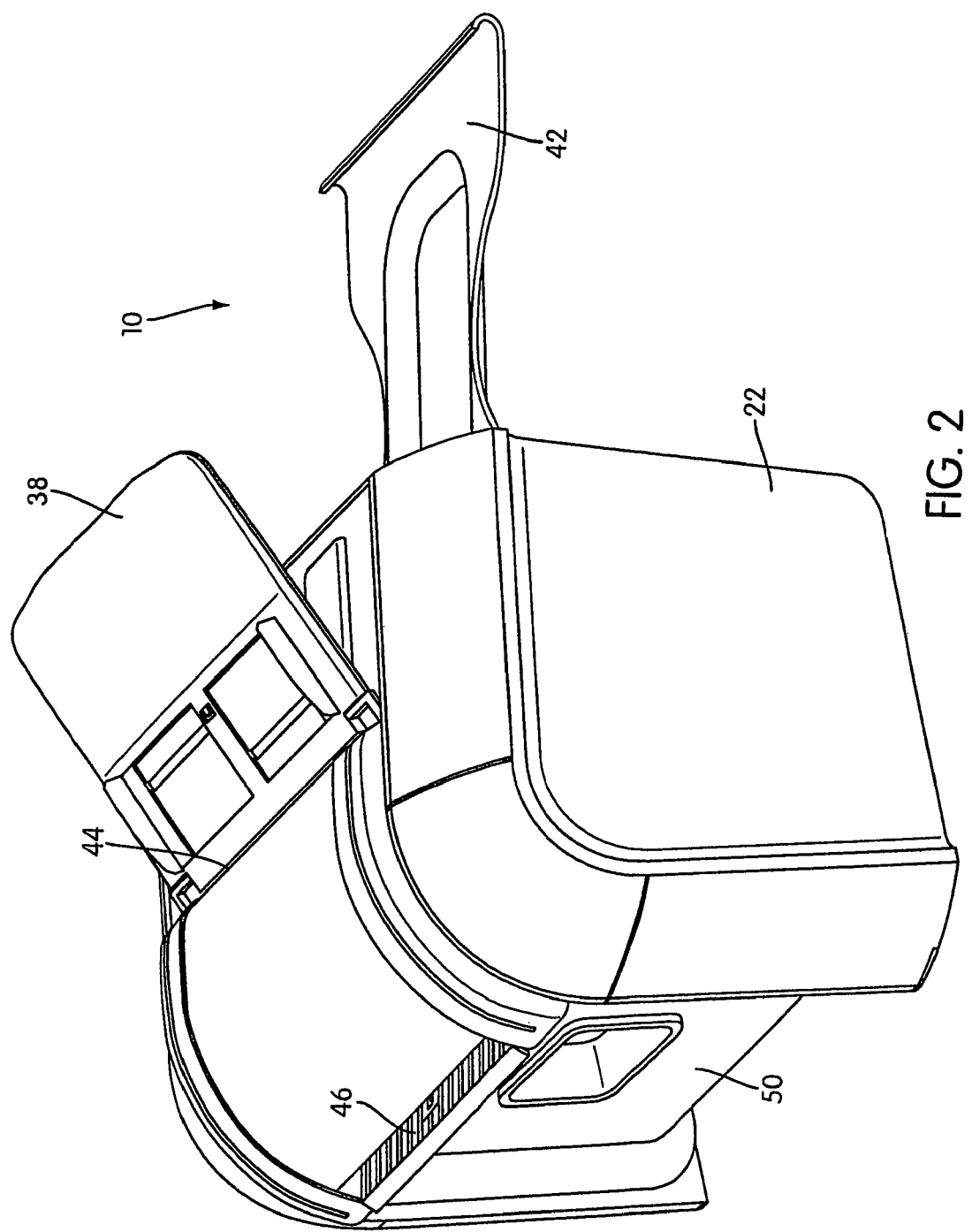
FIG. 2 is a front and right side perspective view of the processing apparatus shown in FIG. 1.
Figure 3:
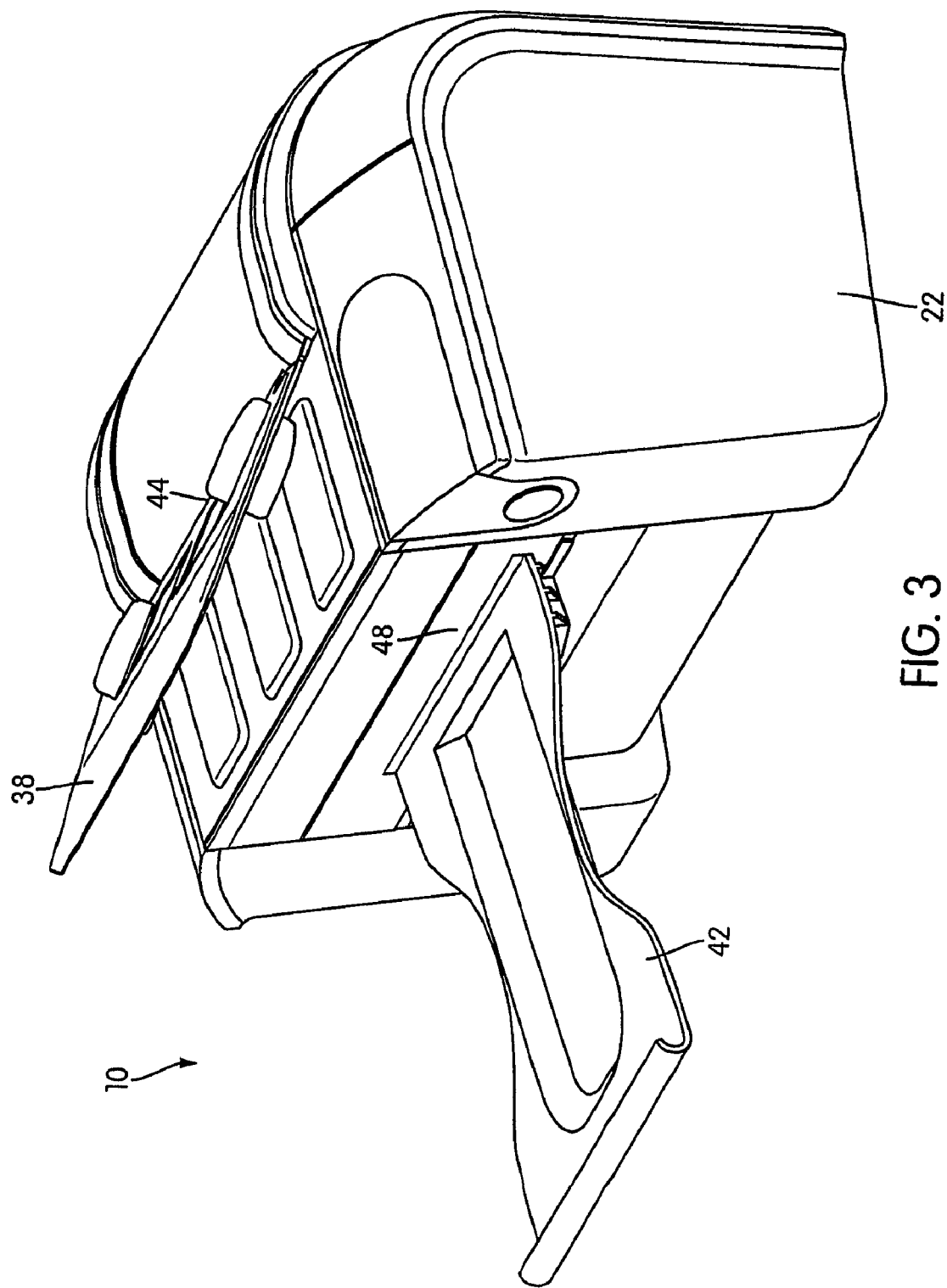
FIG. 3 is a rear and left side perspective view of the processing apparatus shown in FIG. 1.
Figure 4:
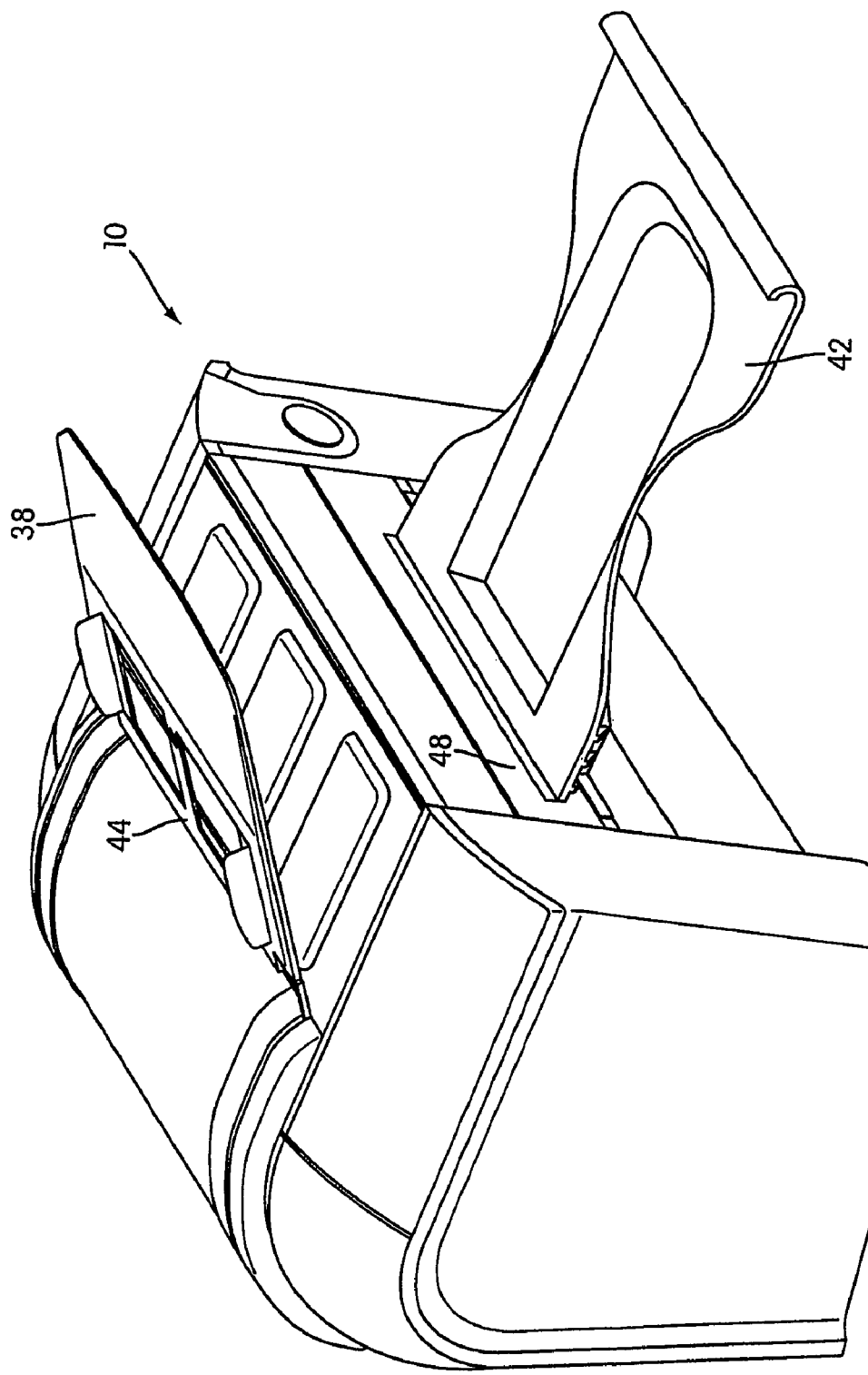
FIG. 4 is a rear and right side perspective view of the processing apparatus shown in FIG. 1.
Figure 5:
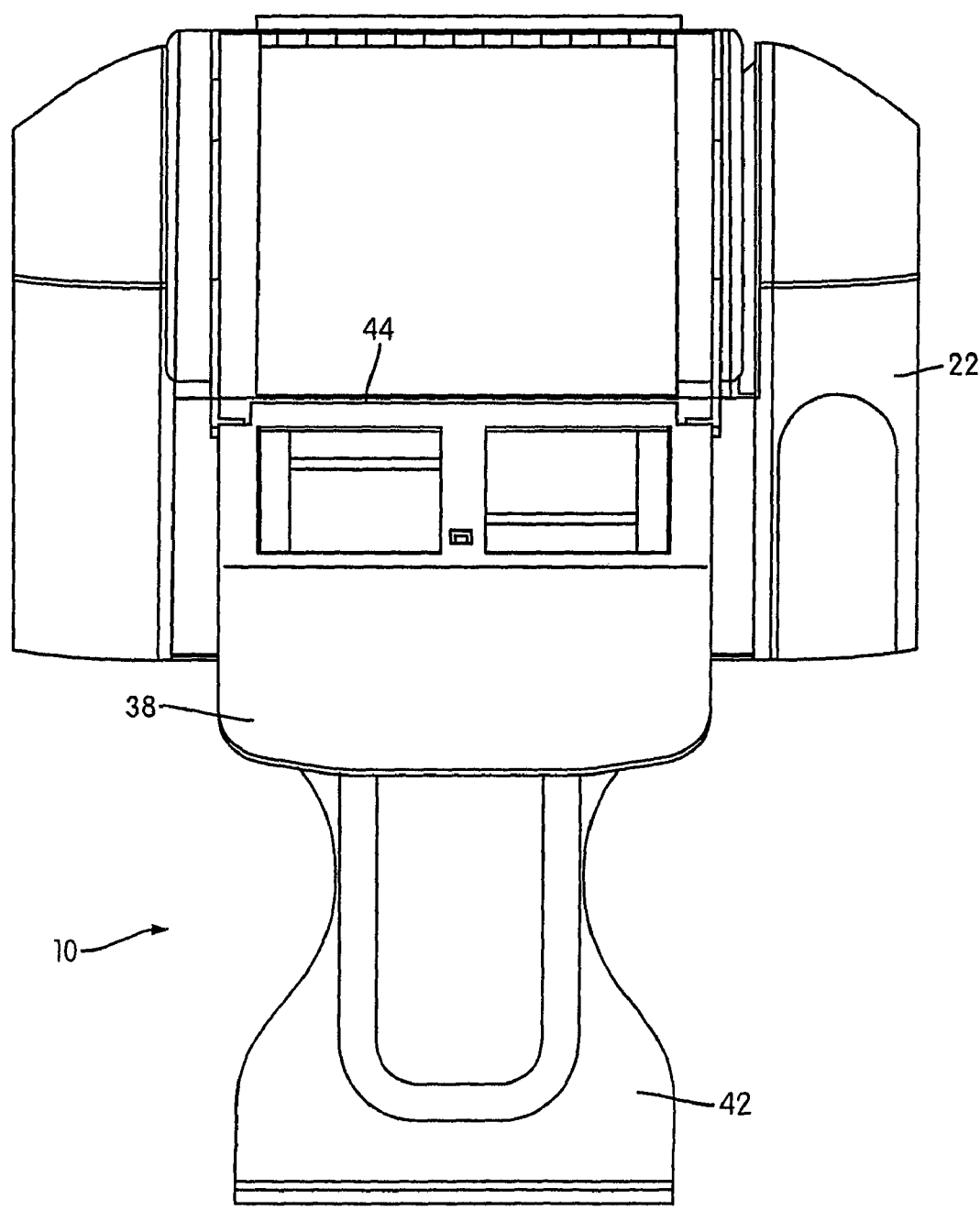
FIG. 5 is a top view of the processing apparatus shown in FIG. 1.
Figure 6:
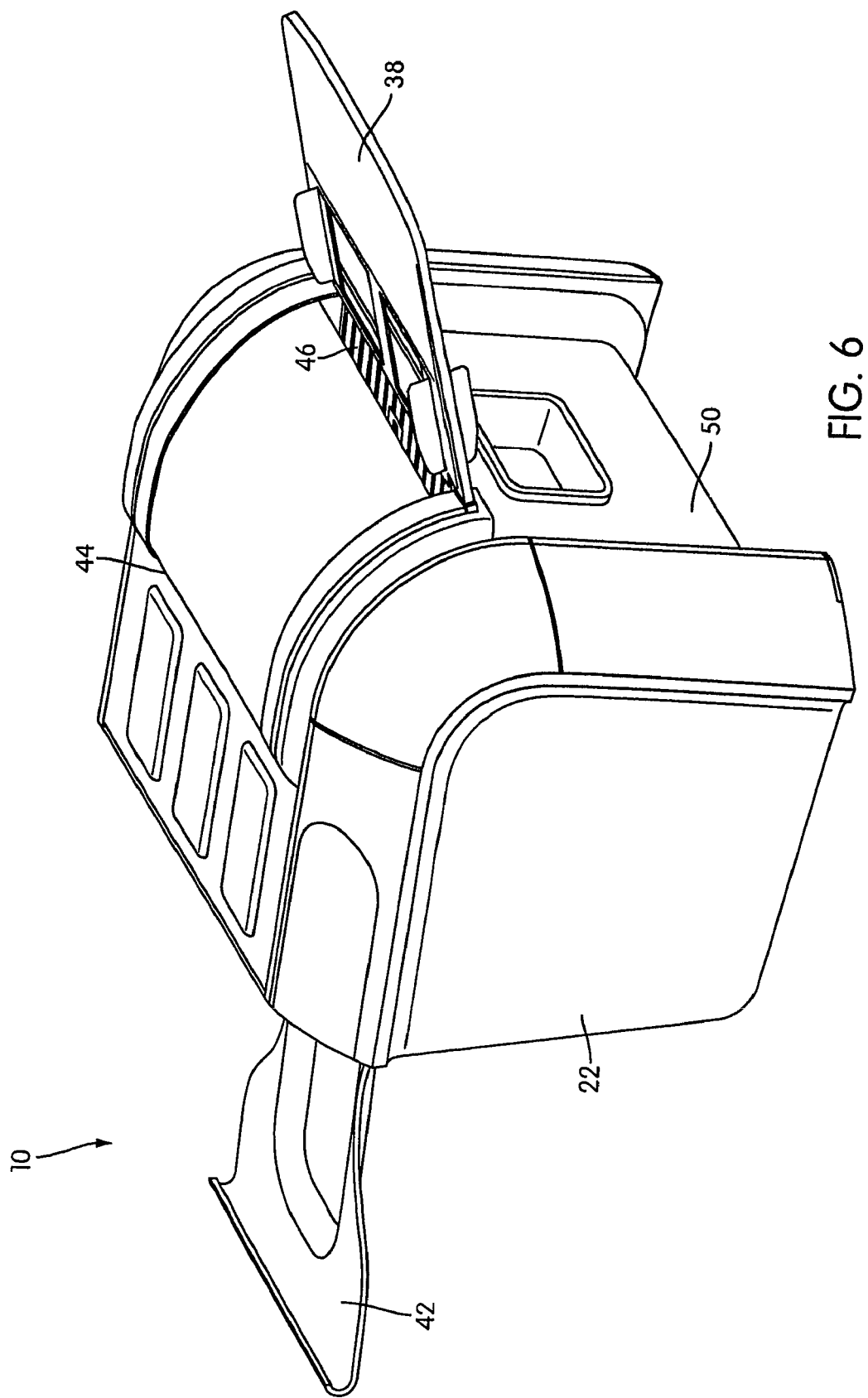
FIG. 6 is a front and left side perspective view of the processing apparatus shown in FIG. 1 with the feed tray in a second position.
Figure 7:
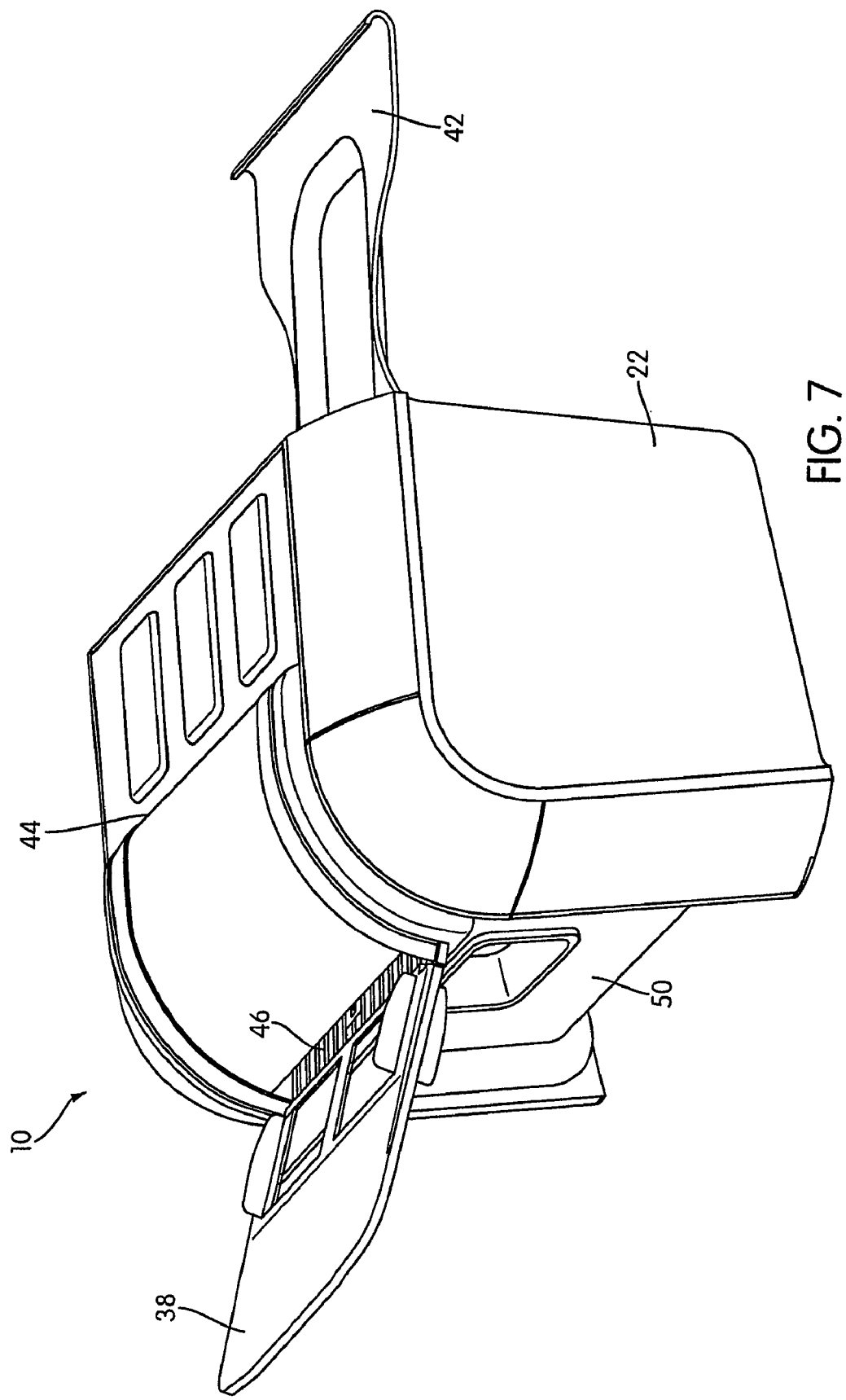
FIG. 7 is a front and right side perspective view of the processing apparatus shown in FIG. 6.
Figure 8:
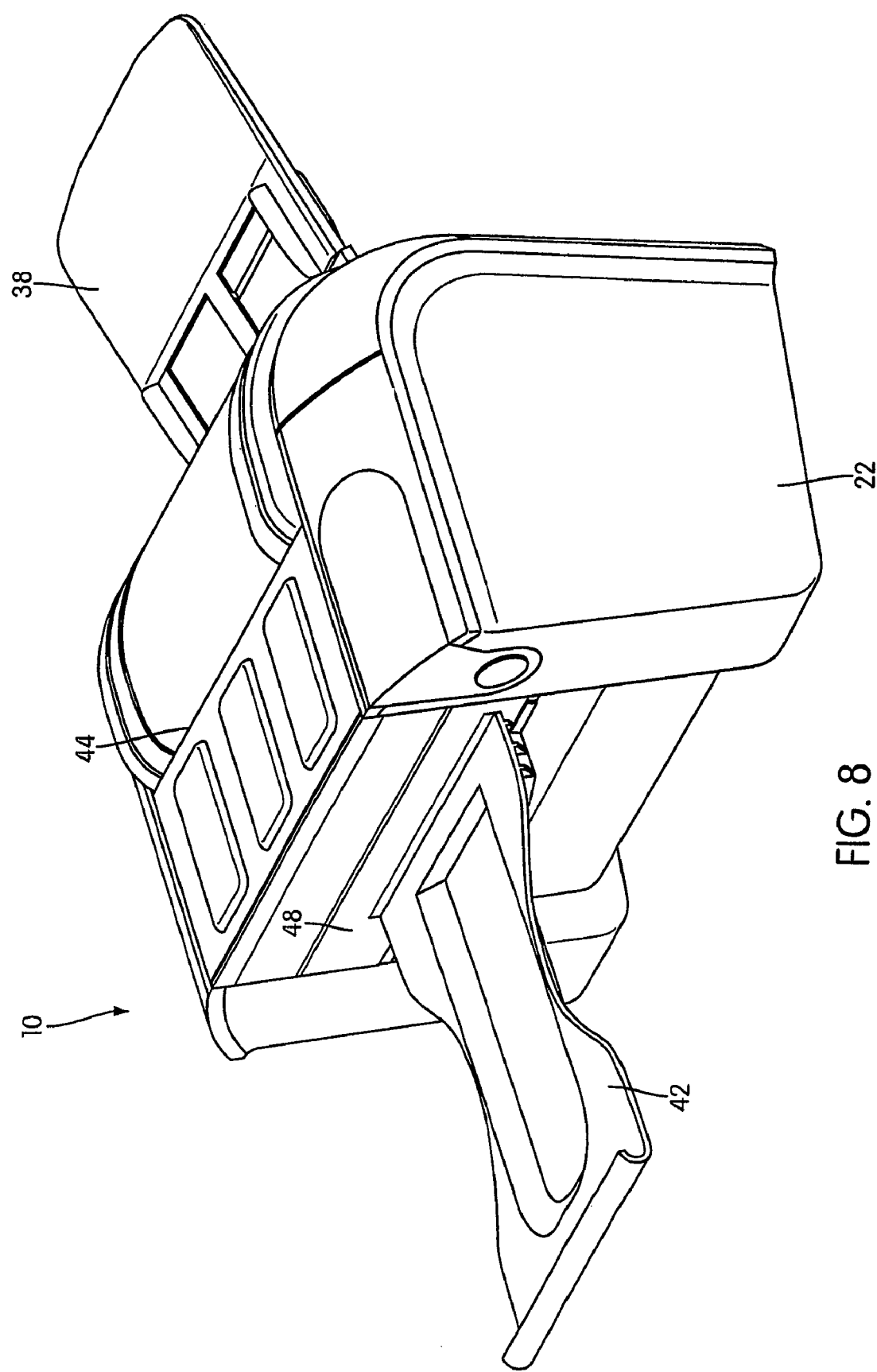
FIG. 8 is a rear and left side perspective view of the processing apparatus shown in FIG. 6.
Figure 9:
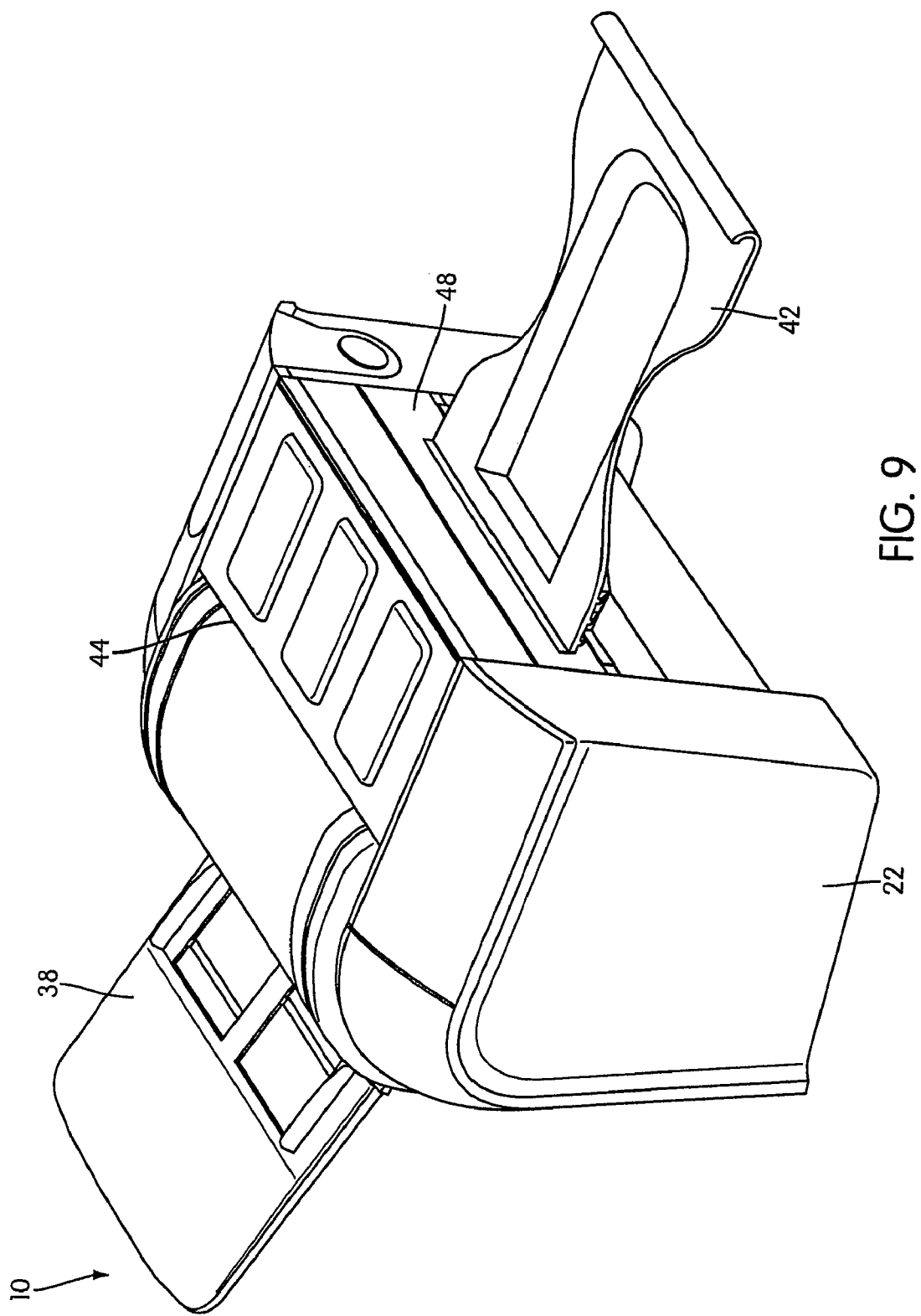
FIG. 9 is a rear and right side perspective view of the processing apparatus shown in FIG. 6.
Figure 10:
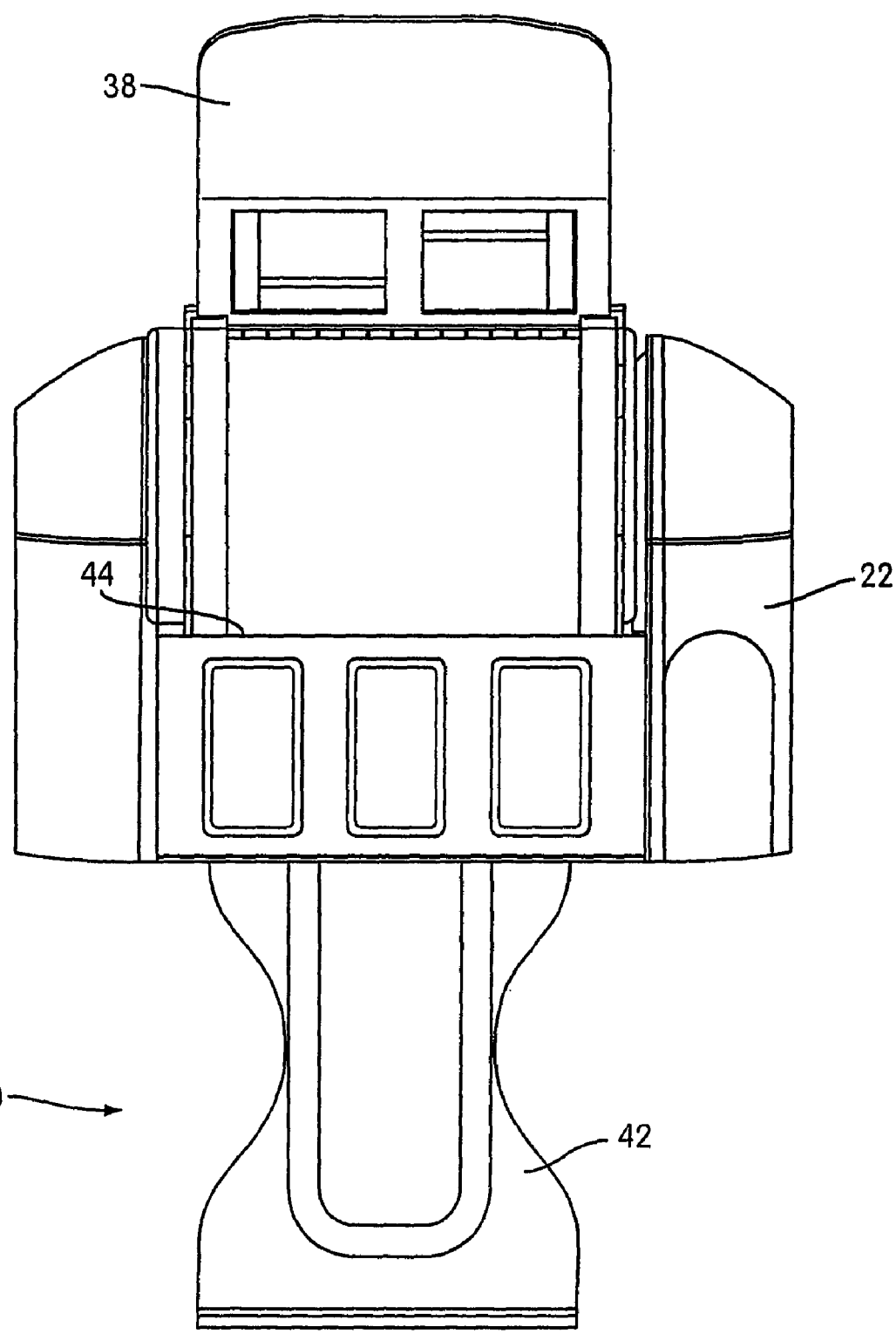
FIG. 10 is a top view of the processing apparatus shown in FIG. 6.
Figure 11:
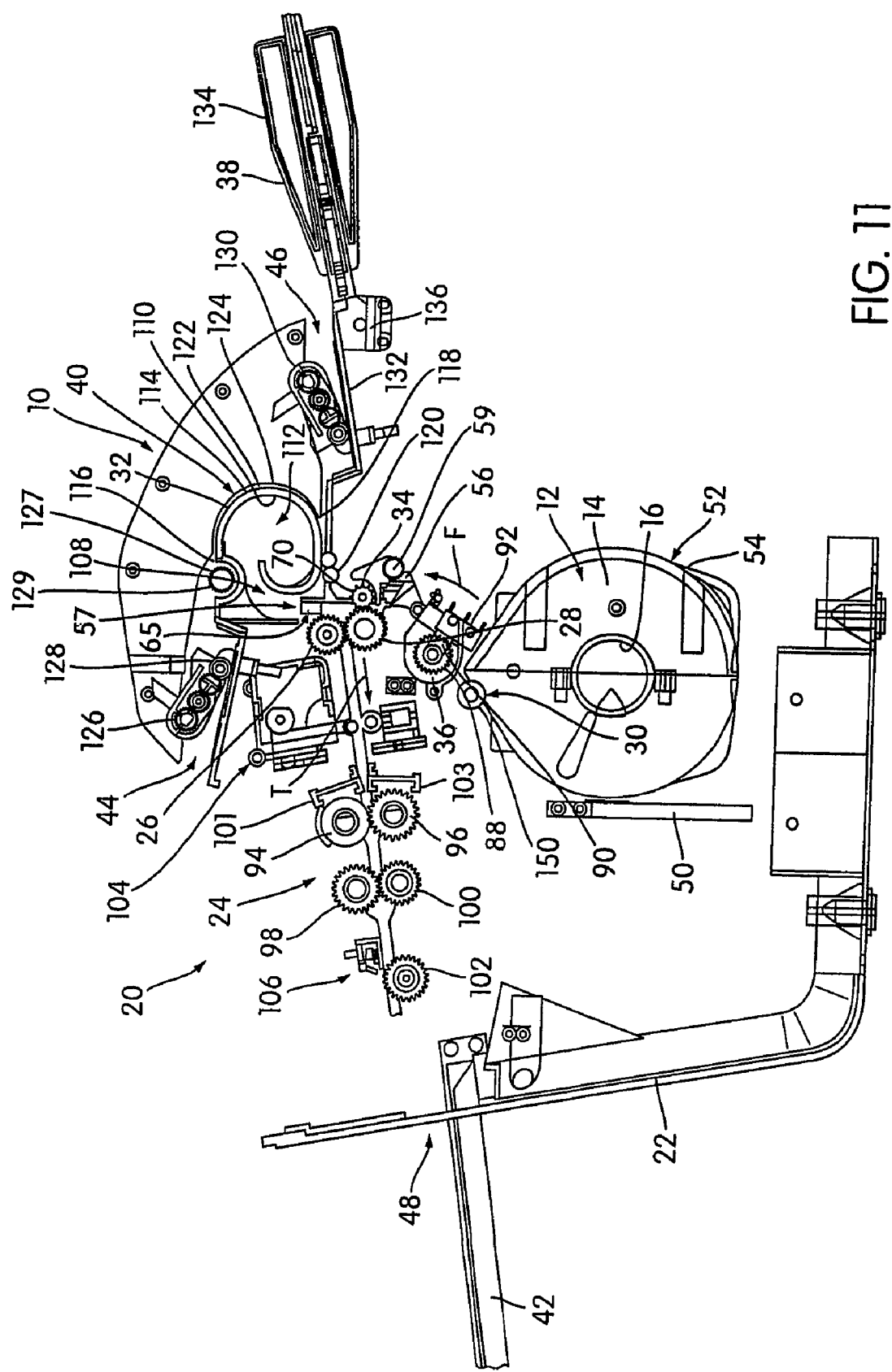
FIG. 11 is a cross-sectional view of the processing apparatus shown in FIG. 1.

As best shown in FIG. 11, the main components of the laminator 10 are a frame 22, a laminator unit 24 provided on the frame 22, a pair of cooperating structures 26, 28 operable to feed documents into the laminator unit 24, a feeder system 30 operable to feed a selected length of the stock material 14 from the supply in a feeding direction F, a reservoir 32 provided beyond the pair of cooperating structures 26, 28 in the feeding direction F, a folder member 34 operable to urge a portion of the selected length of the stock material 14 in between the cooperating structures 26, 28, a cutter 36 positioned between the supply of stock material 14 and the pair of cooperating structures 26, 28 in the feeding direction F, a generally upwardly facing feed tray 38 for receiving the document, a document guide 40 constructed to guide the document to the pair of cooperating structures 26, 28, and a generally upwardly facing discharge tray 42 for receiving the laminated document.

The above-noted laminator components will now be described in greater detail. As shown in FIGS. 1-11, the frame 22 includes a first feed opening 44, a second feed opening 46, and a discharge opening 48. In the illustrated embodiment, the first feed opening 44 is provided on an upper wall of the frame 22, and the second feed opening 46 is provided on a side wall of the frame 22. As discussed in greater detail below, the feed tray 38 is movable between a first position (as shown in FIGS. 1-5) adjacent the first feed opening 44, and a second position (as shown in FIGS. 6-11) adjacent the second feed opening 46. In both positions, the feed tray 38 is structured to receive the document and guide it through the respective feed opening 44, 46. As the document passes through the respective feed opening 44, 46 and into the frame interior, the document guide 40 within the frame 22 guides the document to the pair of cooperating structures 26, 28 which feeds the document and stock material 14 to the laminator unit 24. The document emerges from the discharge opening 48 with the stock material 14 affixed thereto. The discharge tray 42 is positioned adjacent the discharge opening 48 and is structured to receive the laminated document. The discharge tray 42 may be movably or fixedly mounted to the frame 22.

Figure 12:
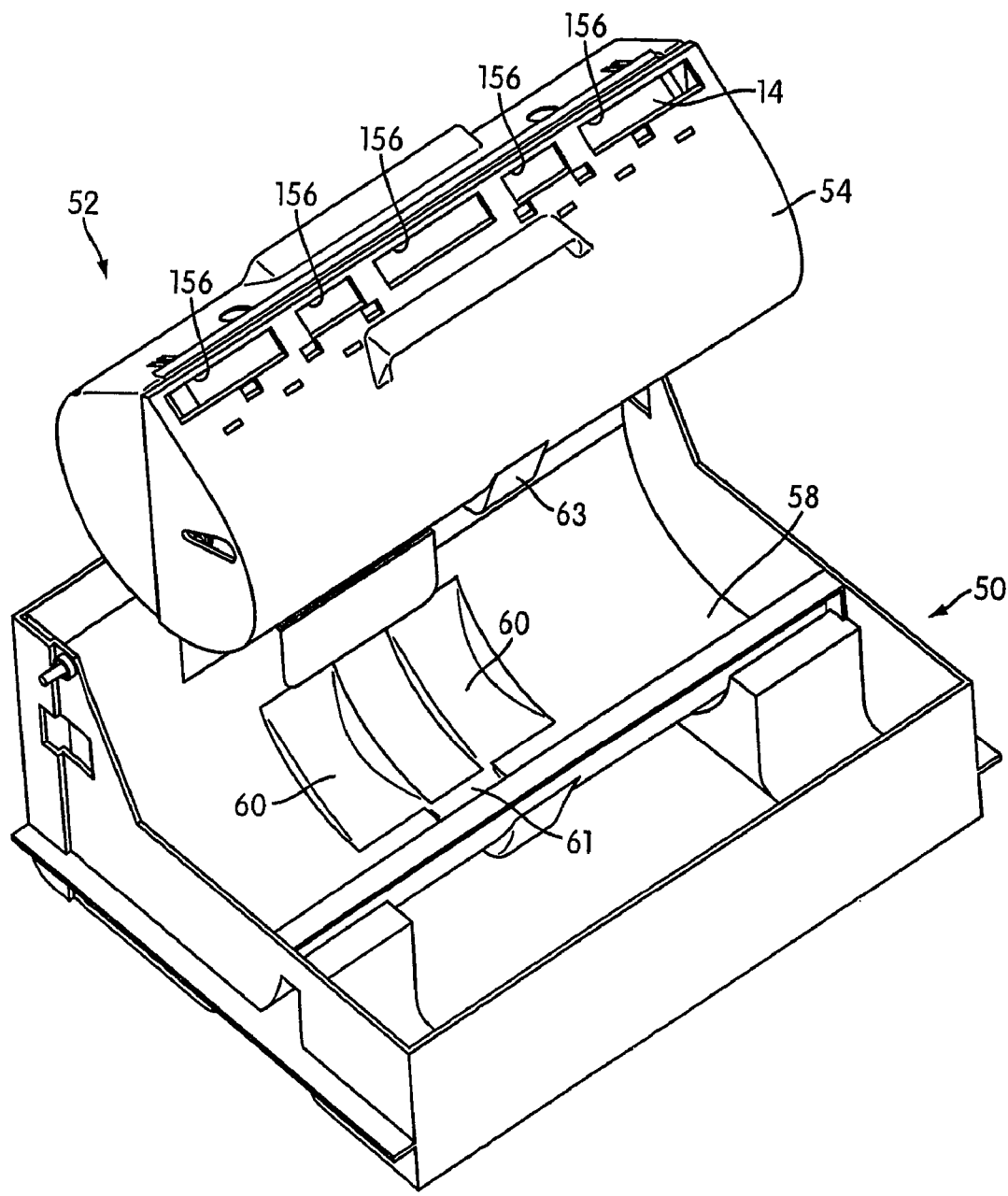
FIG. 12 is an exploded view of an embodiment of the input tray and feed roll cartridge of the processing apparatus shown in FIG. 1.
Figure 13:
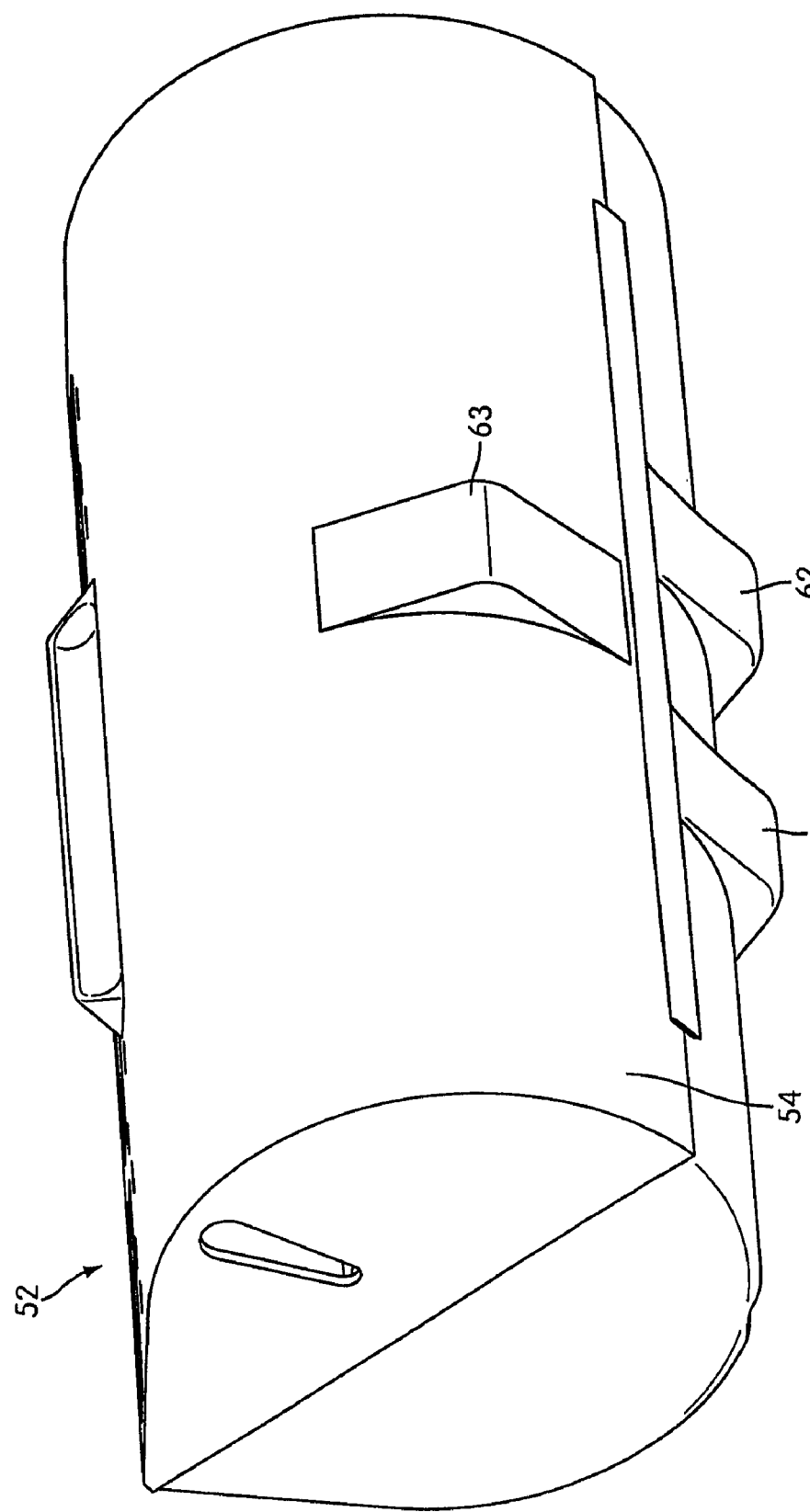
FIG. 13 is a perspective view of the feed roll cartridge shown in FIG. 12.
Figure 15:
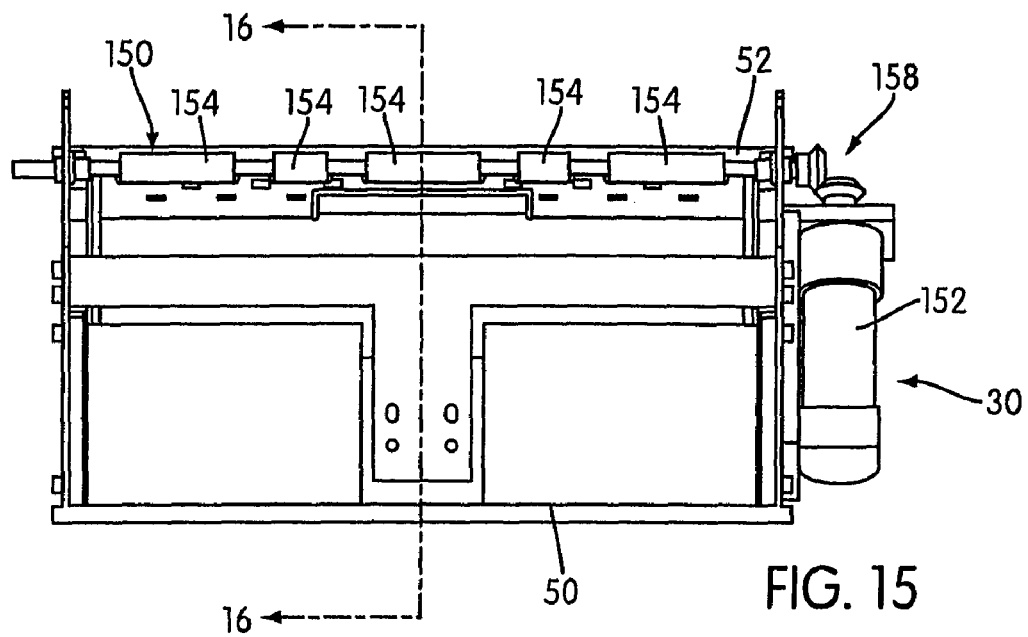
FIG. 15 is a rear view of the input tray shown in FIG. 12 with the feed roll cartridge received therein.

The frame 22 also includes a supply receiving portion 50 constructed to receive the feed roll 12 carrying the supply of stock material 14 in an operative position. In the illustrated embodiment, the feed roll 12 is mounted within a cartridge 52 to facilitate easy removal and replacement of the feed roll 12 as shown in FIGS. 11-13 and 16. The cartridge 52 includes a body 54 constructed and arranged to be removably mounted within the supply receiving portion 50 of the frame 22. As illustrated in FIGS. 12, 15, and 16, the supply receiving portion 50 is in the form of an input tray that is structured to removably mount the cartridge 52. However, the supply receiving portion 50 of the frame 22 may be structured to removably mount a feed roll individually without the use of a cartridge. That is, the laminator 10 may be a non-cartridge-based system.

Figure 24:
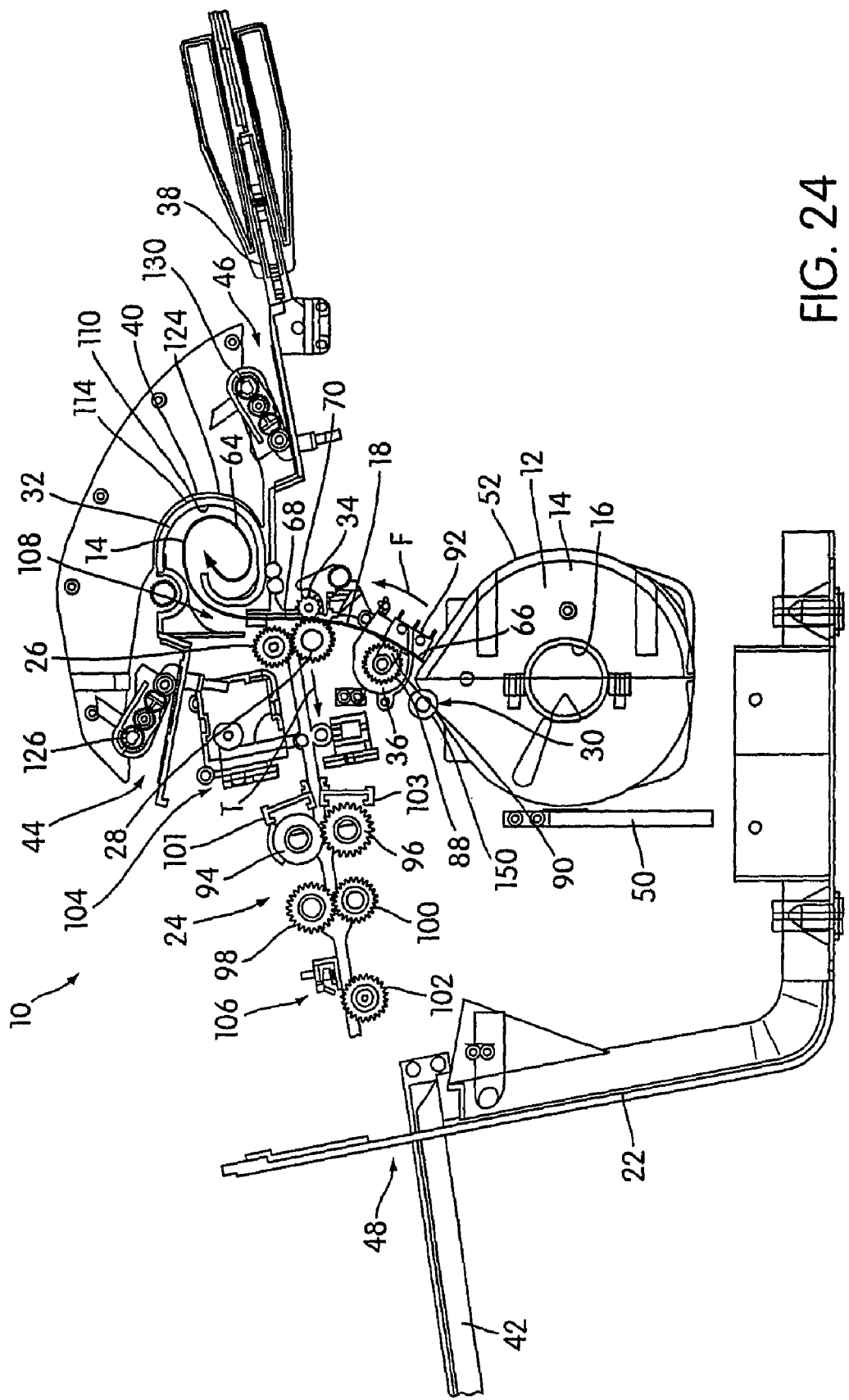
FIG. 24 is a cross-sectional view similar to FIG. 11 illustrating stock material from the feed roll being fed past the cooperating structures and into the reservoir.

The feed roll 12 is mounted to the cartridge 52 to enable the stock material 14 to be unwound from the feed roll 12 and fed in a feeding direction F. That is, the cartridge 52 and feed roll 12 are constructed and arranged such that when the cartridge 52 is mounted to the frame 22, a lead end of the stock material 14 can be fed from the cartridge 52 and guided in the feeding direction F past the cutter 36, past the folder member 34 and the cooperating structures 26, 28, and into the reservoir 32 as best shown in FIG. 24.

Guide members 56, 57 are provided in the frame 22 in spaced apart relation along the feed path to help guide the stock material 14 in the feeding direction F. In the illustrated embodiment, the guide member 56 is in the form of a guide fin that is pivotably movable about pivot axis 59 between engaged and disengaged positions. In the engaged position, the guide fin 56 is moved such that a free end thereof is positioned to guide the stock material 14 in the feeding direction F. In the disengaged position, the guide fin 56 is moved away from the feed path of the stock material 14 to allow stock material 14 to bunch up below the cooperating structures 26, 28. Once the selected length of stock material 14 has been dispensed, the cutter 36 may be actuated to cut the selected length from the remainder of the feed roll 12. In the illustrated embodiment, the guide member 57 is in the form of a guide block having a guiding channel 65 formed therein. The guiding channel 65 is structured to receive the stock material 14 and guide it into the reservoir 32. However, the guide members 56, 57 may have any other suitable structure to help guide the stock material 14.

The cartridge 52 may be configured to mount and support feed rolls 12 having different widths. For example, the cartridge 52 may be configured to mount feed rolls 12 having a standard letter size paper width, A4 width, etc.

The input tray 50 is slidably mounted to the frame 22 for movement between a cartridge receiving position and a cartridge operating position. As shown in FIG. 12, the input tray 50 includes a cartridge seat 58 secured thereto. In the cartridge receiving position, the input tray 50 is moved to a position extending outwardly from the frame 22 to allow the cartridge 52 to be mounted by dropping the cartridge 52 vertically downwardly into the cartridge seat 58. When the input tray 50 is moved to the cartridge operating position, the cartridge 52 is positioned such that a lead end of the stock material 14 can be feed in the feeding direction F.

Figure 14:
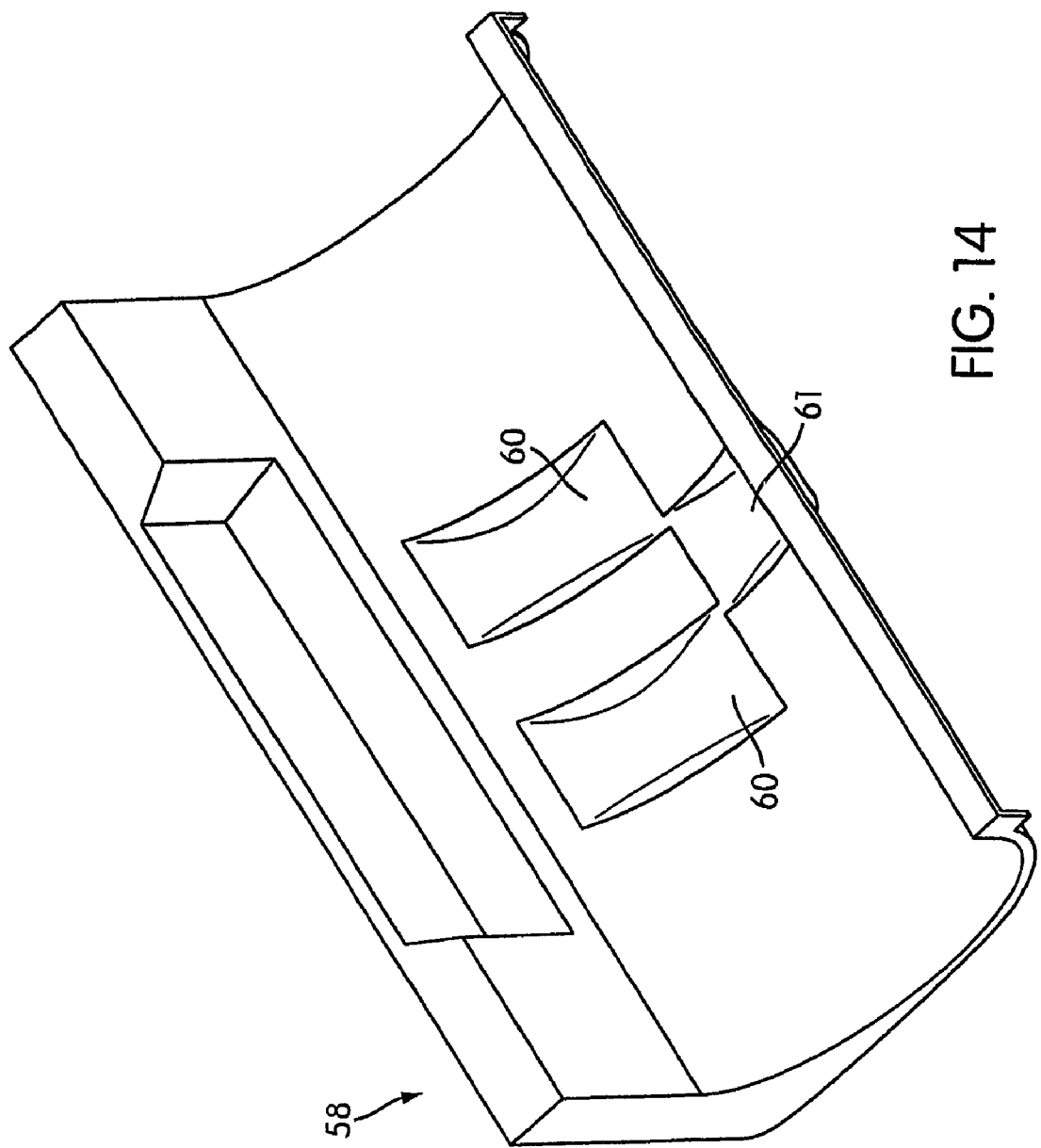
FIG. 14 is a perspective view of the cartridge seat of the input tray shown in FIG. 12.

As shown in FIGS. 12 and 14, the cartridge seat 58 includes a pair of recesses 60 on one side thereof a single recess. 61 on an opposing side thereof. The cartridge 52 includes a pair of protrusions 62 on one side thereof and a single protrusion 63 on an opposing side thereof (see FIG. 13). The cartridge 52 is mounted to the cartridge seat 58 such that the pair of recesses 60 receive the corresponding pair of protrusions 62 and the single recess 61 receives the corresponding protrusion 63. This arrangement keeps the cartridge 52 stationary during movement between the cartridge receiving and cartridge operating positions. Moreover, the positioning of the recesses 60, 61/protrusions 62, 63 ensures that the cartridge 52 is properly oriented within the cartridge seat 58 so as to prevent the cartridge 52 from being loaded in the cartridge seat 58 backwards, for example. The recesses 60, 61/protrusions 62, 63 may have any suitable configuration and quantity. Moreover, the recesses 60, 61/protrusions 62, 63 associated with the cartridge seat 58 and cartridge 52 are optional and not to be considered limiting.

The feeder system 30 is operable to feed a selected length of the stock material 14 from the supply in a feeding direction F so that a leading portion 64 of the selected length passes beyond the pair of cooperating structures 26, 28 and a trailing portion 66 of the selected length extends from the pair of cooperating structures 26, 28 towards the supply of stock material 14, as best shown in FIG. 24. Moreover, an intermediate portion 68 of the selected length between the leading and trailing portions 64, 66 is positioned adjacent the cooperating structures 26, 28. The supply of stock material 14 is oriented such that the adhesive carrying surface 18 at the intermediate portion 68 faces generally away from the cooperating structures 26, 28.

In the illustrated embodiment, the feeder system 30 includes a transverse roller 150 that is engagable with the stock material 14 and is driven by an electric motor 152 to advance the stock material 14 from the feed roll 12 in the feeding direction F. Specifically, as best shown in FIG. 15, the transverse roller 150 includes spaced-part roller portions 154, e.g., five roller portions, that are engagable with the stock material 14 through respective openings 156, e.g., five openings, provided in the cartridge body 54 (see FIG. 12). The electric motor 152 is operatively engaged with the transverse roller 150 via a gear assembly 158. In use, the electric motor 152 is actuated by the laminator controller to drive the transverse roller 150 and advance the stock material 14 in the feeding direction F. The laminator controller may cease operation of the electric motor 152 when the selected length of stock material 14 has been advanced from the cartridge 52.

In the illustrated embodiment, the feeding direction F is oriented generally upwardly, e.g., vertically, away from the supply of stock material 14 and towards the cooperating structures 26, 28 and reservoir 32. However, the feeding direction F may vary depending on, for example, the location of the supply of stock material 14 and the desired feed path configuration within the frame 22. For example, instead of being generally straight or curved, the feed path may also be tortuous or winding.

In the illustrated embodiment, the cooperating structures 26, 28 are in the form of pressure-applying rollers. The rollers 26, 28 are rotatably mounted between side walls of the frame 22. The rollers 26, 28 are driven by an electric motor to advance the document into the laminator unit 24 as it compresses the stock material 14 and document to form an initial bond between the stock material 14 and document. However, the cooperating structures 26, 28 may have any other suitable structure.

As shown in FIG. 11, the folder member 34 and the pair of cooperating structures 26, 28 are oriented transversely with respect to the feeding direction F. Specifically, the folder member 34 and the pair of cooperating structures 26, 28 are oriented to advance the stock material 14 in a feeding direction T that is transverse to the feeding direction F. As illustrated, the direction T extends generally horizontal. However, the direction T may vary depending on, for example, the configuration of the laminator unit 24.

Figure 18:
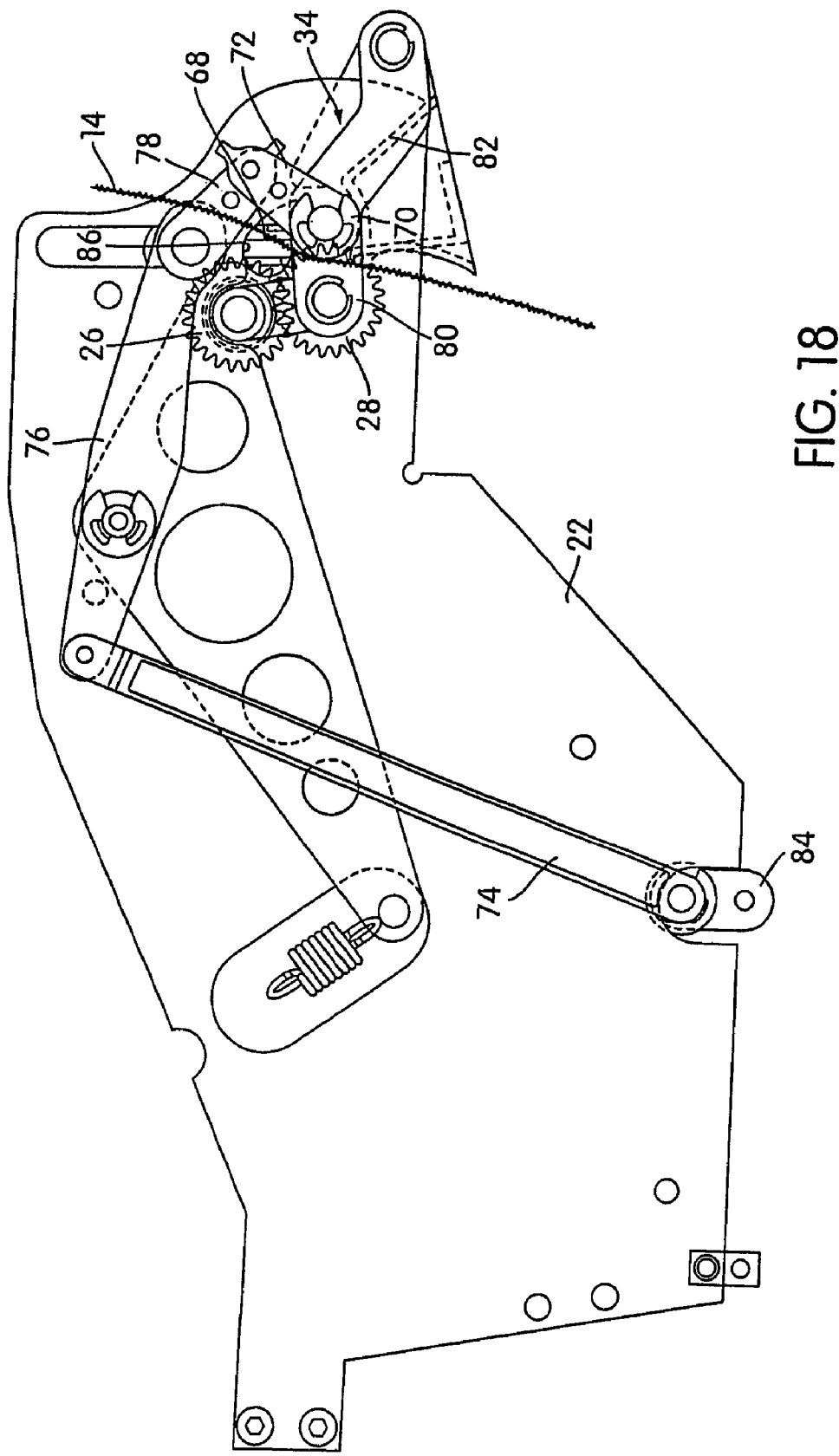
FIG. 18 is a side view of an embodiment of a folder member of the processing apparatus shown in FIG. 1, the folder member in a disengaged position.
Figure 19:
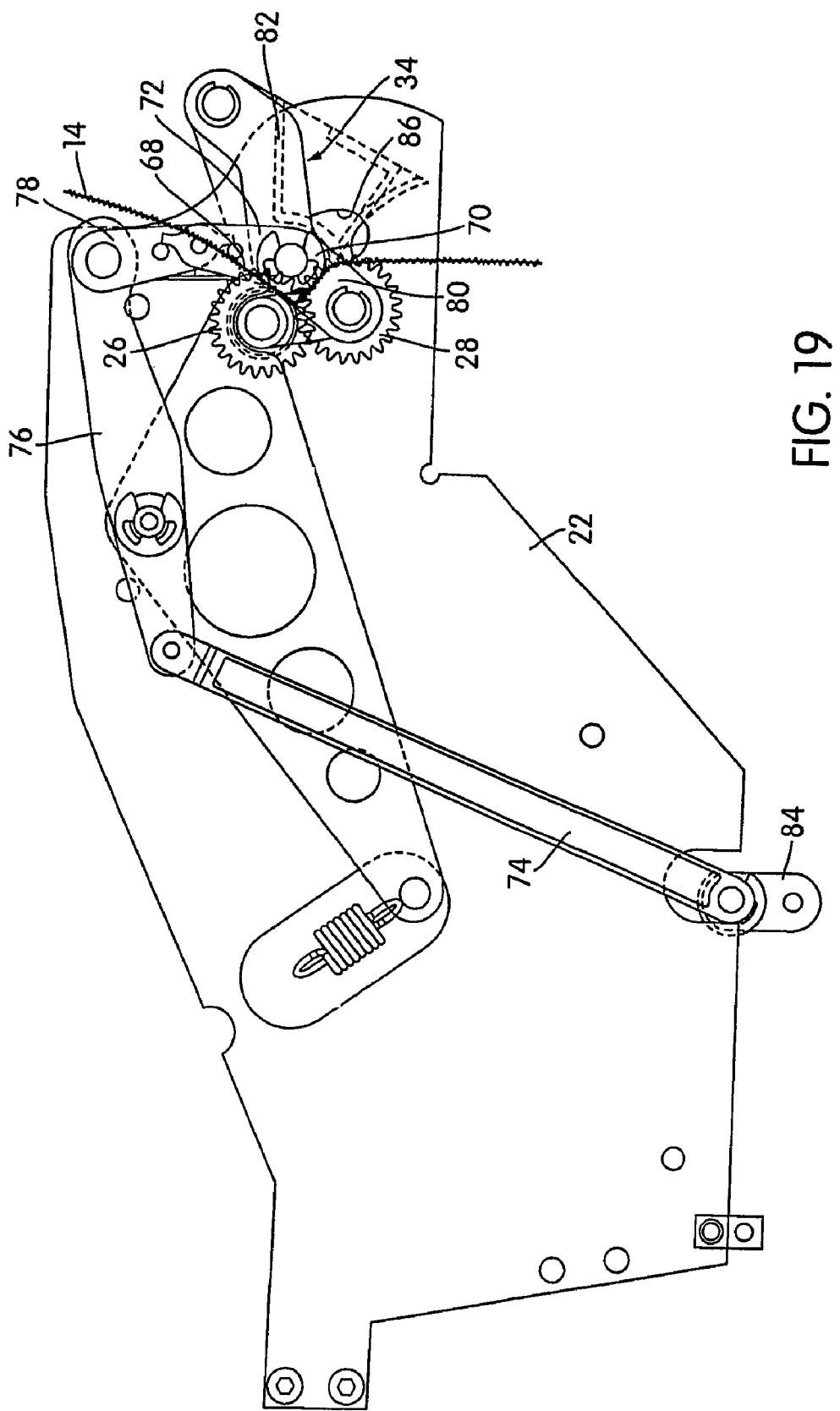
FIG. 19 is a side view of the folder member shown in FIG. 18 with the folder member in an engaged position.
Figure 25:
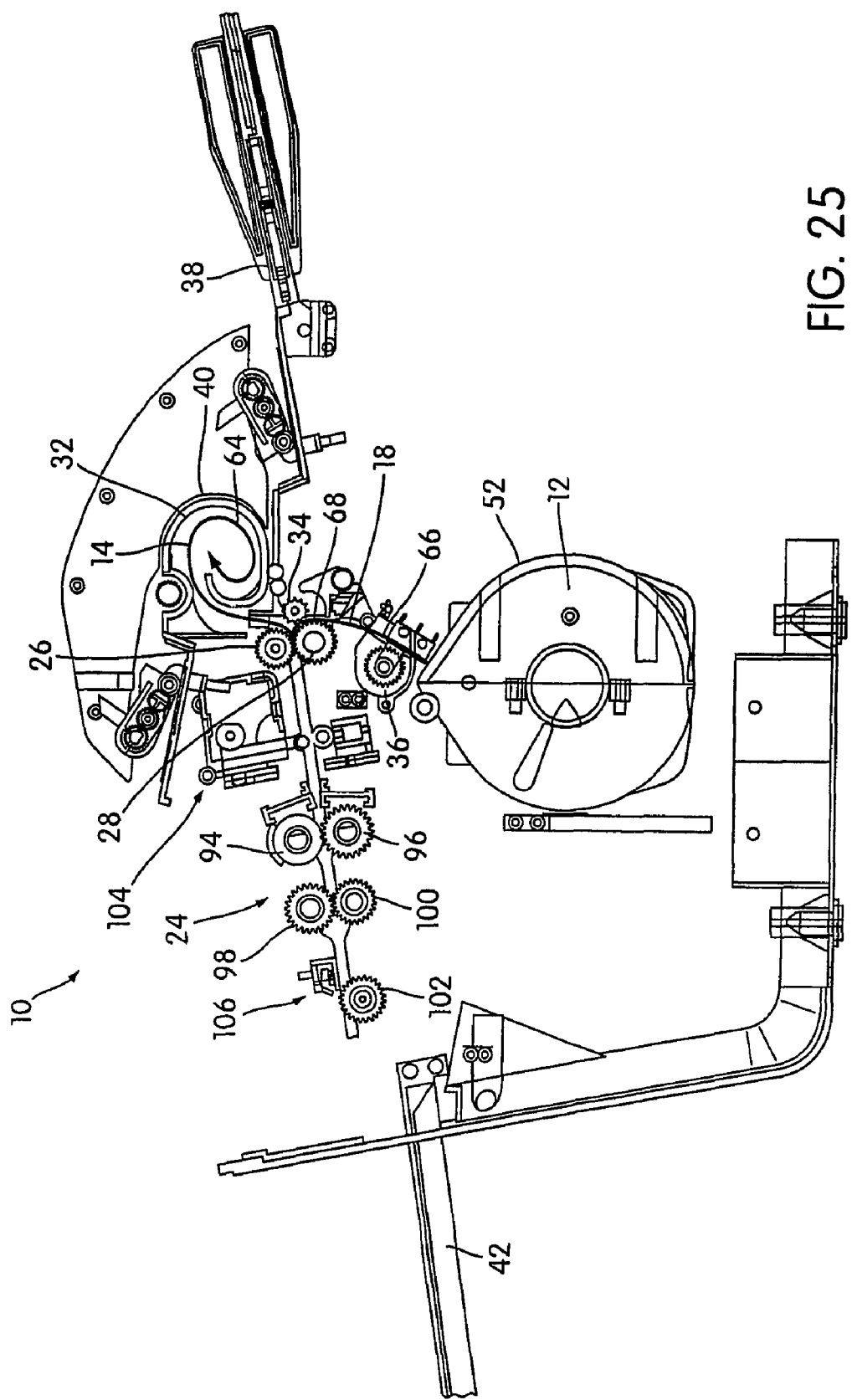
FIG. 25 is a cross-sectional view similar to FIG. 24 illustrating the folder member engaging the stock material to form a fold therein and to urge the stock material in between the cooperating structures.

The folder member 34 is movable between a disengaged or released position (as shown in FIG. 18) enabling the stock material 14 to pass beyond the pair of cooperating structures 26, 28 in the feeding direction F, and an engaged or folding position (as shown in FIGS. 19 and 25) urging the intermediate portion 68 in between the cooperating structures 26, 28 in a transversely folded relation. When the folder member 34 is in the engaged position, a lead end of the document may be received in the folded intermediate portion 68 so that the cooperating structures 26, 28 can feed the document with the leading and trailing portions 64, 66 of the selected length of stock material 14 on opposing sides thereof into the laminator unit 24.

In the illustrated embodiment, the folder member 34 includes a folding roller 70. In the disengaged position, the folding roller 70 engages the stock material 14 to assist with guiding the stock material 14 in the feeding direction F as shown in FIG. 18. As the folding roller 70 is moved into the engaged position, the folding roller 70 forces the stock material 14 by frictional engagement in between and into engagement with the cooperating structures 26, 28, which forms the transversely extending fold in the stock material 14 as shown in FIG. 19. The fold in the stock material 14 may create a pocket for the document so that the document and stock material 14 can be fed by the cooperating structures 26, 28 into the laminator unit 24. It should be understood that the folded relation of the intermediate portion 68 means that a fold could just be initiated for feeding the intermediate portion 68 to the cooperating structures 26, 28, or a sharp fold could be formed.

Also, it should be noted that in the disengaged position the folding roller 70 could be fully spaced from the stock material 14 or engaged with the stock material 14 as shown. The term "disengaged" is simply used in a functional sense in that the folding roller 70 is not in a position to urge the stock material 14 in between the cooperating structures 26, 28.

As shown in FIGS. 18 and 19, the folding roller 70 is provided on the end of a roller arm 72. The roller arm 72 is operatively engaged with a series of interconnected links 74, 76, 78, 80, 82 that move the roller arm and hence the roller between the disengaged and engaged positions. Specifically, the link 74 is operatively engaged with an actuator 84, e.g., solenoid, that is operated by the laminator controller to move the link 74 between two positions. In the first position shown in FIG. 18, the actuator 84 moves upwardly to move the link 74 upwardly which forces the other links 76, 78, 80, 82 into a position that maintains the folding roller 70 in the disengaged position. In the second position shown in FIG. 19, the actuator 84 moves downwardly to move the link 74 downwardly which forces the other links 76, 78, 80, 82 into a position that moves the folding roller 70 into the engaged position. The frame 22 includes an arcuate slot 86 that is structured to guide the folding roller 70 in an arcuate path between the disengaged and engaged positions. In the illustrated embodiment, the lower end of the slot 86 defines the disengaged position, and the upper end of the slot 86 defines the engaged position. However, the folding member 34 may have any other suitable construction or configuration and the illustrated embodiment is not intended to be limiting.

The cutter 36 is positioned between the supply of stock material 14 and the pair of cooperating structures 26, 28 in the feeding direction F. The cutter 36 is operable to cut the stock material 14 transversely with respect to the feeding direction F to cut the selected length of the stock material 14 from a remainder of the stock material 14.

In the illustrated embodiment, the cutter 36 is of the rotating shear type and includes a roller 88 having a sharpened blade-type edge 90. The roller 88 and edge 90 thereof cooperate with a die 92 positioned within the frame 22 to cut the selected length. The cutter 36 may be operated by the laminator controller that actuates the cutter 36 when the selected length of stock material 14 has been fed from the feed roll 12.

The laminator unit 24 is operable to activate the adhesive as the document and the leading and trailing portions 64, 66 of the selected length of the stock material 14 are advanced therethrough, thereby bonding the leading and trailing portions 64, 66 to the opposing sides of the document.

In the illustrated embodiment, the laminator unit 24 includes a first pair of pressure-applying nip rollers 94, 96, a second pair of pressure-applying nip rollers 98, 100, and a discharge roller 102. The nip rollers 94, 96, 98, 100, 102 are rotatably mounted between side walls of the frame 22 and cooperate to perform a processing operation. The nip rollers 94, 96, 98, 100, 102 may be driven in any suitable manner to effect operation thereof, e.g., driven by an electric motor.

The nip rollers 94, 96, 98, 100 may be heated nip rollers that are capable of simultaneously heating the stock material 14 and compressing it with the document to facilitate forming a strong bond between the stock material 14 and the document during a processing operation. It is contemplated that one or both pairs of nip rollers 94, 96, 98, 100 may be heated nip rollers. However, the nip rollers 94, 96, 98, 100 may be non-heated nip rollers capable of applying pressure to the stock material 14 and document during the processing operation. Moreover, the laminator unit 24 may have any other suitable construction or configuration and the illustrated embodiment is not intended to be limiting.

When heat nip rollers 94, 96, 98, 100 are provided, the adhesive provided on the stock material 14 may be a heat activated adhesive such that as the document and the stock material 14 pass between the heated nip rollers 94, 96, 98, 100, the heated nip rollers 94, 96, 98, 100 perform a processing operation. The heated nip rollers 94, 96, 98, 100 may emit heat to effectively activate the adhesive and apply pressure to the stock material 14 (and to the document when it is between the nip rollers 94, 96, 98, 100) during the processing operation, which causes adhesive bonding of the adhesive layer provided by the stock material 14. This bonds the document and the stock material 14 to form a final product of the document and the stock material 14. The final product is discharged out the discharge opening 48 by the driving action of the discharge roller 102. Alternatively, heating plates could be used upstream of non-heated rollers, with the plates activating the adhesive and the rollers then applying pressure.

When non-heated nip rollers are provided 94, 96, 98, 100, the adhesive may be a pressure-sensitive adhesive with the non-heated nip rollers 94, 96, 98, 100 applying pressure to the stock material 14 (and to the document when it is between the nip rollers 94, 96, 98, 100) during the processing operation, which bonds the document and the stock material 14.

A pair of deflecting members 101, 103 may be provided adjacent the first pair of pressure-applying nip rollers 94, 96 to direct the document and stock material 14 in between the nip rollers 94, 96. This allows the nip rollers 94, 96 to positively grab the document and stock material 14 and advance it through the laminator unit 24.

Also, the laminator unit 24 may include a thickness sensing device 104 and an output sensor 106. In the illustrated embodiment, the thickness sensing device 104 is positioned between the cooperating structures 26, 28 and the first pair of pressure-applying nip rollers 94, 96. The thickness sensing device 104 is structured to determine the thickness of the document and stock material 14 on opposing sides thereof as it passes thereby and to transmit this information to the laminator controller. Based on this information, the laminator controller may adjust the lamination speed or temperature, for example, for optimal lamination output. However, the thickness sensing device 104 may be positioned at any suitable location along the document path to determine the thickness and feed this information to the laminator controller. In the illustrated embodiment, the output sensor 106 is positioned adjacent the discharge roller 102 and is structured to verify that a final product is being properly discharged out the laminator unit 24. The laminator controller may shut down the laminator unit 24, for example, should the output sensor 106 detect an error. However, the thickness sensing device 104 and the output sensor 106 are optional and not to be considered limiting.

The reservoir 32 is provided beyond the pair of cooperating structures 26, 28 in the feeding direction F. The reservoir 32 is configured to receive the leading portion 64 of the selected length of stock material 14 fed beyond the pair of cooperating structures 26, 28 in a compacted configuration.

In the illustrated embodiment, the reservoir 32 includes an arcuate configuration that defines a stock material receiving opening 108 and an inner arcuate surface 110 that defines a stock material receiving space 112. The inner arcuate surface 110 of the reservoir 32 enables the leading portion 64 of stock material 14 fed past the cooperating structures 26, 28 to bunch up, e.g., coil, within the reservoir 32. This action provides a space saving feature as the laminator does not need to provide an extended length receiving area for the stock material 14 fed past the cooperating structures 26, 28. Thus, the laminator 10 can have a more compact configuration. However, the reservoir 32 may have any other suitable configuration and may be positioned at any suitable location along the feed path to receive the leading portion 64 of stock material 14.

The document guide 40 is constructed to guide the document to the pair of cooperating structures 26, 28. This enables a lead end of the document to be received in the folded intermediate portion 68 of the stock material 14 so that the cooperating structures 26, 28 can feed the document with the leading and trailing portions 64, 66 of the selected length of stock material 14 on opposing sides thereof into the laminator unit 24. In the illustrated embodiment, the document guide 40 shares a common wall with the reservoir 32. Specifically, the document guide 40 is defined by an outer arcuate surface 114 of the reservoir 32 and an inner arcuate surface 122 of arcuate wall 124.

Figure 20:
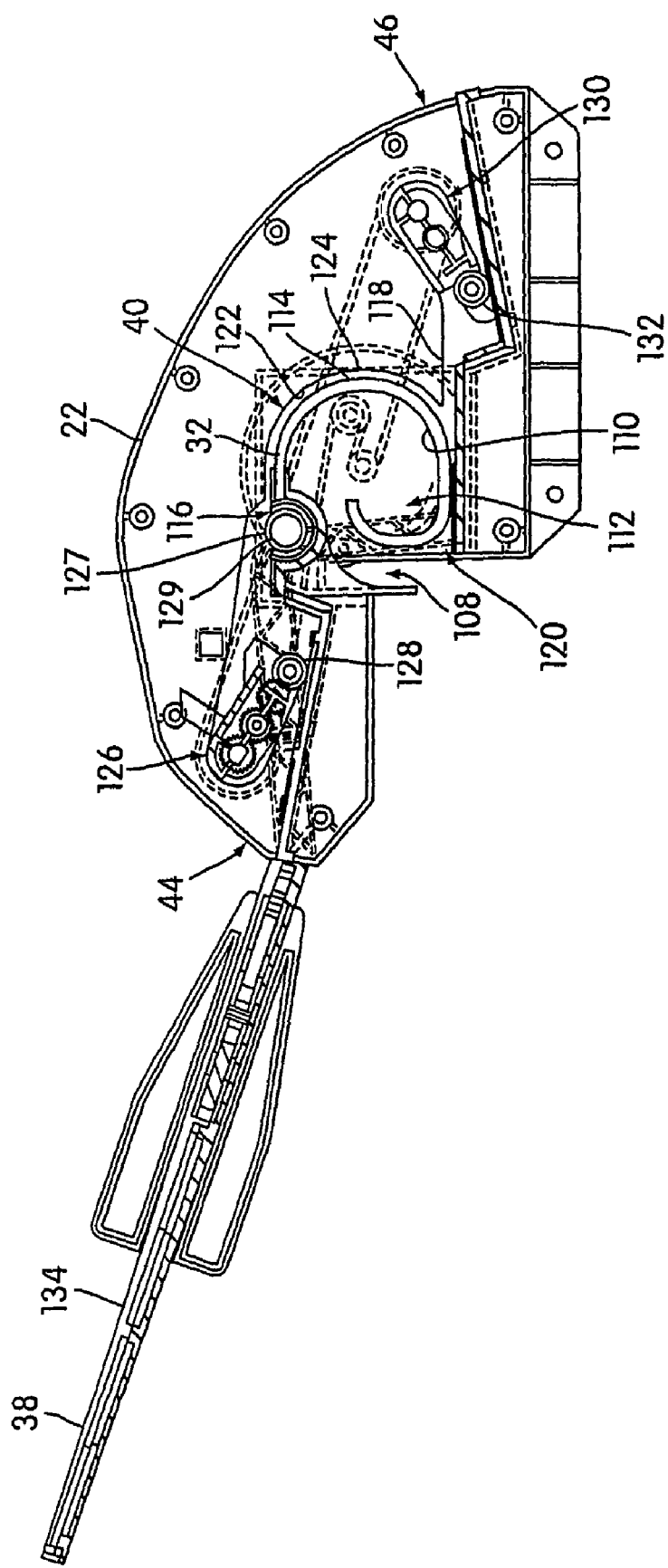
FIG. 20 is a partial cross-sectional view of the processing apparatus shown in FIG. 1 illustrating an embodiment of the document guide, the input tray in the first position.
Figure 21:
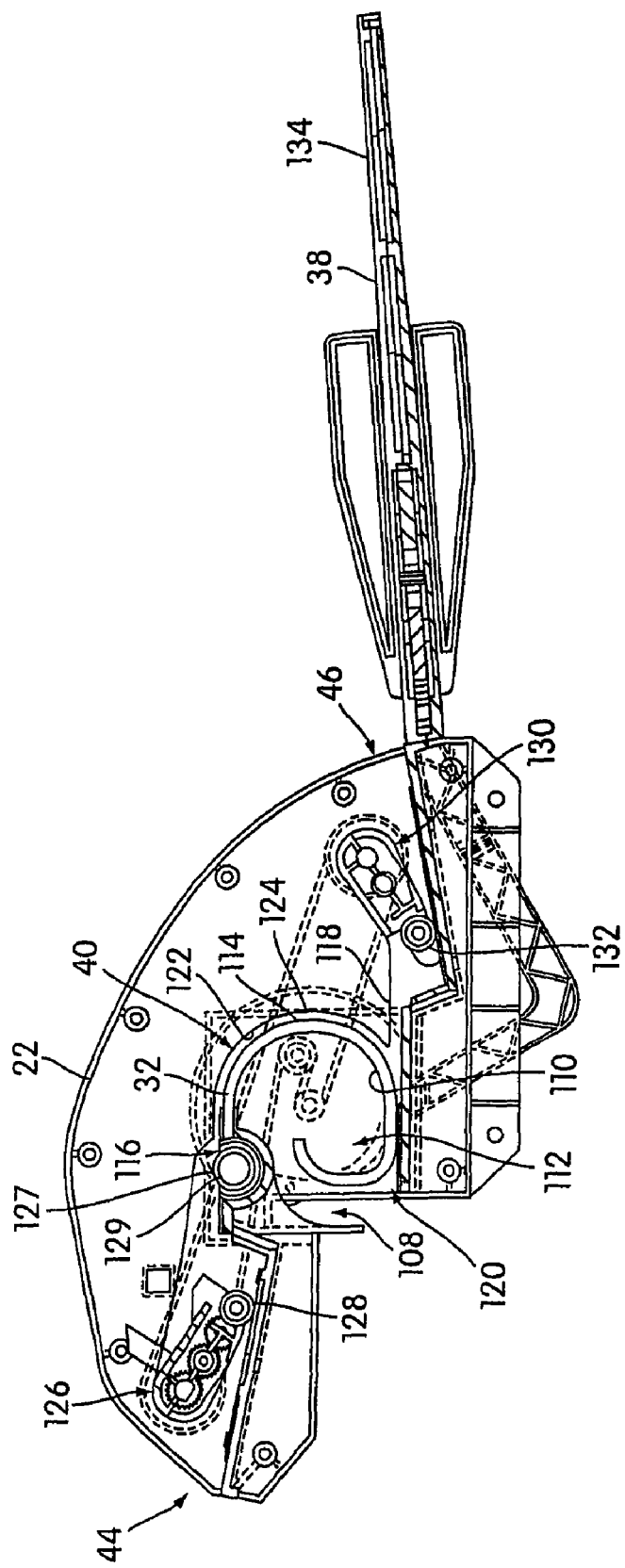
FIG. 21 is a partial cross-sectional view of the document guide shown in FIG. 20, the input tray in the second position.

The document guide 40 includes a first document receiving end 116, a second document receiving end 118, and a document discharging end 120. The first document receiving end 116 is positioned adjacent the feed tray 38 when it is in its first position (see FIG. 20) for enabling the document to be advanced from the feed tray 38 into the document guide 40. The document discharging end 120 is lower than the first document receiving end 116 and is generally aligned with the pair of cooperating structures 26, 28 to discharge the document to the pair of cooperating structures 26, 28. In use, the arcuate configuration of the document guide 40 routes the document therethrough in a direction generally away from the pair of cooperating structures 26, 28 past the leading portion of the selected length of stock material 14 and then back towards the pair of cooperating structures 26, 28 via the document discharging end 120. The second document receiving end 118 is positioned adjacent the feed tray 38 when it is in its second position (see FIG. 21) for enabling the document to be advanced from the feed tray 38 into the document guide 40. The document discharging end 120 is generally aligned with the second document receiving end 118 and is generally aligned with the pair of cooperating structures 26, 28 to discharge the document to the pair of cooperating structures 26, 28. In use, the document guide 40 routes the document directly towards the pair of cooperating structures 26, 28.

It should be understood that the document guide 40 positions the document generally adjacent the cooperating structures 26, 28 such that it can engage the cooperating structures 26, 28 and be guided into the folded intermediate portion 68 of the selected length of stock material 14. It is not necessary for the document to be guided directly between the cooperating structures 26, 28, although this alignment may be preferred in certain applications.

As noted above, the feed tray 38 is movable between a first or top loading position (as shown in FIGS. 1-5, 20, 22) and a second or side loading position (as shown in FIGS. 6-10, 11, 21, 23). In the first position, the feed tray 38 is positioned adjacent the first document receiving end 116 of the document guide 40. This enables the document to be advanced from the feed tray 38 into the document guide 40 as aforesaid for enabling the document guide 40 to route the document by its arcuate configuration towards the pair of cooperating structures 26, 28. In the second position, the feed tray 38 is positioned adjacent the second document receiving end 118 of the document guide 40. This enables the document to be advanced directly from the feed tray 38 towards the pair of cooperating structures 26, 28.

In the illustrated embodiment, the document is advanced into the document guide 40 by a document feeder. Specifically, document feeder 126 is provided adjacent the first feed opening 44 within the frame 22 and document feeder 127 is provided adjacent the first document receiving end 116. The document feeders 126, 127 include respective rollers 128, 129 that are operable to advance a document that is inserted into the first feed opening 44 into the first document receiving end 116 of the document guide 40. Similarly, a document feeder 130 is provided adjacent the second feed opening 46 within the frame 22. The document feeder 130 includes a roller 132 that is operable to advance a document that is inserted into the second feed opening 46 into the second document receiving end 118 of the document guide 40.

Figure 22:
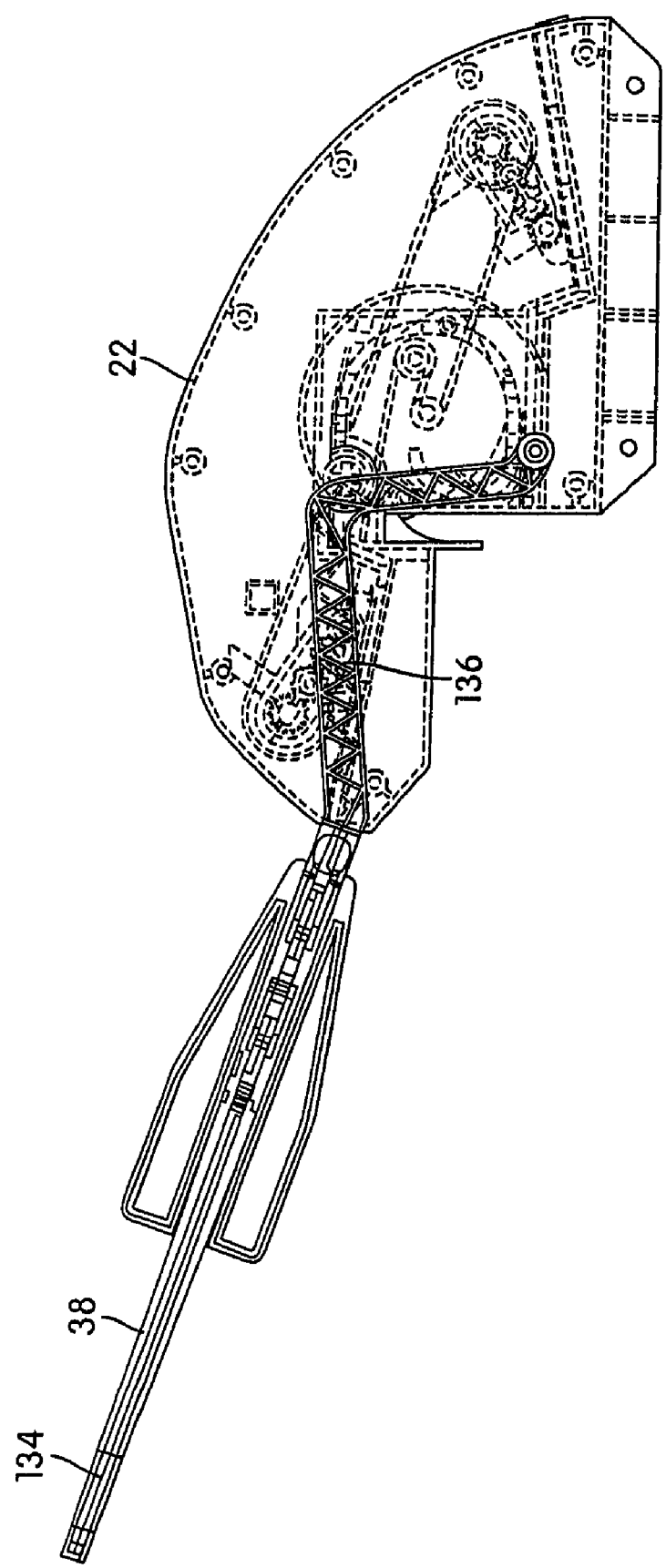
FIG. 22 is a partial cross-sectional view of the processing apparatus shown in FIG. 1 illustrating an embodiment of the input tray in the first position.
Figure 23:
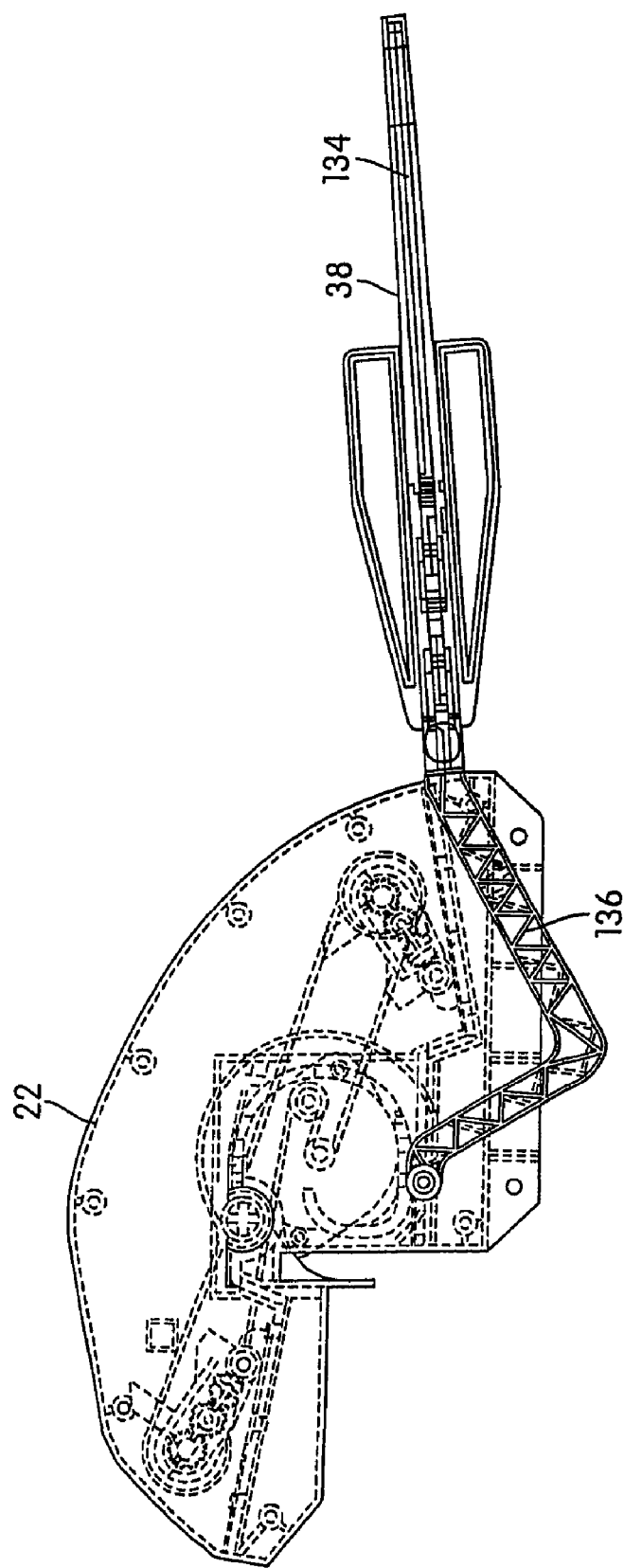
FIG. 23 is a partial cross-sectional view of the input tray shown in FIG. 22 in the second position.

In the illustrated embodiment, the feed tray 38 is pivotally mounted to the frame 22 for selective movement between the first and second positions. Specifically, the feed tray 38, includes a tray member 134 and a generally L-shaped arm member 136 that extends outwardly from the tray member 134, as shown in FIGS. 22 and 23. The arm member 136 is pivotally mounted to the frame 22 to enable the pivotal movement. In both first and second positions, the tray member 134 provides a supporting surface that is positioned to support a document in a substantially flat condition as the document is being fed into the frame 22.

The two-position feed tray 38 minimizes the footprint area of the laminator 10 and provides an effective way to present high weight papers to the cooperating structures 26, 28. Specifically, when the feed tray 38 is in the first position, the feed tray 38 is supported above the frame 22 and the document is guided down the arcuate portion of the document guide 40. This provides a low footprint configuration which saves space as the feed tray 38 does not extend outwardly from the laminator 10. The only disadvantage of the first position is that high weight documents, e.g., cardboard, do not bend easily and it would be difficult to feed the high weight documents through the arcuate portion of the document guide 40. When the feed tray is in the second position, the feed tray 38 is aligned with the cooperating structures 26, 28 so that high weight documents can be fed directly into the cooperating structures. 26, 28 without having to pass through the arcuate portion of the document guide 40.

Figure 17:
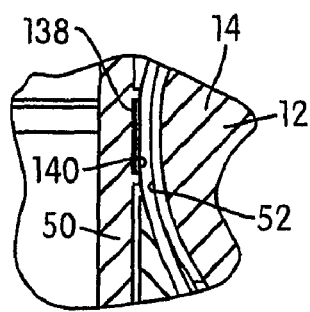
FIG. 17 is an enlarged view of a portion of FIG. 16.

As noted above, the laminator 10 includes a controller adapted to receive data and perform one or more operations based on the received data. The laminator 10 also includes a data input for transmitting data to the controller. In the illustrated embodiment, the data input 138 is positioned in the input tray 50 and communicates with the cartridge 52 when the cartridge 50 is mounted therein as best shown in FIGS. 16 and 17.

Specifically, the cartridge 50 includes a machine readable non-volatile memory 140, e.g., EPROM, containing stock material data. The memory 140 includes a data output adapted to establish communication with the data input 138 for enabling the stock material data to be transmitted to the controller for use by the controller.

The stock material data may relate to at least one characteristic of the supply of the stock material 14. For example, the at least one characteristic may be an amount of stock material 14 remaining in the supply, a temperature to which the laminator unit 24 should be heated for activating the adhesive, a speed at which the stock material 14 should be advanced through the laminator unit 24, a thickness of the stock material 14, a characteristic of the adhesive, and a width of the cartridge 50. However, the stock material data may relate to any other suitable characteristic of the supply of the stock material 14.

Also, the memory 140 may be a machine readable/writable non-volatile memory having a data input. Thus, the memory 140 may receive data and enable this data to be read, for example, by the controller for use in operating the laminator 10. For example, the cartridge 52 may have a sensor (not shown), e.g., encoder, for monitoring the amount of stock material 14 being depleted from the supply. The sensor has a data output communicated to the data input of the memory 140 to establish communication between the sensor and the memory 140. The sensor updates the stock material data relating to the amount of stock material 14 remaining in the supply, e.g., length of stock material 14 remaining, via the communication established by the data output of the sensor and data input of the memory 140 as the amount of stock material 14 in the supply is depleted. The data input and output may be provided in any suitable manner, such as contacts that are engaged when the cartridge 52 is mounted in its operative position, or by a wireless transmission such as BLUETOOTH. The connection between the sensor and the memory 140 may be direct, or indirect, such as through the controller. The sensor may also monitor the amount of stock material 14 being dispensed so the controller can determine when the feeder system 30 should cease feeding.

The sensor may monitor the supply of stock material 14 in any suitable manner. For example, the sensor may be positioned adjacent the discharge portion of the cartridge 52 and monitor the exiting stock material 14. In another embodiment, the sensor may monitor motor rotation or motor resistance of the feeder system 30.

For example, the sensor may be a Hall effect sensor on one of the rollers of the feeding system 30. For each rotation of the roller, a periodic pulse may be generated by the Hall effect sensor, and for each pulse, a value in the memory 140 may be increased by one. Since each rotation of the Hall effect sensor corresponds to a specific length being unwound from the supply, the value stored in the memory 140 will correspond to the amount of material that has been unwound. This information may be used to display the amount of material left to the user via a user interface display (such as in terms of percentage or with a bar-type meter). Also, the interface can display a warning when the supply only has a certain amount left (e.g., less than three feet). Because the memory is non-volatile, the cartridge can be removed, and upon replacement the stored information may again be read for the same purposes.

The controller may be associated with a user interface, such as an LED display, that visually indicates working conditions of the laminator, e.g., power indication, stock material supply, roller temperature, etc.

Operation of the laminator 10 will now be described in greater detail. First, a cartridge 52 is mounted to the frame 22 in an operative position wherein communication is established between the data output of the memory 140 and the data input 138 for enabling the stock material data to be transmitted to the controller for use by the controller. The controller may perform one or more operations based on the stock material data received from the memory. For example, the controller may activate the laminator unit 24 to preheat the nip rollers 94, 96, 98, 100 to an operating temperature and to set the rotating speed of the nip rollers 94, 96, 98, 100. The speed and temperature may be based on the characteristics of the stock material 14, e.g., thickness of the stock material, which are stored in the memory 140.

Then, a selected length of the stock material 14 is fed by the feeder system 30 from the supply in the feeding direction F so that the intermediate portion 68 of the selected length of stock material 14 is positioned adjacent the cooperating structures 26, 28. The operation of the feeder system is controlled by the controller to feed the selected length of stock material. The selected length of the stock material may be determined from the memory 140 of the cartridge 52. The leading portion 64 of the selected length passes beyond the pair of cooperating structures 26, 28 and is received in the reservoir 32 in a compact configuration, as shown in FIG. 24. The feeder system 30 ceases feeding stock material 14 when half of the selected length is past the cooperating structures 26, 28 and half of the selected length precedes the cooperating structures 26, 28. The half of the selected length past the cooperating structures 26, 28 constitutes the leading portion 64, and the half of the selected length preceding the cooperating structures 26, 28 constitutes the trailing portion 66.

Figure 26:
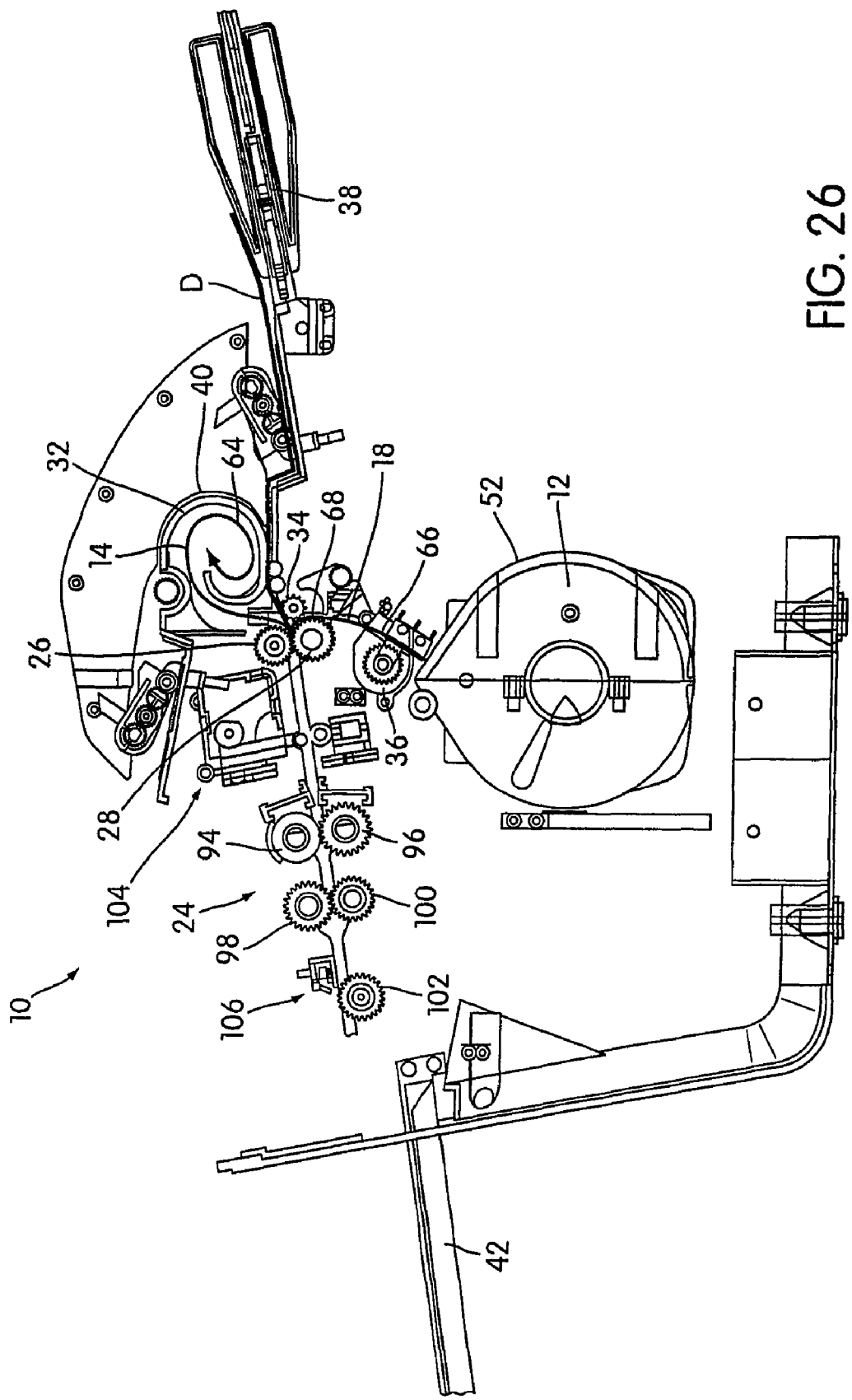
FIG. 26 is a cross-sectional view similar to FIG. 25 illustrating a document being engaged with the folded portion of the stock material.

As shown in FIG. 25, the folder member 34 is actuated by the laminator controller to move to the engaged position to form the fold in the intermediate portion 68 and to urge the folded intermediate portion 68 in between the cooperating structures 26, 28. The folder member 34 is actuated when the selected length of stock material 14 has been fed by the feeder system 30. Then, as shown in FIG. 26, a document D is advanced from the feed tray 38 into the document guide 40, through the document guide 40 and out from the discharge end 120 to the cooperating structures 26, 28, and into the folded intermediate portion 68 of the stock material 14. The adhesive of the stock material 14 faces generally away from the cooperating structures 26, 28 so that the document D adheres thereto.

Figure 27:
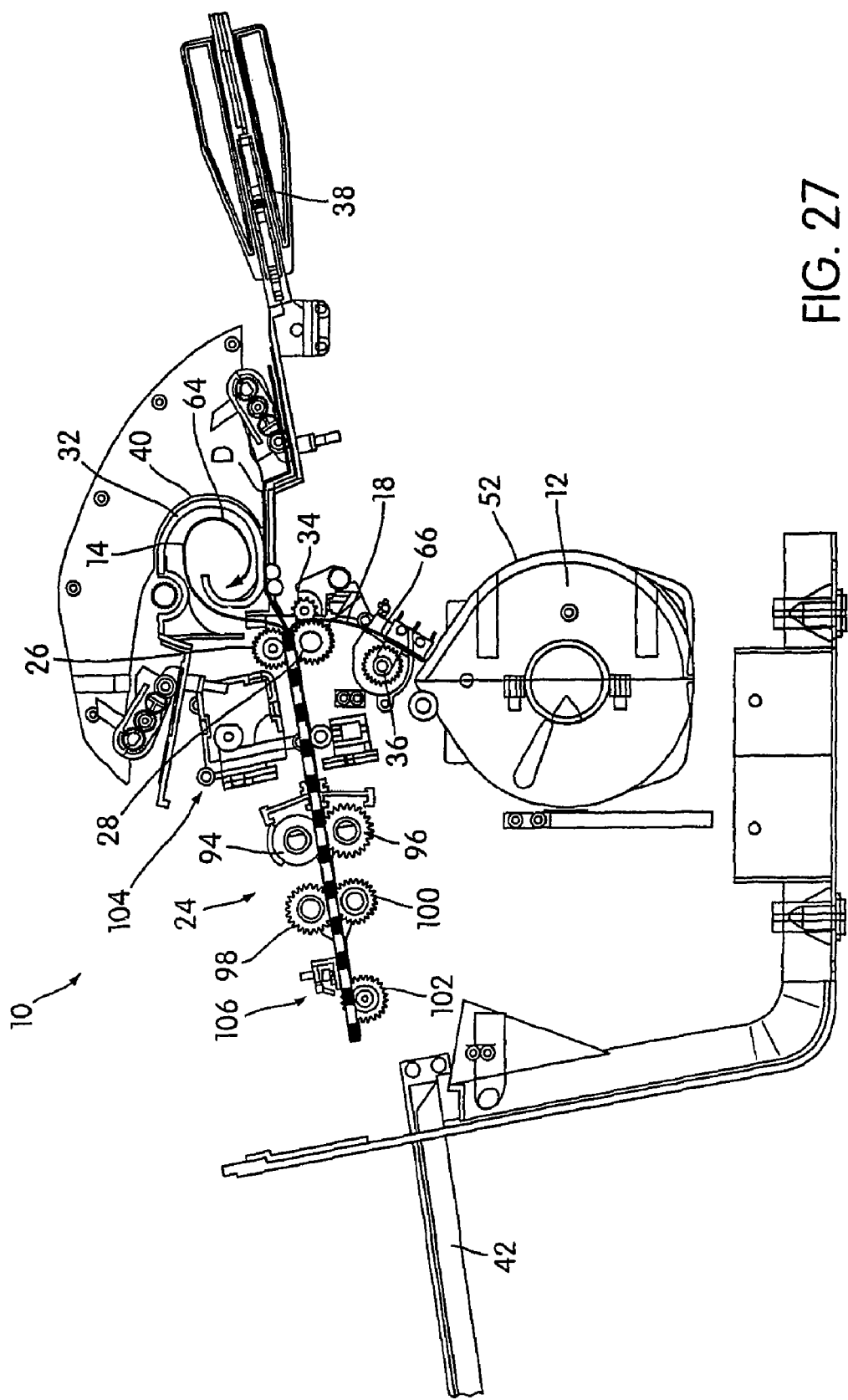
FIG. 27 is a cross-sectional view similar to FIG. 26 illustrating the document being advanced through the laminator unit with the stock material on opposing sides thereof.
Figure 28:
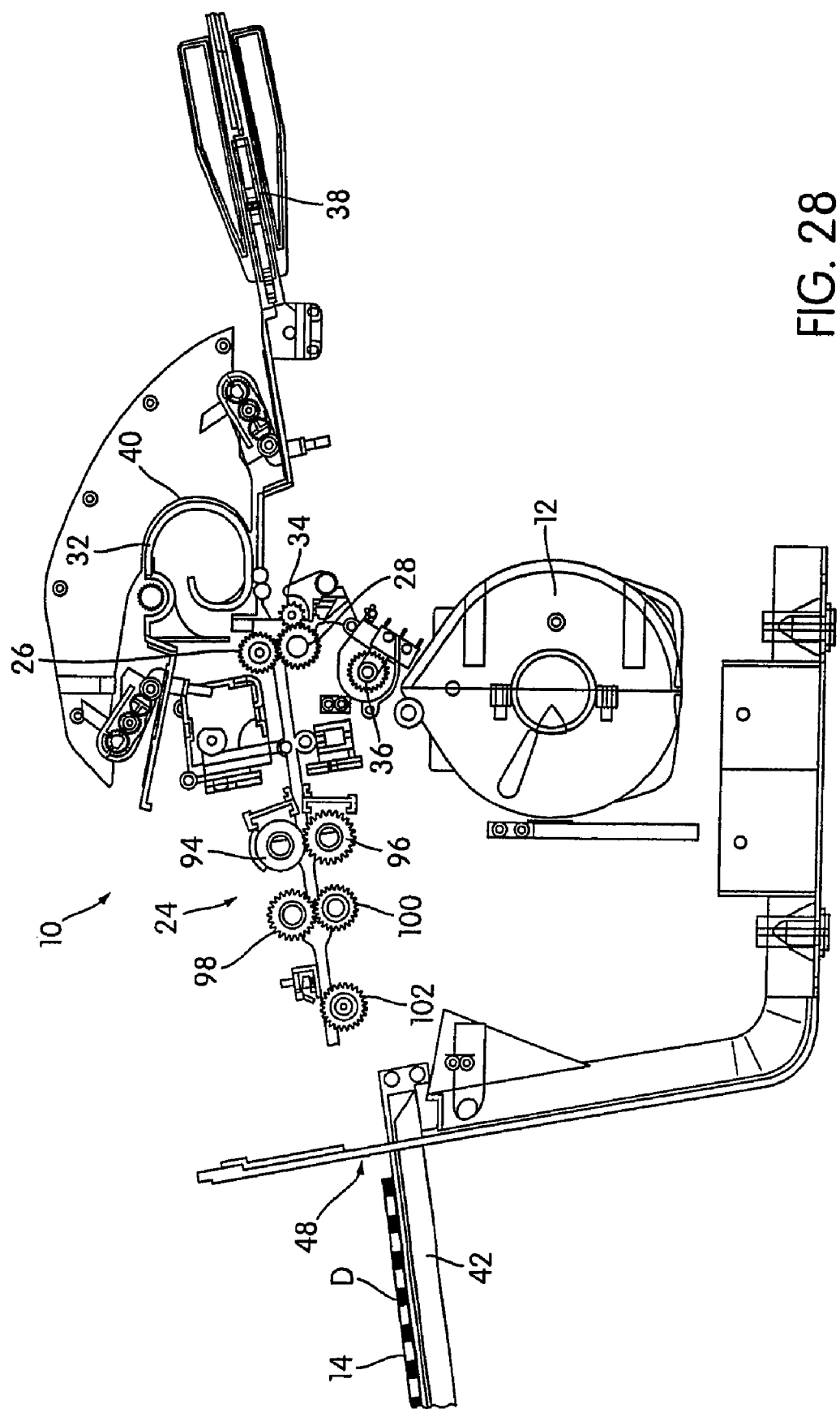
FIG. 28 is a cross-sectional view similar to FIG. 27 illustrating the laminated document supported on the discharge tray.

As shown in FIG. 27, the pair of cooperating structures 26, 28 are actuated to feed the document D into the laminator unit 24 with the leading and trailing portions 64, 66 of the selected length of stock material 14 on opposing sides of the document D. The document D and leading and trailing portions 26, 28 of the selected length are advanced through the nip rollers 94, 96, 98, 100 of the laminator unit 24 which activates the adhesive, thereby bonding the leading and trailing portions 26, 28 to the opposing sides of the document D. The cutter 36 is actuated by the laminator controller to cut the selected length from the remainder of the stock material 14. Specifically, the laminator controller determines the selected length of the stock material 14 from the memory 140 of the cartridge 52, and the laminator controller actuates the cutter 36 to cut the trailing portion of the stock material 14 at the appropriate length. As shown in FIG. 28, the final laminated document D passes through the discharge opening 48 and the discharge tray 42 supports the final laminated document D in a substantially flat condition.

It should be noted that the stock material 14 could be fed longer than needed past the cooperating structures 26, 28, cut by the cutter 36, and then the stock material 14 could be advanced in a direction opposite the feeding direction F until the intermediate portion of the stock material 14 is aligned with the cooperating structures 26, 28. Also, the stock material 14 could be cut at the selected length even after some of the film is being advanced into the laminator unit 24 by the cooperating structures 26, 28.

Figure 29:
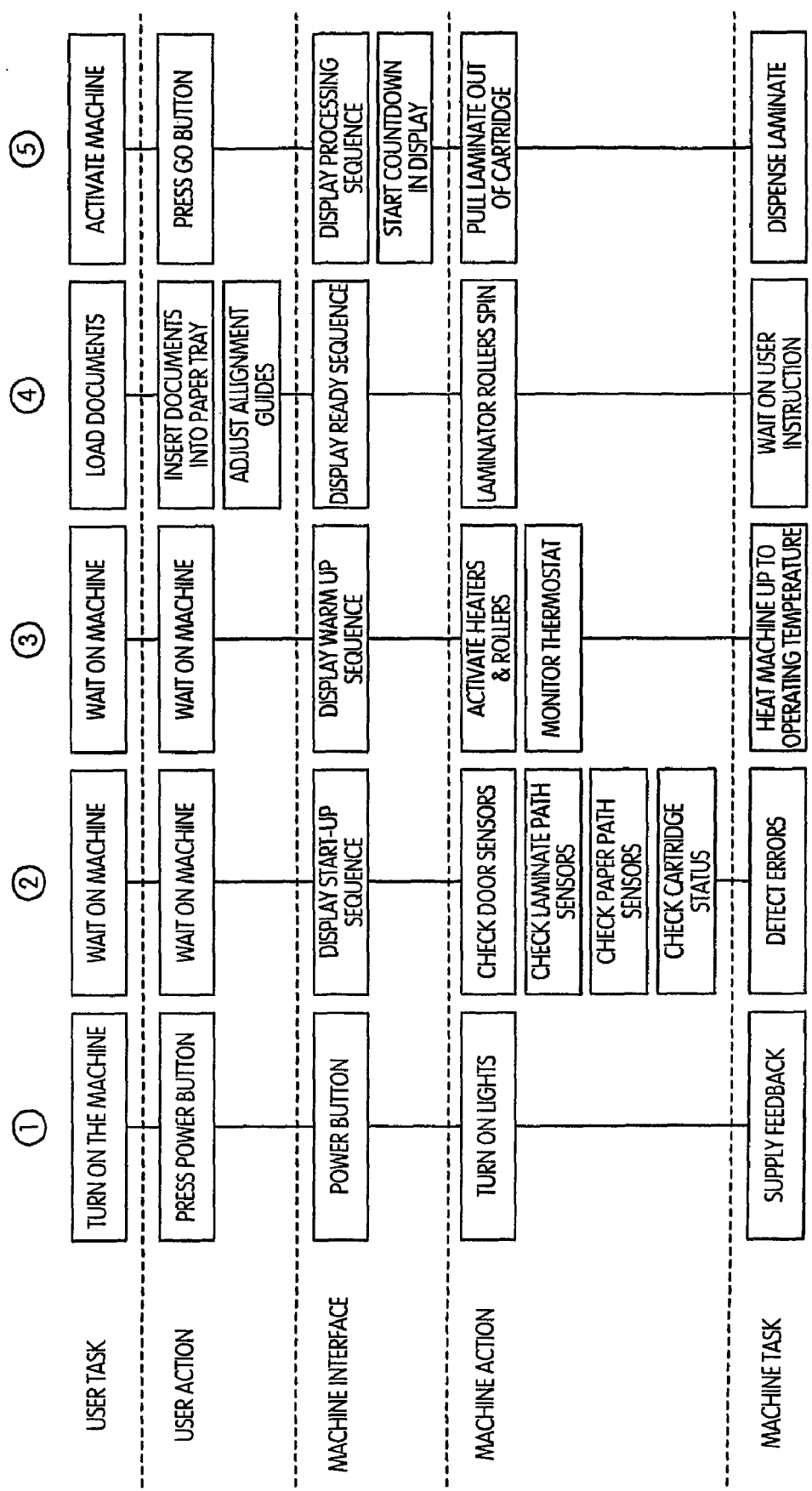
FIGS. 29-31 are flow charts illustrating an embodiment of the interaction between the user and the processing apparatus or the present invention.
Figure 30:
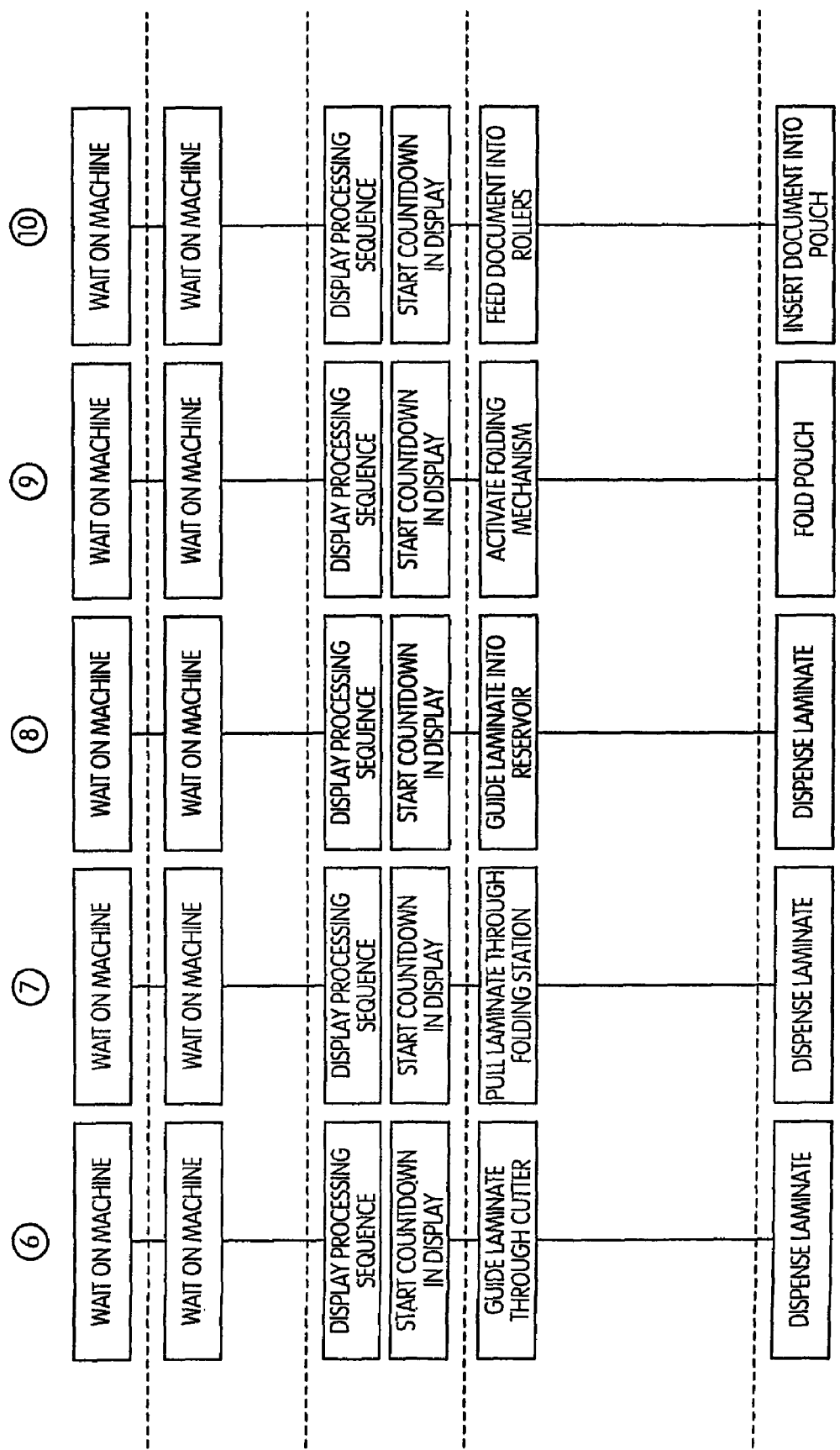
Figure 31:
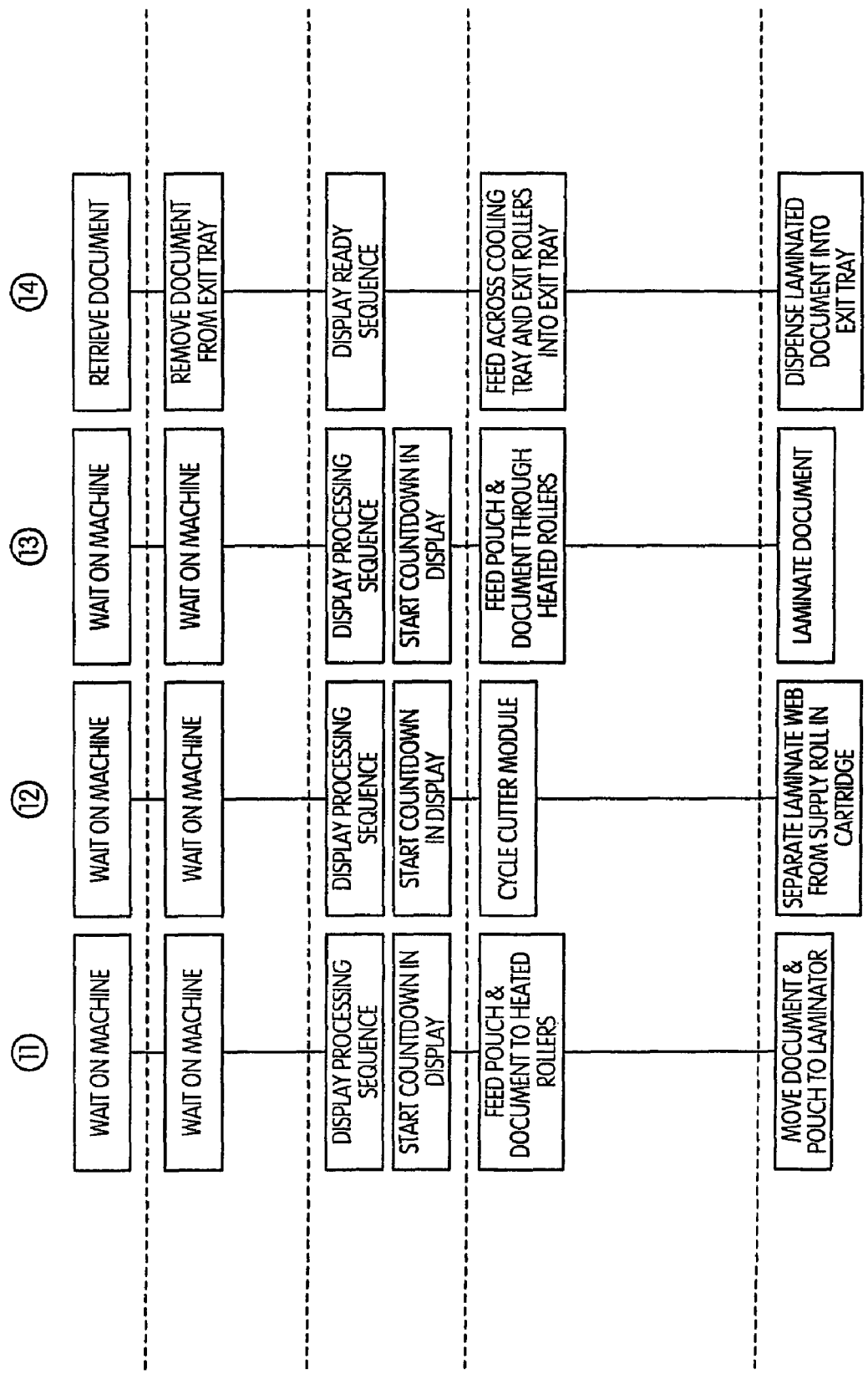
Figure 32:
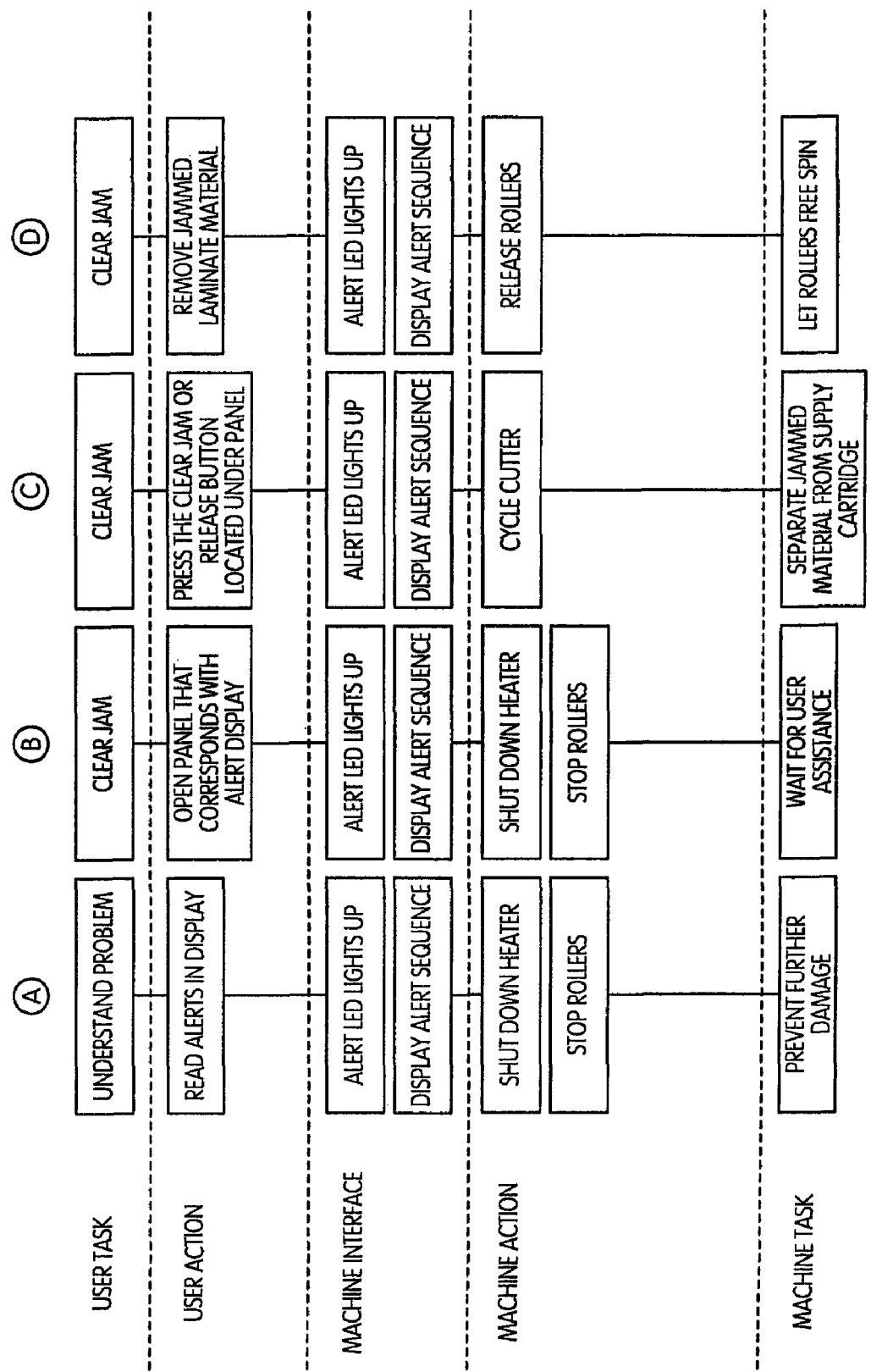
FIG. 32 is a flow chart illustrating an embodiment of the interaction between the user and the processing apparatus of the present invention in an error sequence.

FIGS. 29-31 are flow charts that illustrate an embodiment of the interaction between the user and the laminator 10 during a laminating operation. Also, FIG. 32 is a flow chart that illustrates an embodiment of the interaction between the user and the laminator 10 during an error sequence.

Figure 33:
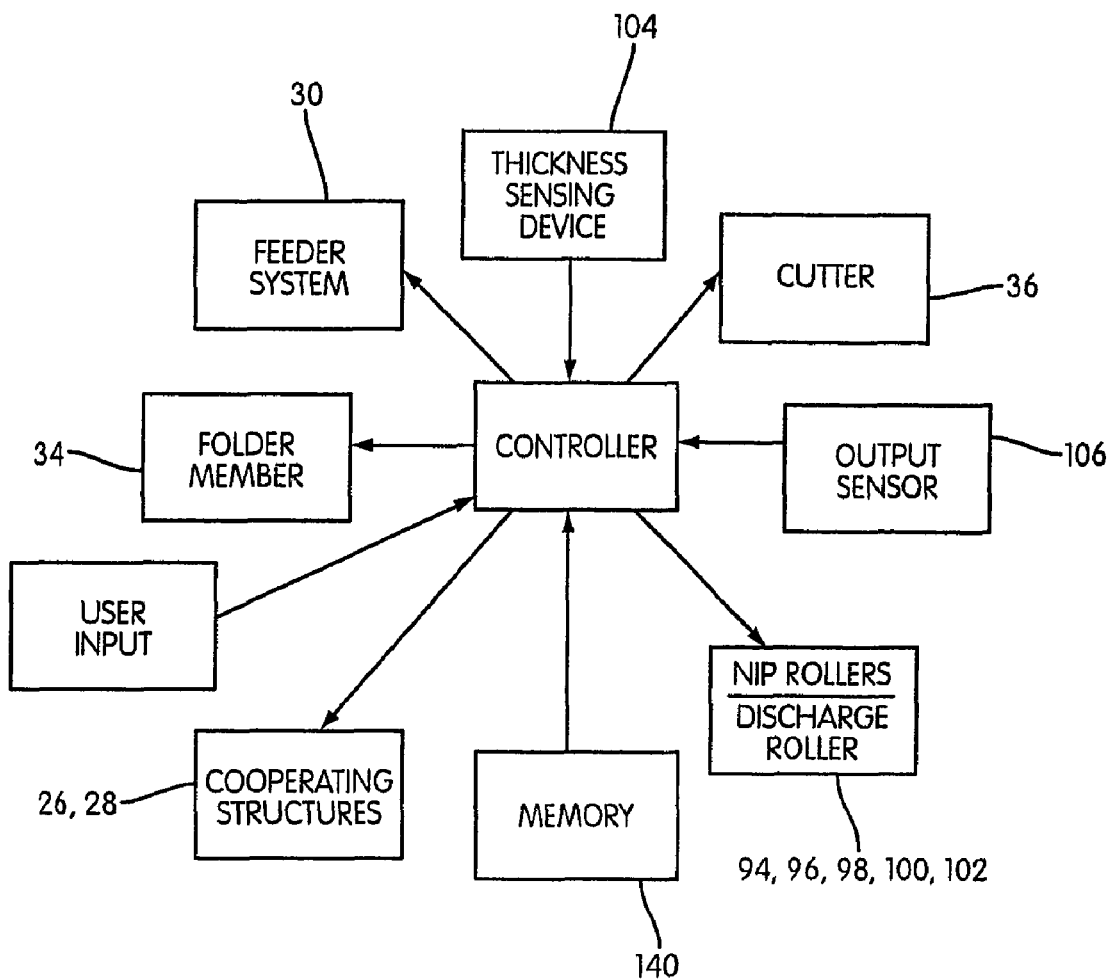
FIG. 33 is a flow chart illustrating an embodiment of the interaction between the controller the processing apparatus shown in FIG. 1.
Figure 34:
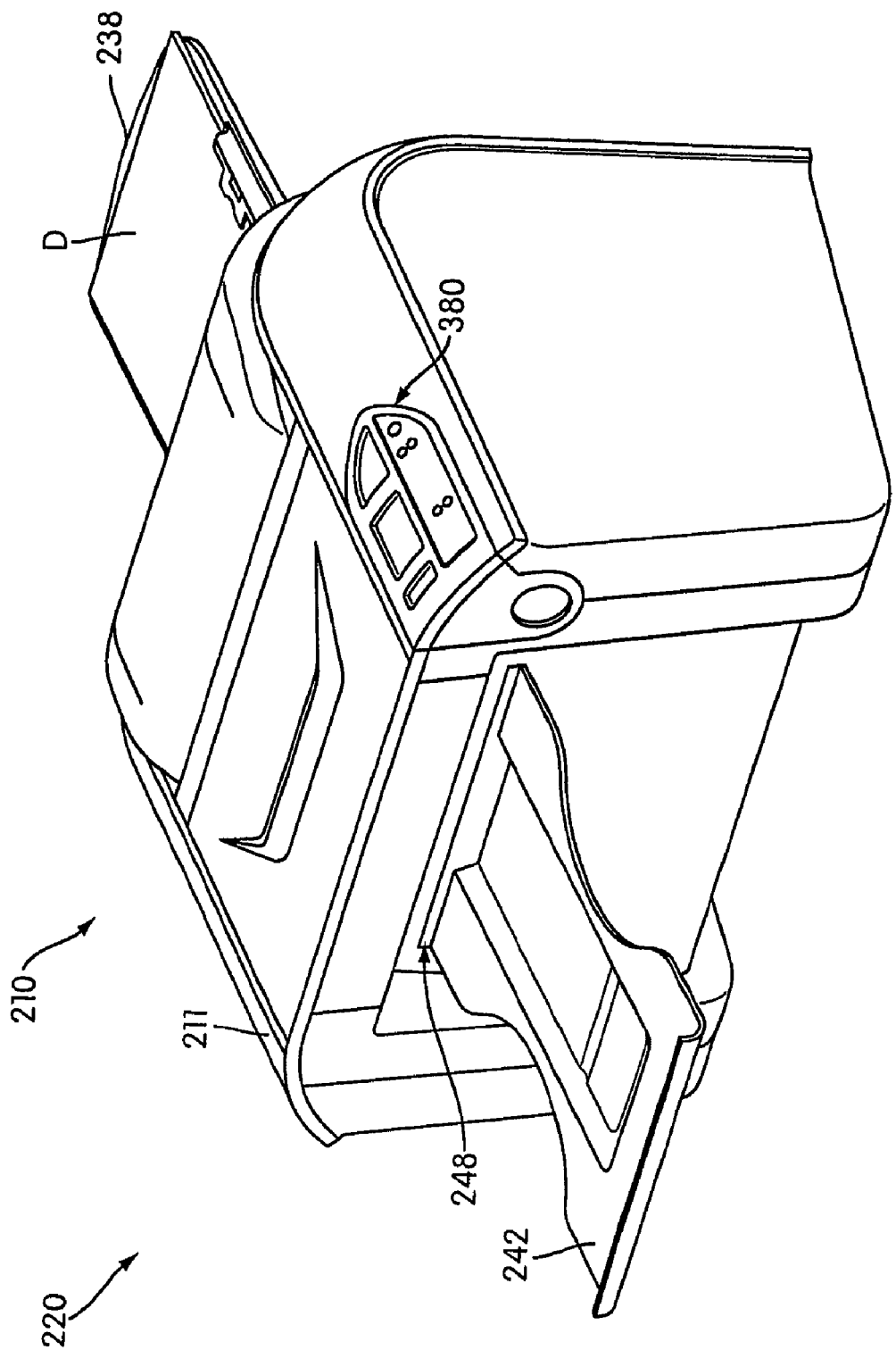
FIG. 34 is a rear and left side perspective view of another embodiment of a processing apparatus of the present invention.
Figure 35:
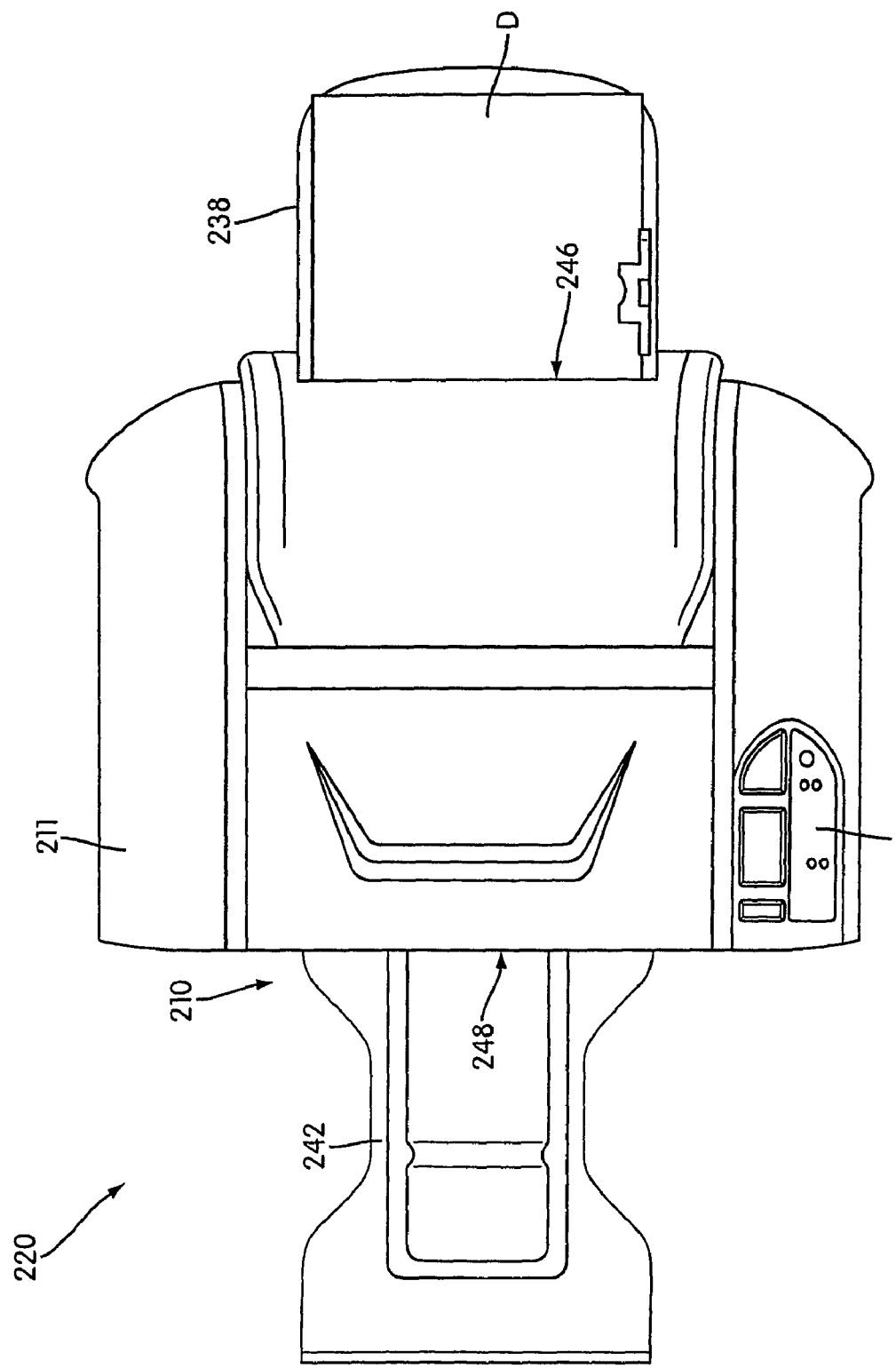
FIG. 35 is a top view of the processing apparatus of FIG. 34.
Figure 36:
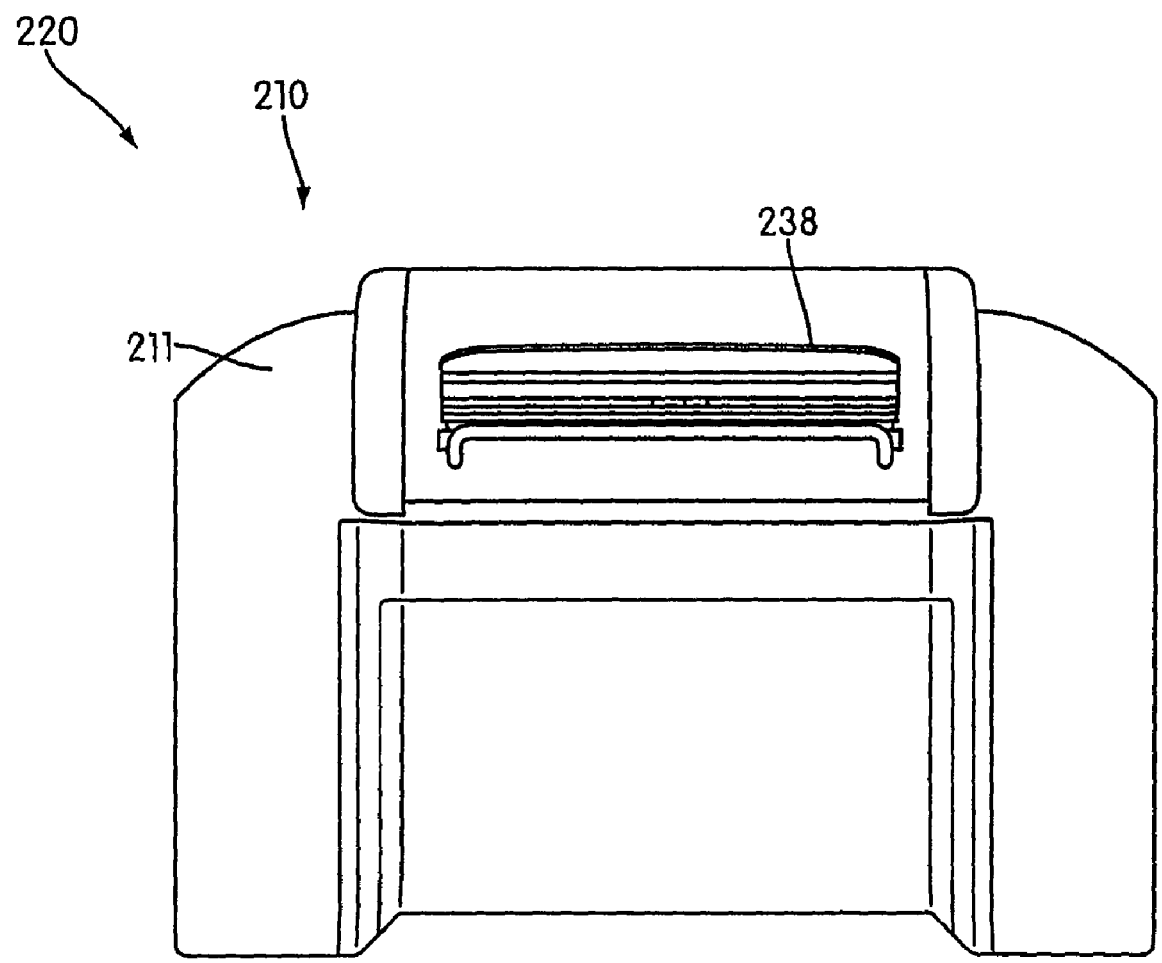
FIG. 36 is a front view of the processing apparatus of FIG. 34.
Figure 37:
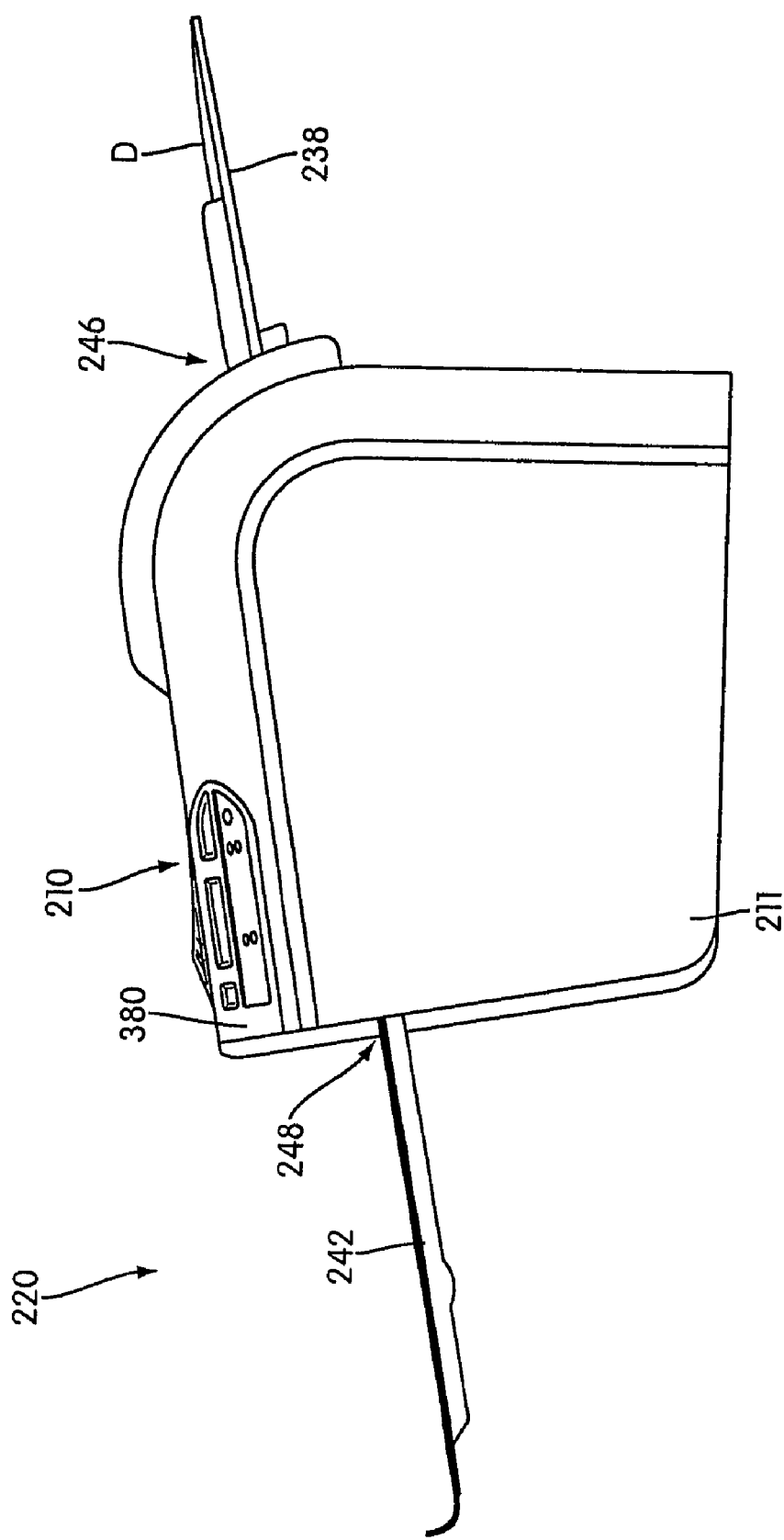
FIG. 37 is a left side view of the processing apparatus of FIG. 34.

FIG. 33 is a flow chart that illustrates an embodiment of the interaction between the controller and the various components of the laminator 10. For example, the controller may receive data from the memory 140, the thickness sensing device 103, the output sensor 106, and/or user input. Based on the received data, the control may control actuation and operation of the feeder system 30, the folder member 34, the cooperating structures 26, 28, the cutter 36, and the rollers 94, 96, 98, 100, 102. However, operation of the laminator may be controlled in any other suitable manner. The controller may be a processor-based controller driven by appropriate software, or it may be entirely hardware driven. Also, the controller may be comprised of two separate controllers that each handle certain designated functions.

FIGS. 34-37 illustrate an embodiment of a document processing apparatus 210 for performing a processing operation on a selected document D. The selected document or master may be any type of substrate desired to be processed, including, but not limited to, photographs, brochures, transparencies, articles, drawings, computer printouts, etc. In the illustrated embodiment, the document processing apparatus 210 is in the form of a laminator for laminating opposing sides of a document. However, it is contemplated that other variations of processing operations may be performed with the processing apparatus 210.

As shown in FIGS. 34-37 and 56-60, the apparatus 210 includes a housing 211 that substantially surrounds and protects the main components of the apparatus 210. The main components of the apparatus 210, which will be discussed in further detail below, include a frame 222; a laminator unit 224 provided on the frame 222; a pair of cooperating structures 226, 228 operable to feed documents into the laminator unit 224; a feeder system 230 operable to feed a selected length of stock material 214 from a supply in a feeding direction F; a reservoir 232 provided beyond the pair of cooperating structures 226, 228 in the feeding direction F; a folder member 234 operable to urge a portion of the selected length of the stock material 214 in between the cooperating structures 226, 228, a cutter 236 positioned between the supply of stock material 214 and the pair of cooperating structures, 226, 228 in the feeding direction F; a generally upwardly facing feed tray 238 for receiving the document D; a document guide 240 constructed to guide the document D to the pair of cooperating structures 226, 228; and a generally upwardly facing discharge tray 242 for receiving the laminated document.

The apparatus 210 is constructed for use with a single feed roll 212 which carries the supply of stock material 214 that is wound around a central core 216 (see FIG. 39) (although various aspects of the invention may be practiced with multiple roll laminators). The stock material 214 has an adhesive (preferably heat activated) provided on an adhesive carrying surface 218 thereof. The adhesive carrying surface 218 is preferably on the inside of the stock material 214 when the stock material 214 is wound on the core 216. The supply of stock material 214 and the apparatus 210 can together be referred to as a laminator system 220. In use, the apparatus 210 is operable to unwind the supply of stock material 214 on the feed roll 212 and apply the stock material 214 to opposing sides of the document, as discussed in further detail below.

The above-noted apparatus components will now be described in greater detail. As shown in FIGS. 34-37, the housing 211 includes a feed opening 246, and a discharge opening 248. In the illustrated embodiment, the feed opening 246 is provided on a front wall of the housing 211, and the feed tray 238 is located adjacent the feed opening 246 (terms such as "front" and "rear" are used for convenience in reference to FIGS. 34-37, and are not intended to be limiting in any way). As the document D passes through the feed opening 246 and into the housing 211 and frame 222 interior, the document guide 240 within the frame 222 guides the document to the pair of cooperating structures 226, 228 which feeds the document and stock material 214 to the laminator unit 224. The document D emerges from the discharge opening 248 with the stock material 214 affixed thereto. The discharge tray 242 is positioned adjacent the discharge opening 248 at the rear of the housing 211 and is structured to receive the laminated document. The discharge tray 242 may be movably or fixedly mounted to the housing 211 or the frame 222. The frame 222 also includes a supply receiving portion 250, shown in greater detail in FIGS. 52-55 that is constructed to receive the feed roll 212 carrying the supply of stock material 214 in an operative position, as discussed in greater detail below.

Figure 38:
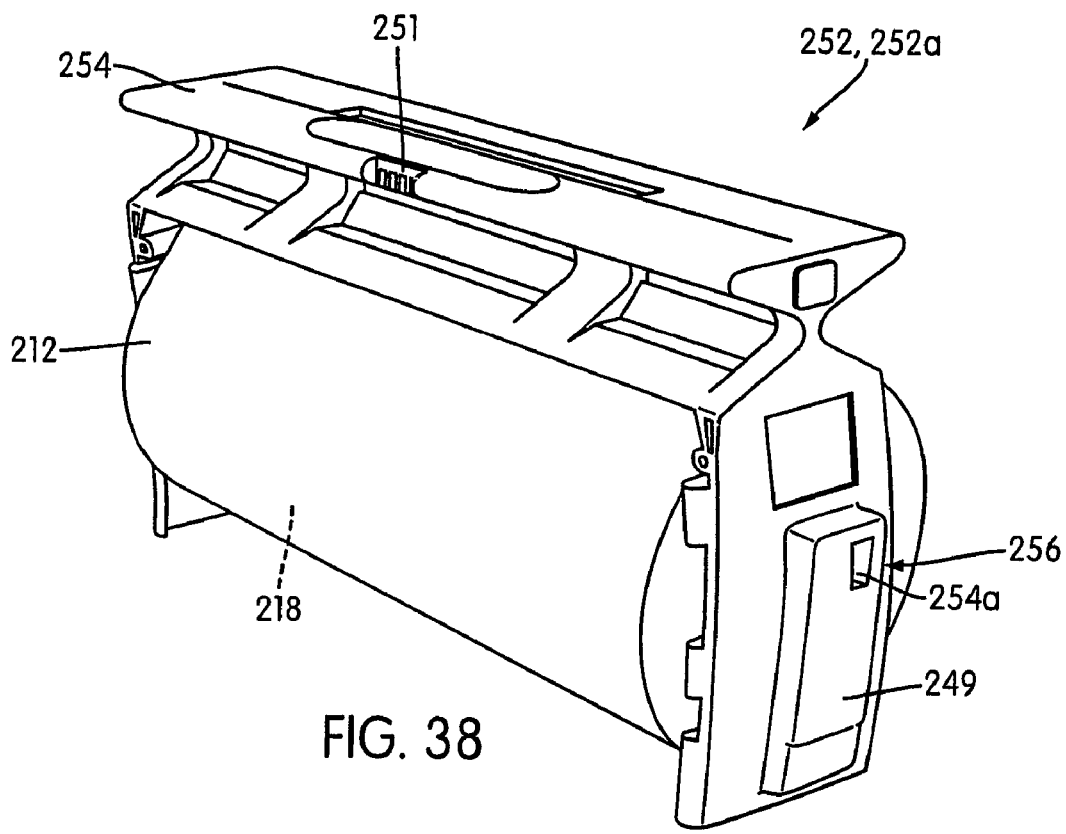
FIG. 38 is a rear and left side perspective view of an embodiment of a cartridge for use in the processing apparatus of FIG. 34.
Figure 39:
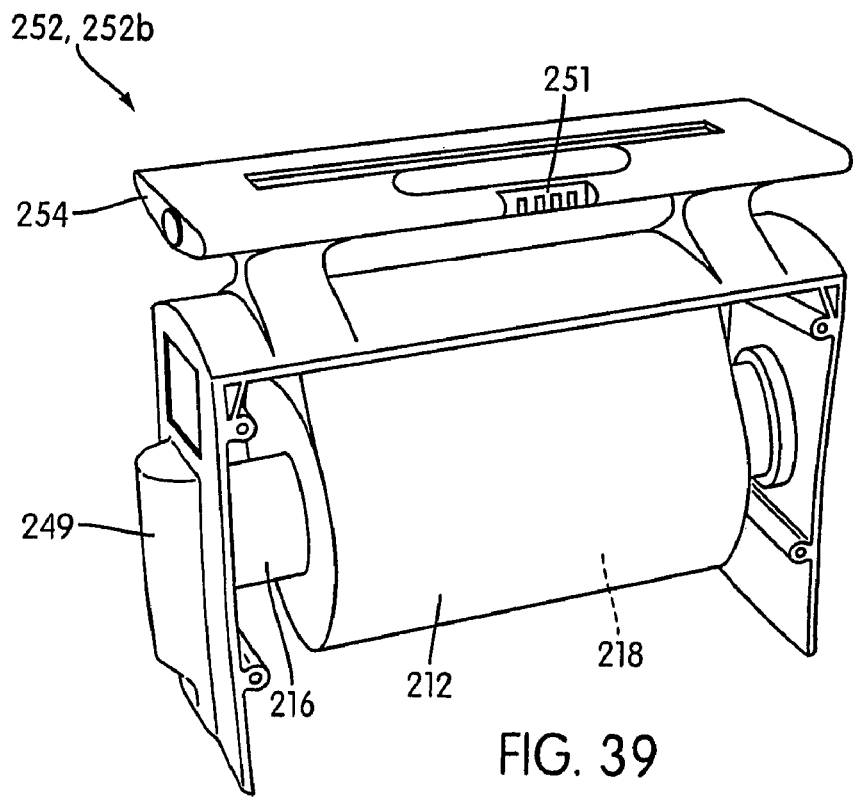
FIG. 39 is a rear and right side perspective view of an embodiment of a cartridge for use in the processing apparatus of FIG. 34.
Figure 40:
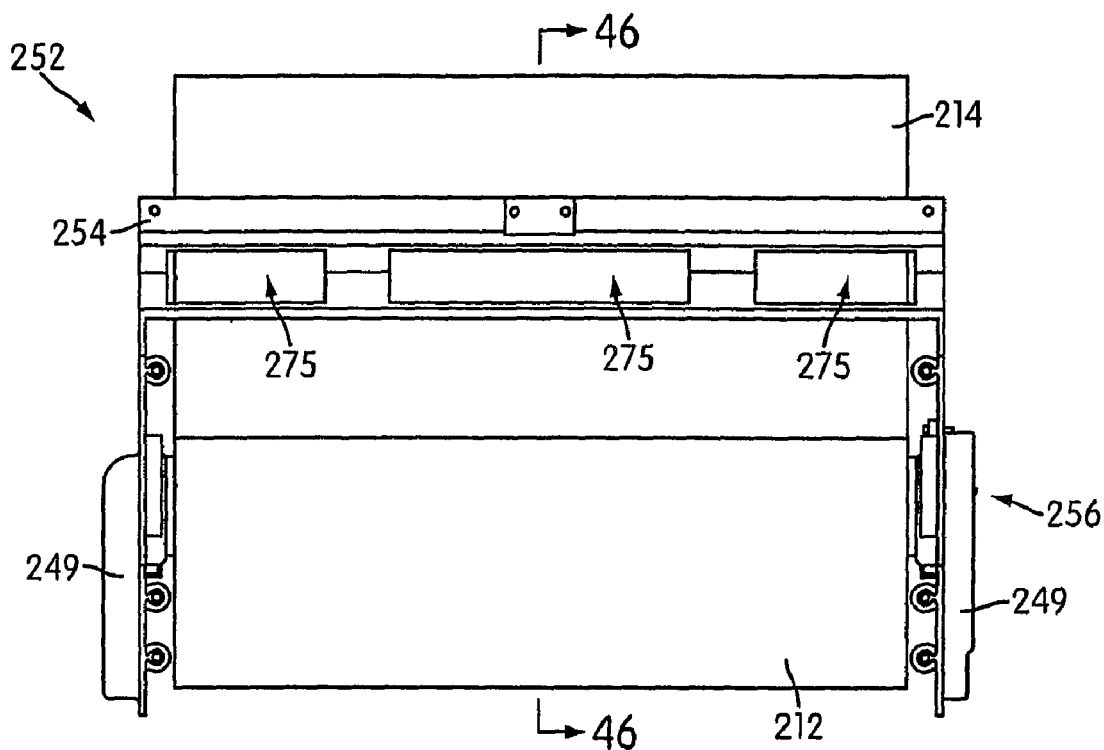
FIG. 40 is a rear view of an embodiment of a cartridge for use in the processing apparatus of FIG. 34.
Figure 41:
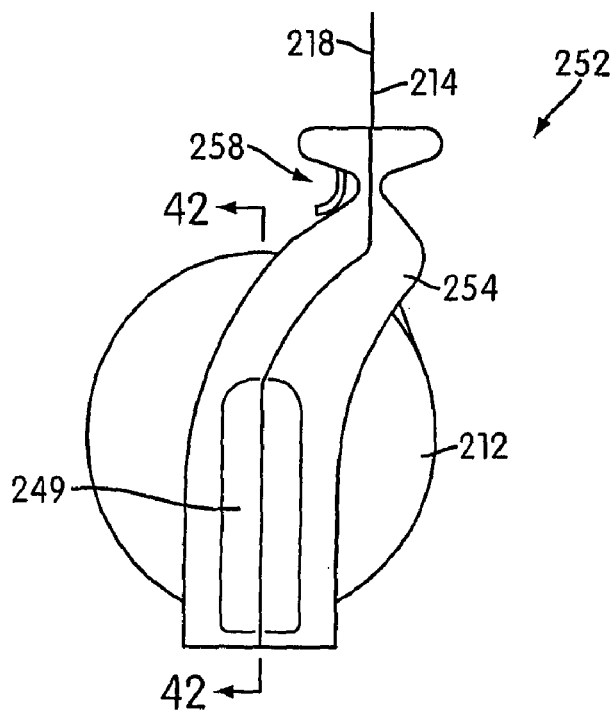
FIG. 41 is a right side view of the cartridge of FIG. 40.

In the illustrated embodiment, shown in FIGS. 38-41, the feed roll 212 is mounted within a cartridge 252 to facilitate easy removal and replacement of the feed roll 212. The cartridge 252 includes a body 254 constructed and arranged to rotatably support the feed roll 212 so that the stock material 214 may be unwound from the core 216. The cartridge 252 may be configured to mount and support feed rolls 212 having different widths. For example, the cartridge 252 may be configured to mount feed rolls 212 having a standard letter size paper width, A4 width, etc. In the illustrated embodiment, separate cartridges 252 are used to mount and support feed rolls 212 having different widths. For example, FIG. 38 illustrates a larger cartridge 252a with a feed roll 212 to be used when laminating A4 size documents, and FIG. 39 illustrates a smaller cartridge 252b with a feed roll 212 to be used when laminating A6 size documents. The illustrated embodiments are not intended to be limiting in any way.

In the illustrated embodiment, shown in greater detail in FIGS. 42 and 44, the core 216 is rotatably supported by the body 254 via a pair of hubs 217 that are received by the core 216 on each end such that the core 216 does not rotate relative to the hubs 217. In other words, the hubs 217 are press fit into the core 216 so that when the core 216 rotates, the hubs 217 rotate, and vice-versa. Each hub 217 is rotatably received by the body 254 such that when the stock material 214 is unwound from the core 216, the hubs 217 and the core 216 will rotate relative to the body 254 to facilitate a substantially smooth unwinding operation.

In an embodiment, the cartridge 252 also includes a first brake 256 (referred to as a supply brake) that is configured to engage the hub 217 to prevent or resist rotation of the core 216, as shown in FIGS. 42 and 43. This prevents the stock material 214 from unintentionally unrolling from the feed roll 212. The first brake 256 may include a finger 255 that is pivotally mounted to the body 254, and a spring 257, such as a torsion spring, that biases the finger 255 in a hub-engaging direction. The finger 255 has a first end 255a that engages the hub 217 and a second end 255b that protrudes through an opening 254a in the body 254 when the finger 255 is engaged with the hub 217. The first brake 256 may be disengaged from the hub 217 by moving the second end 255b of the finger against the bias of the spring 257, as shown in FIGS. 44 and 45. Of course, the first brake 256 may have any construction. Although only a single supply brake 256 is shown, it is also contemplated that a second supply brake may be used with the other hub 217 at the other end of the core 216. The illustrated embodiment is not intended to be limiting in any way.

Figure 46:
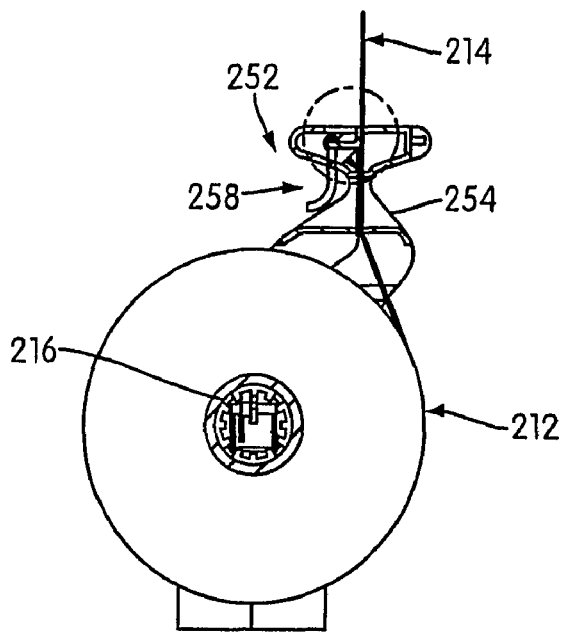
FIG. 46 is a cross-sectional view of the cartridge of FIG. 40 along line 46-46 with a lead end brake in an engaged position.
Figure 47:
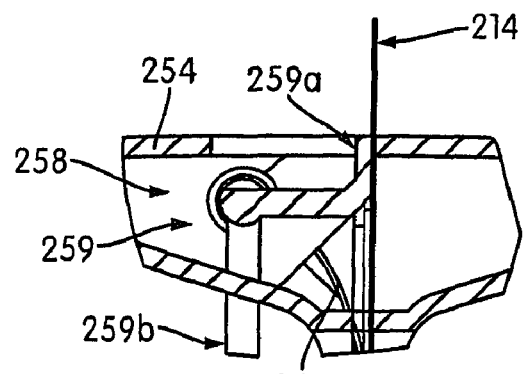
FIG. 47 is an enlarged view of a portion of FIG. 46.
Figure 48:
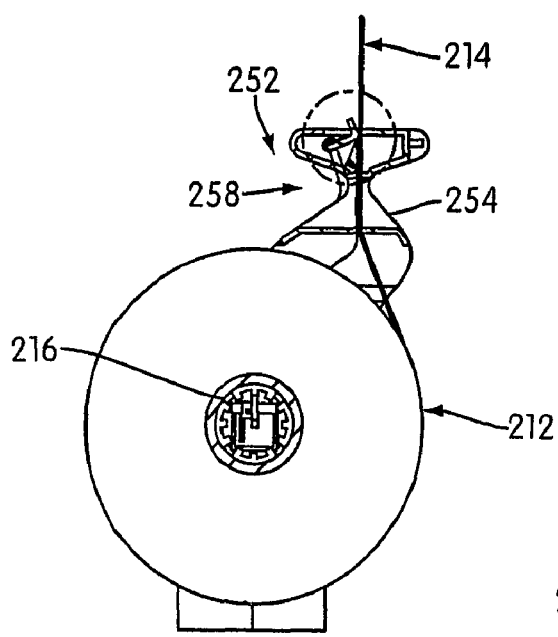
FIG. 48 is a cross-sectional view of FIG. 46 with the lead end brake in a disengaged position.
Figure 49:
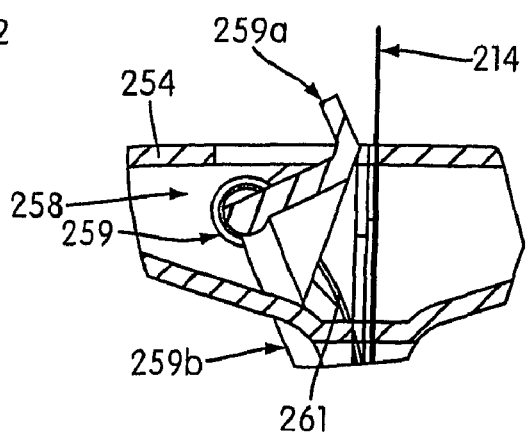
FIG. 49 is an enlarged view of a portion of FIG. 48.

As shown in greater detail in FIGS. 46-49, the cartridge 252 may also include a second brake 258 (referred to as a lead end brake) that is configured to engage a lead end portion of the stock material 214 to prevent or resist retraction of the lead end portion into the cartridge body 254. The second brake 258 may include a lever 259 and a spring 261 that biases the lever 259 in a stock material engaging position. The lever 259 may include a plurality of parts, or may be a single integral part. The lever 259 includes a first portion 259a that is configured to engage the stock material 214 and press the stock material 214 against the body 254 of the cartridge 252, thereby preventing or resisting retraction of the lead portion of the stock material 214 into the body 254, as shown in FIGS. 46 and 47. The lever also includes a second portion 259b that is distal from the first portion 259a. The first portion 259a may be disengaged from the stock material 214 by moving the second portion 259b against the bias of the spring 261, as shown in FIGS. 48 and 49. The second brake 258 may have any construction. Although a single lead end brake 258 is shown, it is contemplated that multiple lead end brakes may be used. Moreover, even though the first and second brakes 256, 258 are shown with a single roll cartridge 252, it is contemplated that the first and second brakes 256, 258 may also be used in cartridges with multiple rolls. The illustrated embodiment is not intended to be limiting in any way. The interaction of the first and second brakes 256, 258 with the rest of the apparatus 210 will be discussed in greater detail below.

In the illustrated embodiments, the cartridge 252 may also include a machine readable non-volatile memory 251, e.g., EPROM, that contains stock material data. The stock material data may relate to at least one characteristic of the supply of the stock material 214. For example, the at least one characteristic may be an amount of stock material 214 remaining in the supply, a temperature to which the laminator unit 224 should be heated for activating the adhesive, a speed at which the stock material 214 should be advanced through the laminator unit 224, a thickness of the stock material 214, a characteristic of the adhesive, and a width of the cartridge 252. However, the stock material data may relate to any other suitable characteristic of the supply of the stock material 214. The memory 251 will be discussed in further detail below, and reference may be made to the memory 140 discussed above and to the above-incorporated Ser. No. 60/623,236 application for further details.

Figure 50:
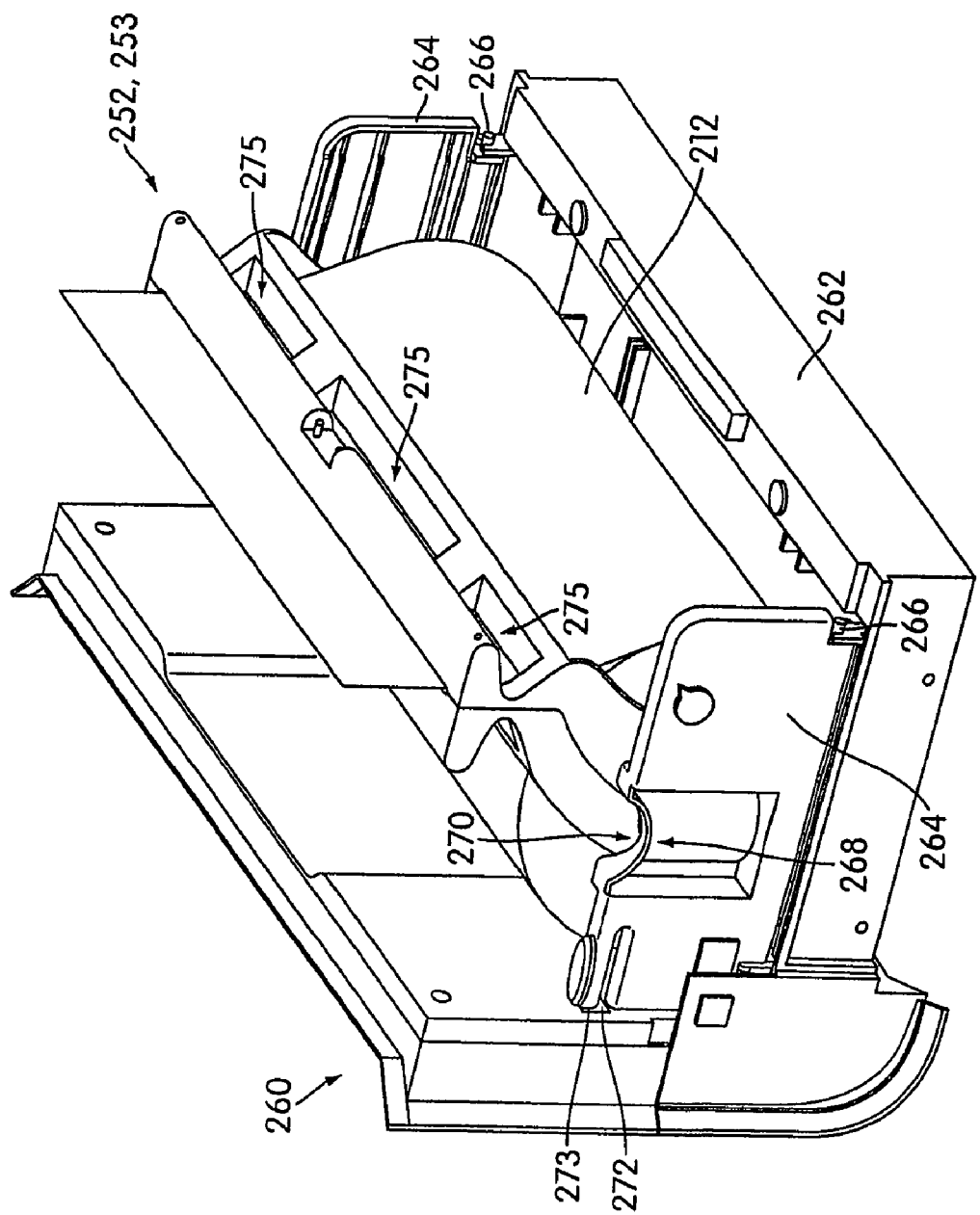
FIG. 50 is a rear and right side perspective view of a cartridge tray with the cartridge of FIG. 38.
Figure 51:
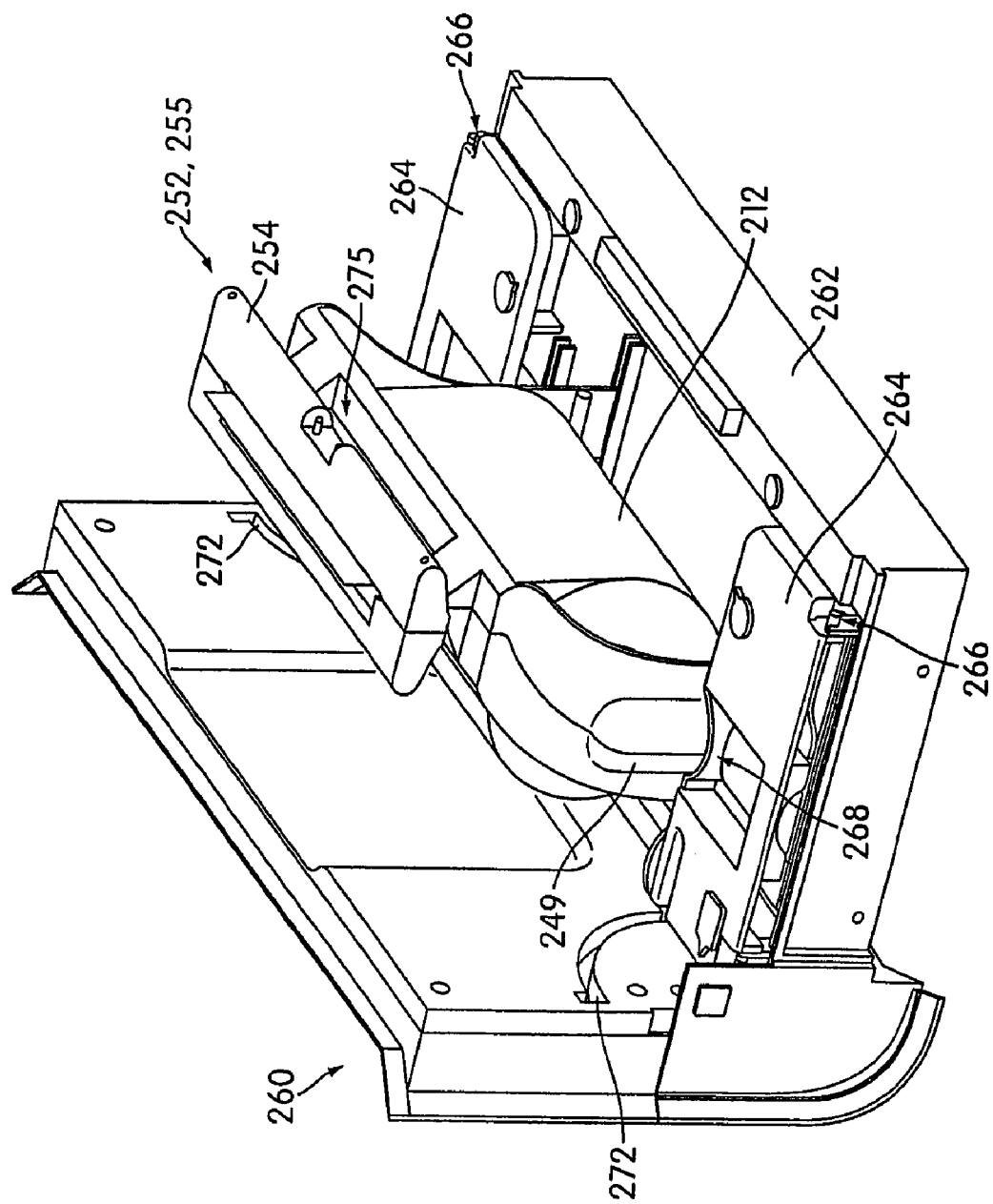
FIG. 51 is a rear and right side perspective view of the cartridge tray of FIG. 50 with the cartridge of FIG. 39.
Figure 54:
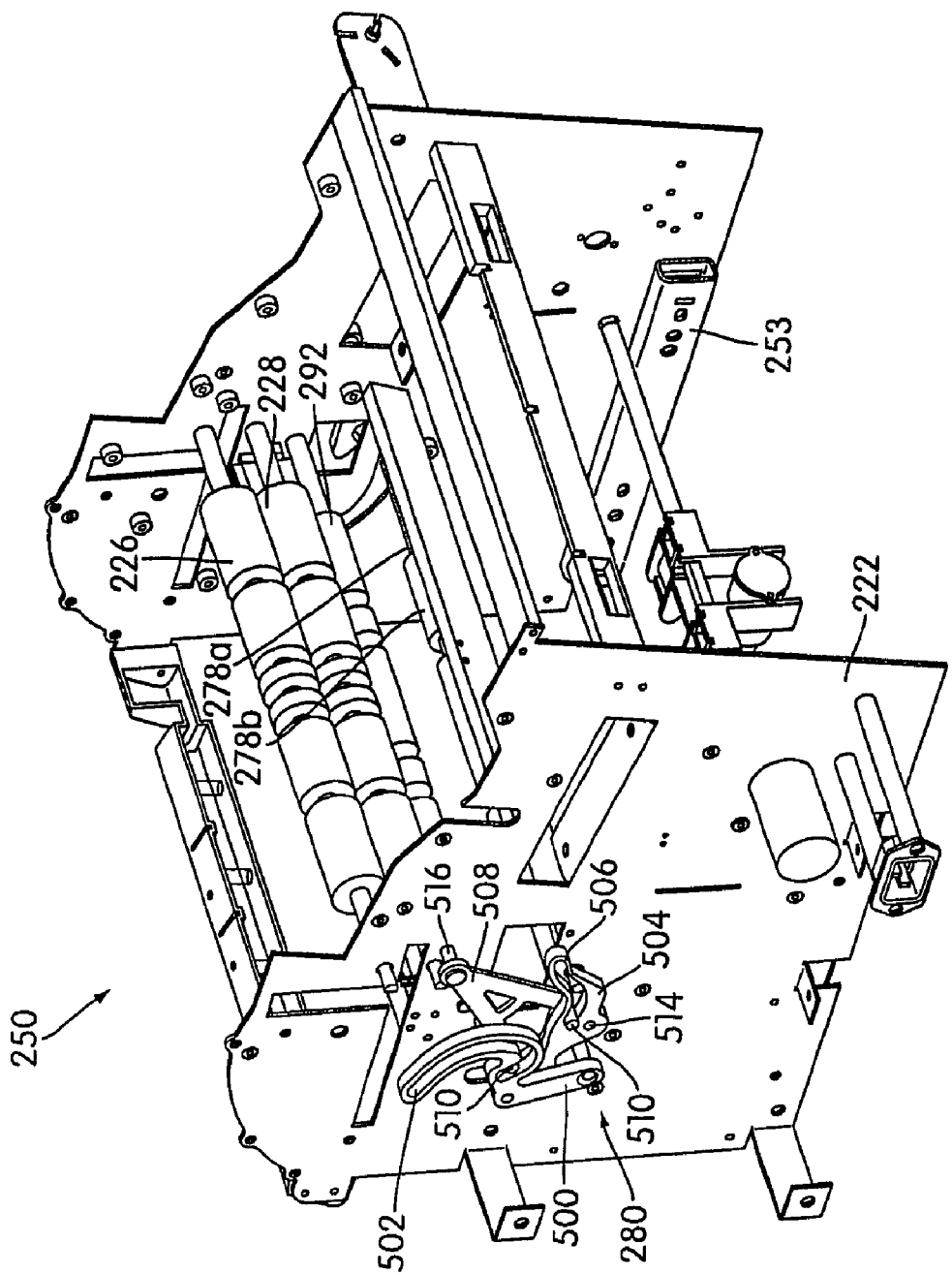
FIG. 54 is a rear and right side perspective view of the supply receiving portion of FIG. 52.
Figure 55:
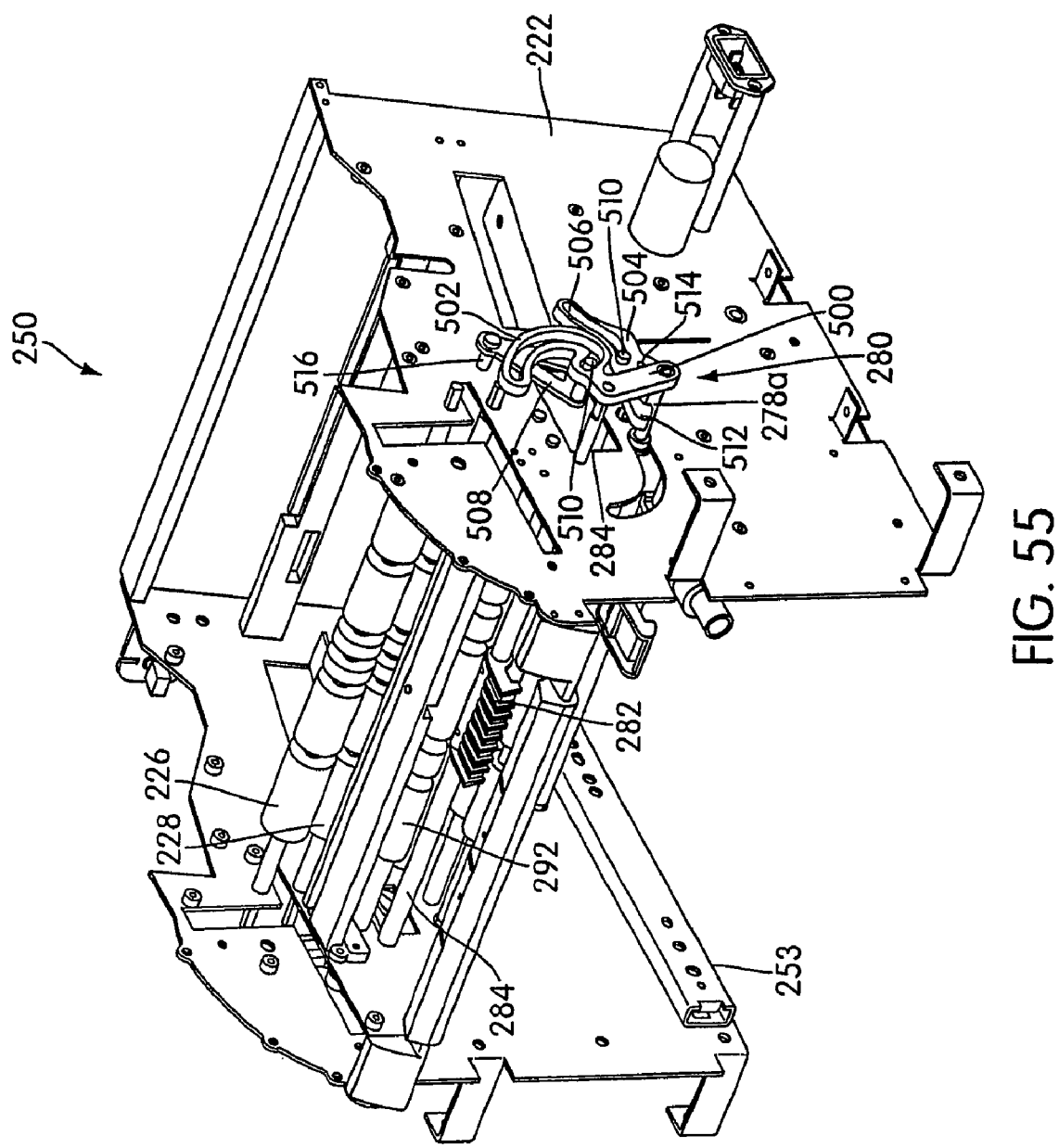
FIG. 55 is a front and right side perspective view of the supply receiving portion of FIG. 54.

The apparatus 210 also includes a cartridge tray 260, shown in greater detail in FIGS. 50 and 51, which is configured to be received by the supply receiving portion 250 of the frame 222. The supply receiving portion 250 includes a pair of slides 253, only one of which is shown in FIGS. 54 and 55, which allow the cartridge tray 260 to be slidably moved between an open position and a closed position in substantially the same manner as a drawer that slides in and out of a cabinet. It is also contemplated that the cartridge tray 260 may be pivotally movable and may even be fully removed from the supply receiving portion 250. The illustrated embodiment is not intended to be limiting in any way.

Returning to FIGS. 50 and 51, the cartridge tray 260 includes a base 262 and a pair of sidewalls 264 on opposite sides of the base 262. At least a portion of the sidewalls 264 are pivoted at a hinge 266 so they are movable between two positions, e.g. an "Up" position, shown in FIG. 50, and a "down" position, show in FIG. 51. The sidewalls 264 are configured to substantially center the cartridge 252 in the cartridge tray 260 so that the cartridge 252 will be substantially centered with respect to a feeding direction of the stock material 214 when the cartridge tray 260 is moved into the operative position in the apparatus 210. By substantially centering the cartridge 252 in the cartridge tray 260, and by centering the cartridge tray 260 relative to the feeding direction, the stock material 214 will be centered on the document D that is being fed into the apparatus 210. This way, the side margins of the stock material 214 relative to the document D will be substantially the same. In the illustrated embodiment, the sidewalls 264 each include a notch 268. The notches 268 allow the sidewalls 264 to engage protrusions 249 on the cartridge 252 when in the retracted position, as shown in FIG. 51. The sidewalls 264 may be sized to accommodate the most commonly used cartridges for the particular apparatus. The sidewalls 264 may include cooperative structures 270 on an inner face thereof that are configured to engage a cartridge of a larger size when the sidewalls 264 are in the "up" position, thereby securing the cartridge 252 to the cartridge tray 260 so that the cartridge does not move relative to the cartridge tray 260 as the cartridge tray 260 is moved between the open position and the closed position. The base 262 of the cartridge tray 260 may also include a pair of arcuate slots 272, shown in FIG. 51, that each receive a protrusion 273, one of which is shown in FIG. 50, located on a respective sidewall 264 to help guide the movement of the sidewall 264 between the "up" and "down" positions. The illustrated embodiments are not intended to be limiting in any way.

When the cartridge 252 is placed in the cartridge tray 260 when the cartridge tray 260 is in the open position, one of the sidewalls 264 (or some other structure) will contact the first brake 256 so that the finger 255 pivots and the first brake 256 disengages from the hub 217 and the core 216 of the feed roll 212. While the cartridge tray 260 is in the open position, the second brake 258 is still engaged with the lead portion of the stock material 214 so the lead portion will not retract into the cartridge 252, even though the core 216 is now free to rotate.

Figure 52:
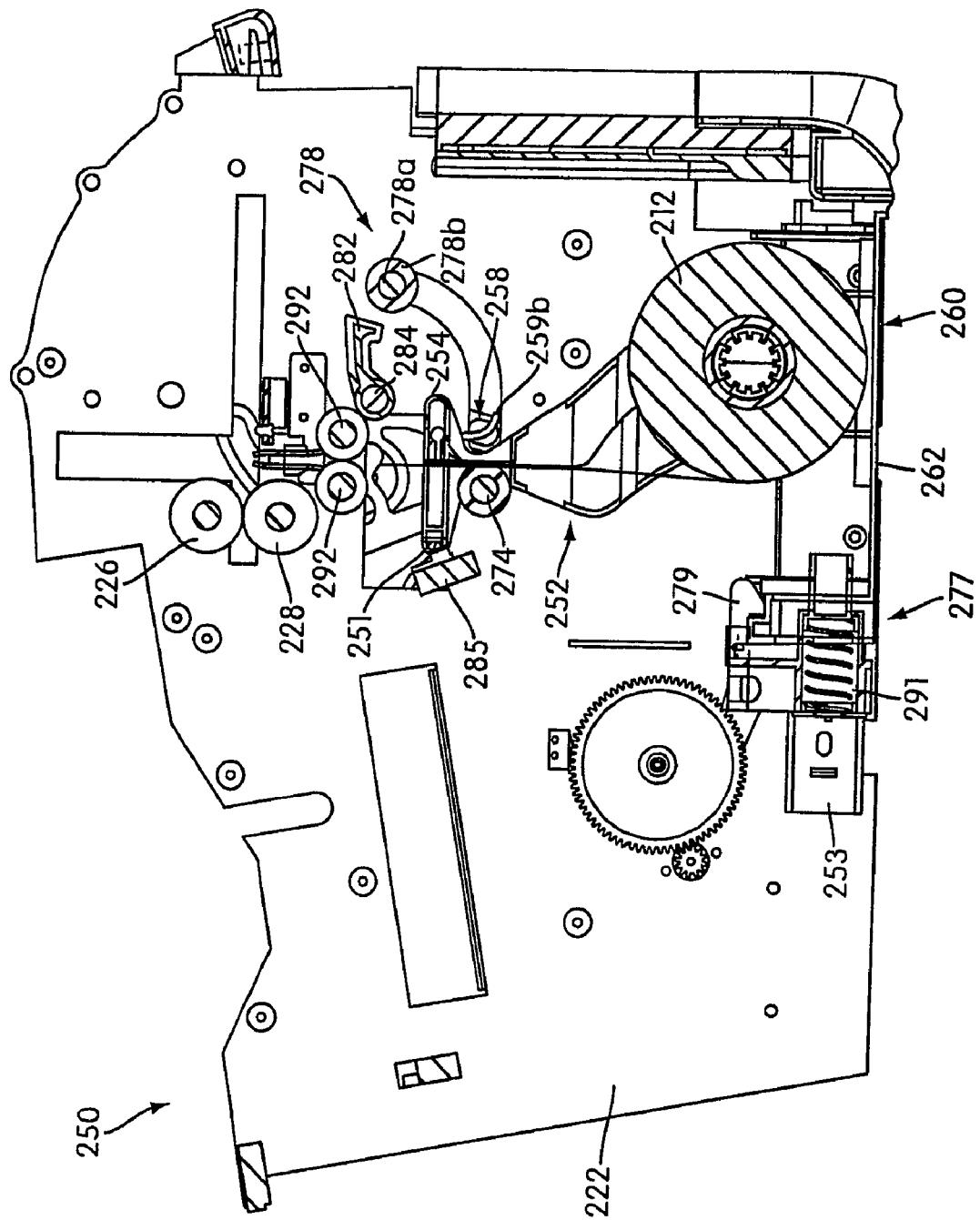
FIG. 52 is a partial cross-sectional view of a supply receiving portion of the processing apparatus of FIG. 34 with the cartridge tray in a closed position and a clamp in a disengaged position.

As shown in FIG. 52, the supply receiving portion 250 of the frame 222 includes an ejector 277 that may engage the cartridge tray 260 once the tray 260 is slid into the supply receiving portion 250, and a latch 279 that is configured to latch the base 262 of the tray 260 once the tray 260 is in its closed position. The ejector 277 may include a spring 291 (i.e. the ejector may be spring-loaded) that compresses when the tray 260 is moved to the closed position so that once the latch 279 releases the tray 260, the spring 291 may release its stored energy and cause the ejector 277 to push the cartridge tray 260 away from the supply receiving portion 250.

After the cartridge tray 260 has been slid into its closed position, i.e. is fully received by the supply receiving portion of the frame 250, shown in FIG. 52, a nip 274, which may be in the form of a nip roller (or any other structure), engages the cartridge 252 so that it contacts the lead end portion of the stock material 214. As shown in FIG. 50, the cartridge 252 includes at least one opening 275 that is configured to allow a roller of the nip 274 to engage the stock material 214.

Figure 53:
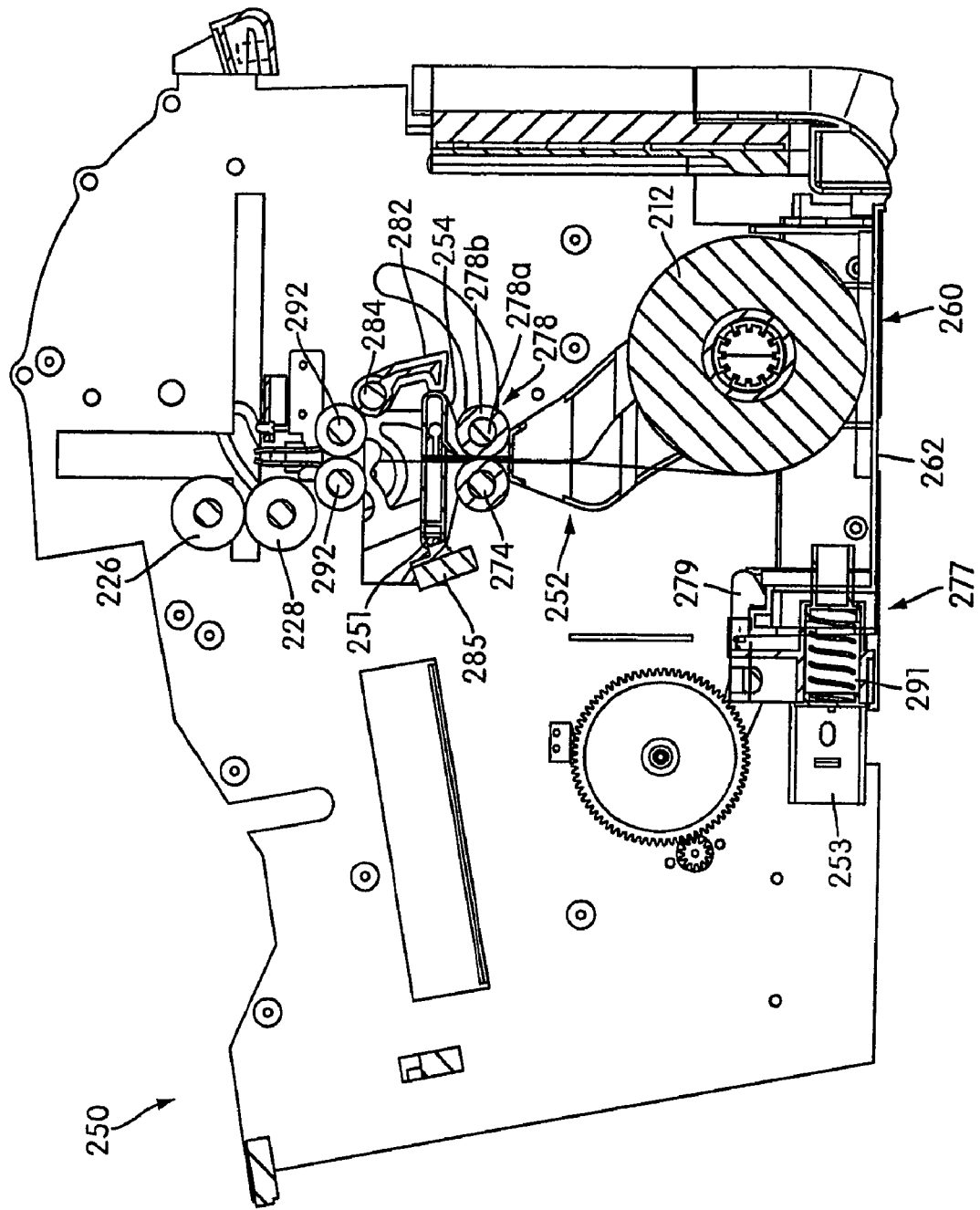
FIG. 53 is the partial cross-sectional view of FIG. 52 with the clamp in a clamping position.

When a sensor senses that the cartridge tray 260 is in the closed position, a motor drives movement of a clamp 278 via a locking mechanism 280 so that the clamp 278 moves from a position above the cartridge 252 (see FIG. 52) to an engaging position against the cartridge 252 (see FIG. 53) so that the body 254 of the cartridge 252 becomes clamped in between the nip 274 and the clamp 278. As shown in FIGS. 52 and 53, the clamp 278 is also a nip, or nip roller, that engages the lead nip of the stock material 214 at an opposite side from the nip 274. The clamp 278 may include a rotatable shaft 278a and at least one roller 278b disposed on the rotatably shaft 278a that is configured to rotate with the shaft 278a, as shown in FIG. 54. In the illustrated embodiments, the clamp 278 also acts as a brake deactivator that deactivates the second brake 258 on the cartridge 252, thereby allowing the stock material 214 to be dispensed from the cartridge 252. The second brake 258 may be configured to be engaged by the shaft 278a or the roller 278b of the clamp 278. Specifically, the second portion 259b of the lever 259 of the second brake 258 may be depressed by a portion of the clamp 278, thereby causing the lever 259 to move against the bias of the spring 261, as described in detail about. Of course, if access to the second brake 258 is on the side of the cartridge 252 that faces the nip 274, the nip 274 may act as the brake deactivator in substantially the same way. The illustrated embodiment is not intended to be limiting in any way.

As shown in FIGS. 54 and 55, the locking mechanism 280 includes a first piece 500 that includes an arcuate slot 502, a second piece 504 that includes a shaped slot 506, and a third piece 508 that includes a pair of protrusions 510. The first piece 500 is configured to receive the shaft 284 that is connected to the latch 282, and is also configured to receive the clamp 278. The second piece 504 includes a latch 512 at one end that is configured to latch the clamp 278 when the clamp 278 is in the clamping position, and is rotatably mounted to the frame 222 via a pin 514. The third piece 508 is substantially shaped as an "A" and is rotatably mounted to the frame 222 via a pin 516. Each protrusion 510 of the third piece 508 engages one of the slots 502, 506 located on the first and second pieces 500, 504, respectively. In FIGS. 54 and 55, the locking mechanism 280 is shown to be in the locked position. That is, the clamp 278 has moved into the clamping position, and the latch 512 is latched over the clamp 278, thereby locking the clamp 278 is the clamped position. As shown, each of the protrusions is located at one end of each of the slots 502, 506, respectively. When the locking mechanism 280 is moved to be in the unlocked position, each of the protrusions is located at an opposite end of each respective slot 502, 506, and the clamp 278 returns to its disengaged position that is shown in FIG. 52.

As shown in FIGS. 52, 53, and 55, the supply receiving portion 250 of the frame 222 also includes a latch 282 that is mounted on a shaft 284. When the mechanism 280 moves to position the clamp 278 into its clamping position, the mechanism 280 also causes the shaft 284 to rotate, thereby repositioning the latch 282 into a latching engagement with the cartridge body 254, as shown in FIG. 53. A data input device 285 may be positioned in the supply receiving portion 250 of the frame 222 at a location that is opposite the latch 282 relative to the cartridge 252. The data input device 285 is configured to engage the memory 251 located on the cartridge 252 and communicate data from the memory 251 to a controller 400 of the apparatus 210. It is also contemplated that the data input device 285 may be disposed on the latch 282. The illustrated embodiment is not intended to be limiting in any way.

Once the cartridge 252 has been clamped by the clamp 278 and locked in place by the latch 282, the cartridge 252 may be considered to be in the operative position. Of course, the supply receiving portion 250 of the frame 222 may be structured to removably mount a feed roll individually without the use of a cartridge or a cartridge tray. That is, the apparatus 210 may be a non-cartridge-based system. The illustrated embodiment is not intended to be limiting in any way.

Figure 57:
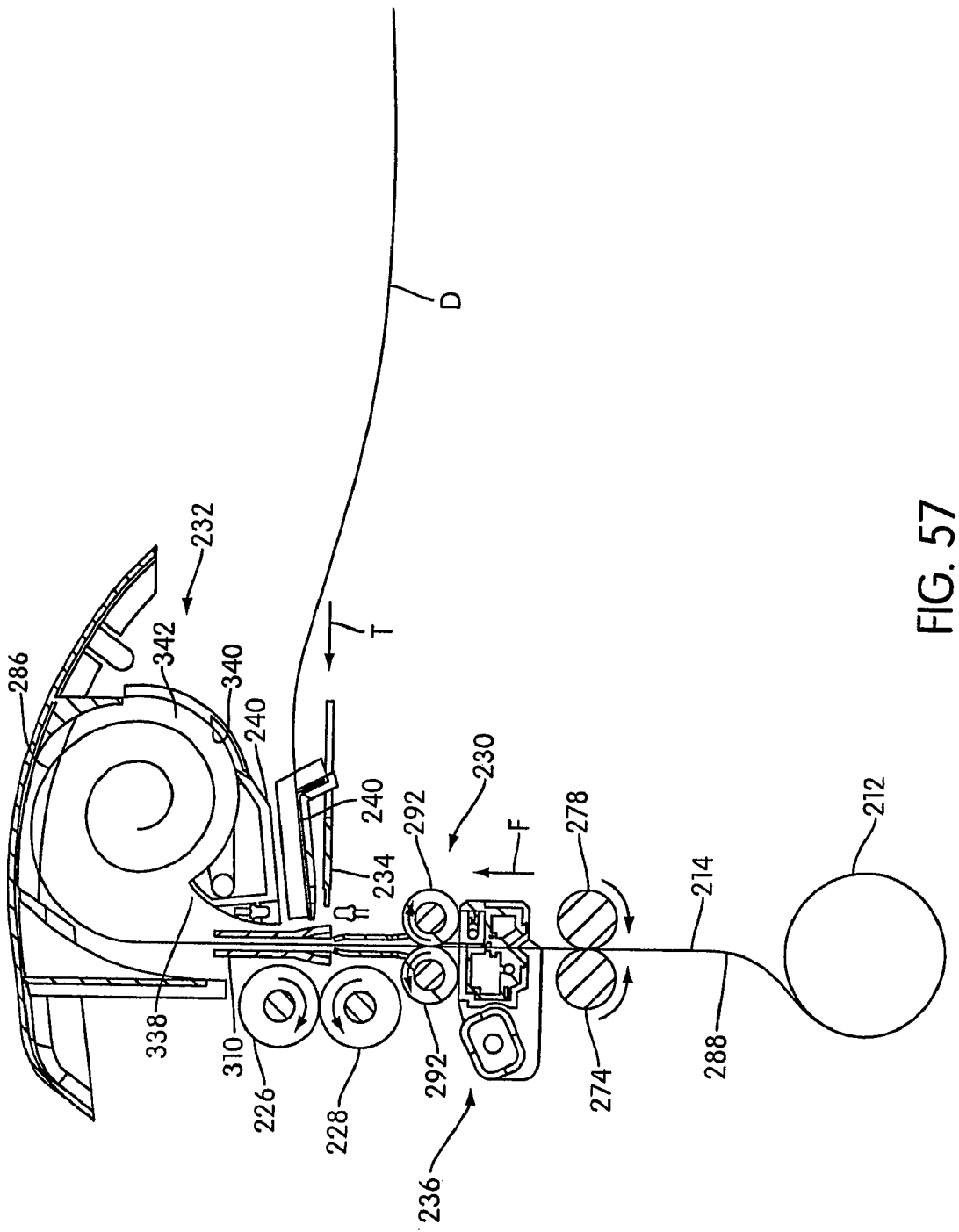
FIGS. 57-60 are schematics illustrating operation of the apparatus of FIG. 34.

The cartridge 252 and feed roll 212 are constructed and arranged such that when the cartridge 252 is in the operative position, the lead end of the stock material 214 can be fed from the feed roll 212 via the nip 274 and clamp 278 and guided in the feeding direction F past the cutter 236, past the folder member 234 and the cooperating structures 226, 228, and into the reservoir 232, as shown in FIG. 57.

Figure 58:
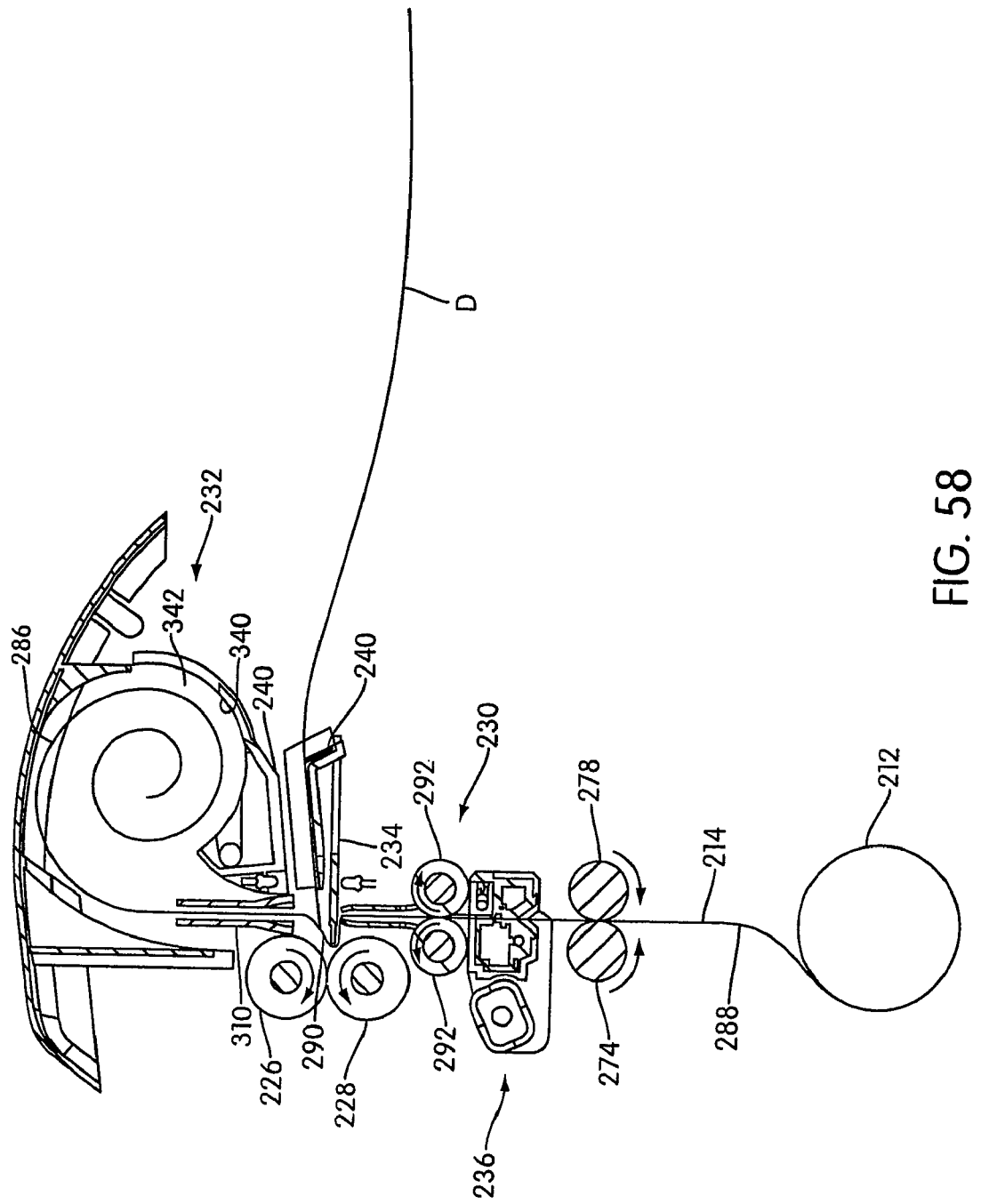

The feeder system 230 is operable to feed a selected length of the stock material 214 from the supply in a feeding direction F so that a leading portion 286 of the selected length passes beyond the pair of cooperating structures 226, 228, and a trailing portion 288 of the selected length extends from the pair of cooperating structures 226, 228 towards the supply of stock material 214, as best shown in FIG. 57. Moreover, an intermediate portion 290 of the selected length between the leading and trailing portions 286, 288 is positioned near the cooperating structures 226, 228, as shown in FIG. 58. The supply of stock material 214 is oriented such that the adhesive carrying surface 218 at the intermediate portion 290 faces generally away from the cooperating structures 226, 228.

In the illustrated embodiment, the feeder system 230 includes a pair of transverse rollers 292 that are engagable with the stock material 214 and are driven by an electric motor (not shown) to advance the stock material 214 from the feed roll 212 in the feeding direction F. The electric motor is operatively engaged with the transverse rollers 292 via a gear assembly 296 (shown in FIGS. 56 and 62). In use, the electric motor is actuated by the apparatus controller 400 to drive the transverse rollers 292 and advance the stock material 214 in the feeding direction F. The apparatus controller 400 may cease operation of the electric motor when the selected length of stock material 214 has been advanced from the cartridge 252.

In the illustrated embodiment, the feeding direction F is oriented generally upwardly, e.g., vertically, away from the supply of stock material 214 and towards the cooperating structures 226, 228 and reservoir 232. However, the feeding direction F may vary depending on, for example, the location of the supply of stock material 214 and the desired feed path configuration within the frame 222. For example, instead of being generally straight or curved, the feed path may also be tortuous or winding.

In the illustrated embodiment, the cooperating structures 226, 228 are in the form of pressure-applying rollers. The rollers 226, 228 are rotatably mounted between side walls of the frame 222. The rollers 226, 228 are driven by an electric motor to advance the document into the laminator unit 224 as it compresses the stock material 214 and document to form an initial bond between the stock material 214 and document. However, the cooperating structures 226, 228 may have any other suitable structure.

As shown in FIG. 57, the folder member 234 and the pair of cooperating structures 226, 228 are oriented transversely with respect to the feeding direction F. Specifically, the folder member 234 and the pair of cooperating structures 226, 228 are oriented to advance the stock material 214 in a feeding direction T that is transverse to the feeding direction F. As illustrated, the direction T extends generally horizontal. However, the direction T may vary depending on, for example, the configuration of the laminator unit 224.

The folder member 234 is movable between a disengaged or released position (as shown in FIG. 57) enabling the stock material 214 to pass beyond the pair of cooperating structures 226, 228 in the feeding direction F, and an engaged or folding position (as shown in FIG. 58) urging the intermediate portion 290 in between the cooperating structures 226, 228 in a transversely folded relation. When the folder member 234 is in the engaged position, a lead end of the document may be received in the folded intermediate portion 290 so that the cooperating structures 226, 228 can feed the document with the leading and trailing portions 286, 288 of the selected length of stock material 214 on opposing sides thereof into the laminator unit 224.

Figure 56:
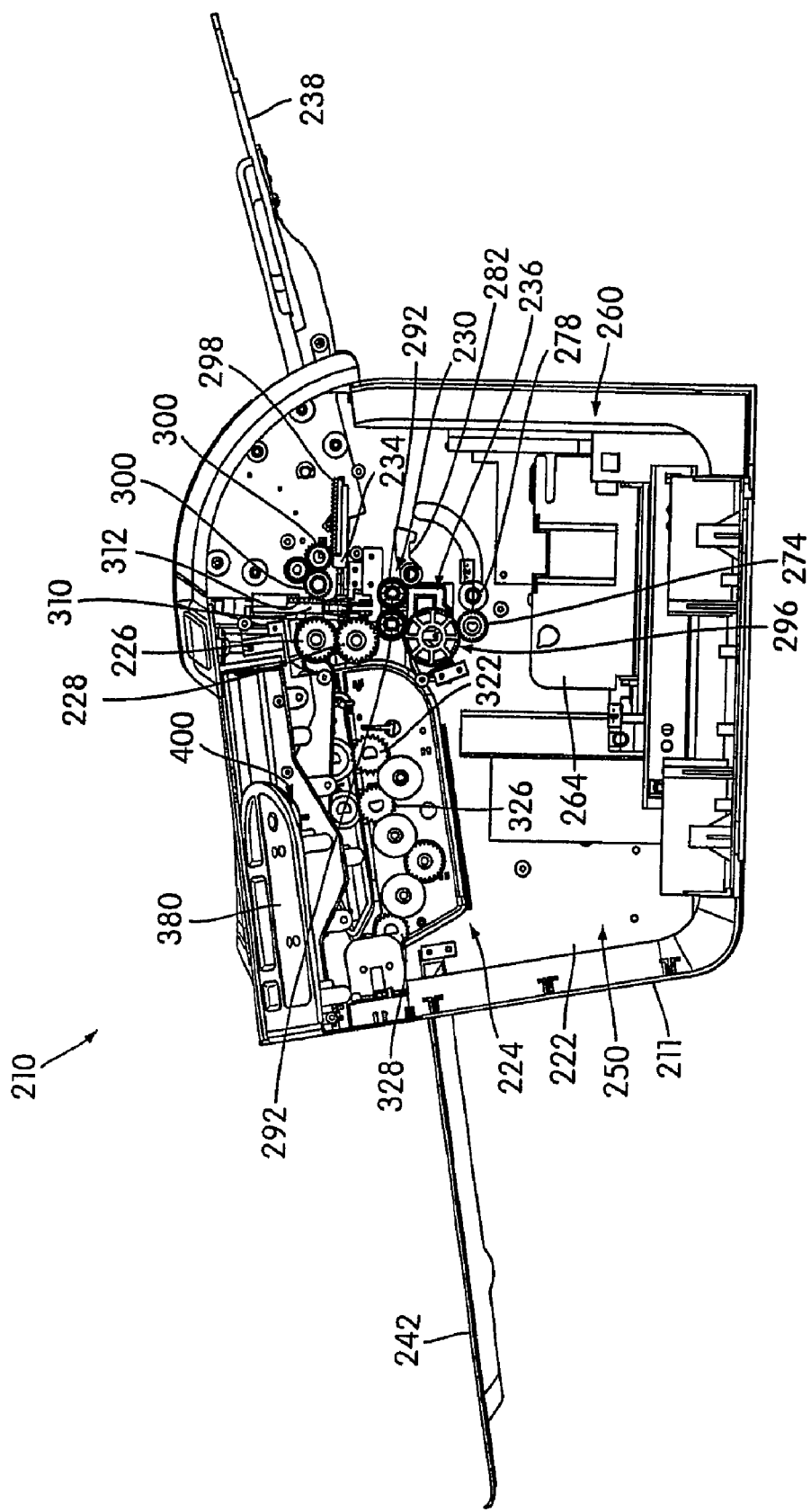
FIG. 56 is a left side view of the processing apparatus of FIG. 34 with a portion of a housing removed.
Figure 59:
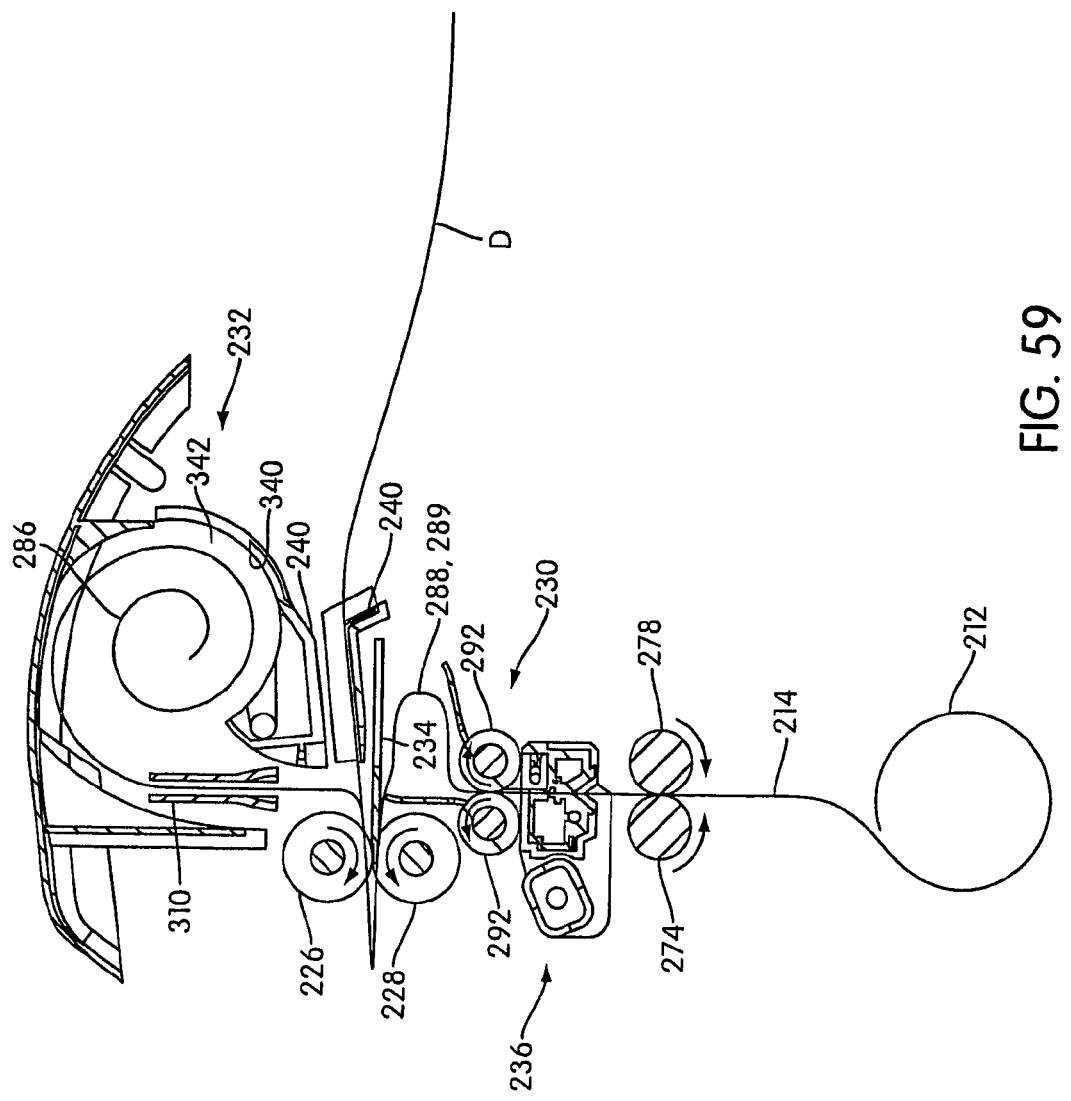
Figure 62:
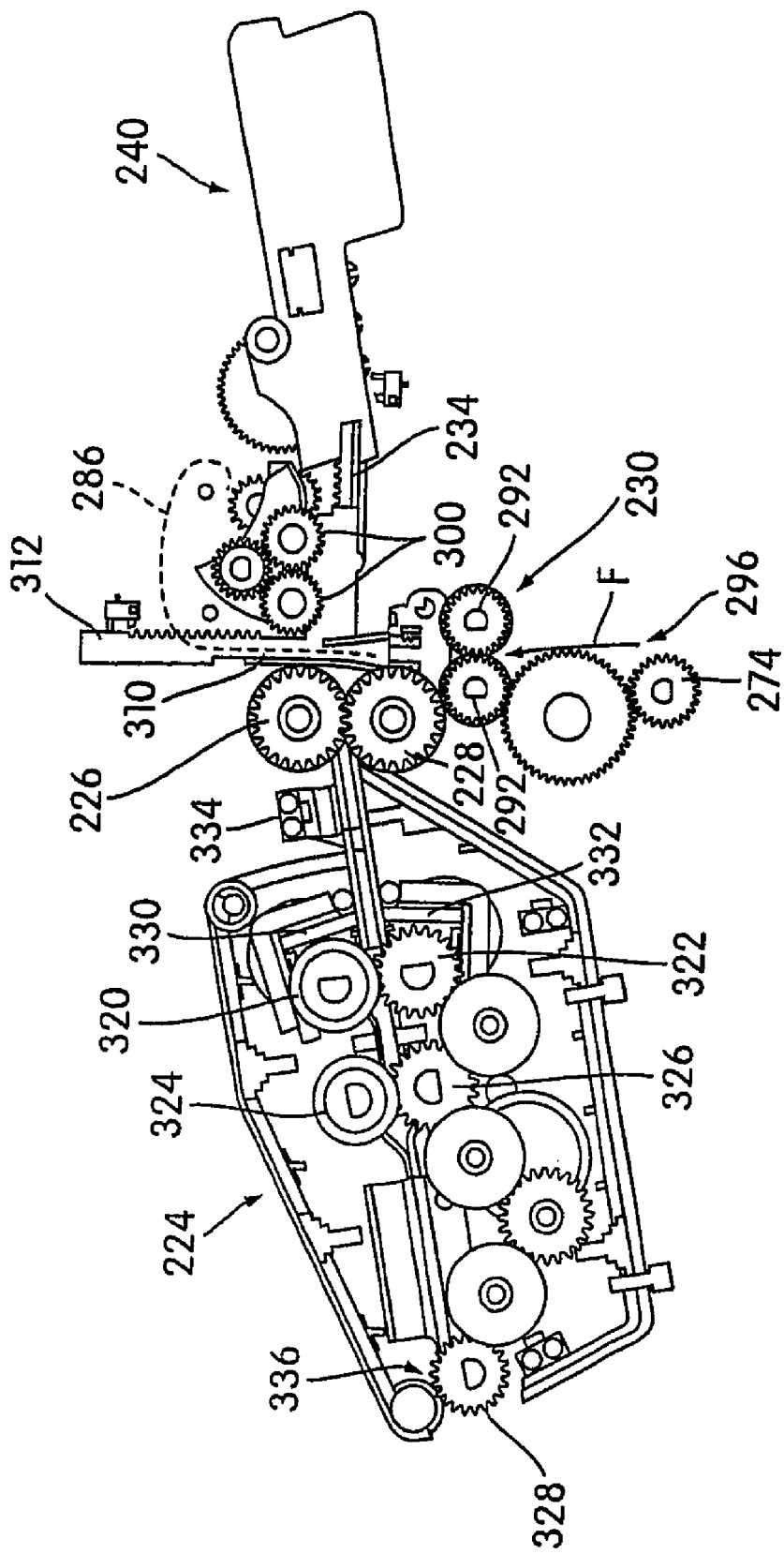
FIG. 62 is a left side view of a laminator unit and feed system of the apparatus of FIG. 34.

In the illustrated embodiment, the folder member 234 has a substantially plate-like structure and includes a rack 298 on each end of the plate-like structure that engage pinions 300, as best shown in FIGS. 56 and 62. The racks 298 and pinions 300 cooperate to move the folder member 234 between the engaged and disengaged positions. In the disengaged position, the folder member 234 is position away from the stock material 214 as the stock material 214 travels to the reservoir 232 in the feeding direction F as shown in FIG. 57. As the folder member 234 is moved into the engaged position, the folder member 234 pushes the stock material 214 in between and into engagement with the cooperating structures 226, 228, which forms the transversely extending fold in the stock material 214 as shown in FIGS. 58 and 59. The fold in the stock material 214 may create a pocket for the document so that the document and stock material 214 can be fed by the cooperating structures 226, 228 into the laminator unit 224. It should be understood that the folded relation of the intermediate portion 290 means that a fold could just be initiated for feeding the intermediate portion 290 to the cooperating structures 226, 228, or a sharp fold could be formed.

Also, it should be noted that in the disengaged position, the folder member 234 could be fully spaced from the stock material 214 or engaged with the stock material 214 as shown. The term "disengaged" is simply used in a functional sense in that the folding roller 270 is not in a position to urge the stock material 214 in between the cooperating structures 226, 228.

A fence or shield 310 is operatively cooperative with the folder member 234 and is disposed in between the folder member 234 and the pair of cooperating structures 226, 228 when the folder member 234 is in the disengaged position. The fence 310 prevents the stock material 214 from coming into contact with the pair of cooperating structures 226, 228 as the stock material 214 moves between the cartridge 252 and the reservoir 232. The fence 310 also includes a rack 312 on each end (see FIGS. 56 and 62). The racks 312 of the fence 310 are also operatively connected to the pinions 300 so that as the pinions 300 rotate, the fence 310 and the folder member 234 move linearly. The racks 298, 312 and pinions 300 may be driven by an electric motor 313 (see FIG. 63). The fence 310 is disposed substantially in the feeding direction F and substantially transverse to the folder member 234. This way, as the folder member 234 moves into the engaged position, the fence 310 moves out of the way, thereby allowing the folder member 234 to urge the stock material 214 in between the cooperating structures 226, 228. Likewise, as the folder member 234 moves to the disengaged position, the fence 310 moves into a position in between the stock material 214 and the cooperating structures 226, 228, thereby blocking the stock material 214 from the cooperating structures 226, 228.

Any other mechanism or arrangement for linking the fence 310 to the folder member 234 could be used, and the illustrated embodiment is not intended to be limiting in any way. Likewise, the fence 310 and the folder member 234 could be operated in proper sequence separately from one another.

As shown in FIG. 57-60, the cutter 236 is positioned between the feed roll 212 and the pair of cooperating structures 226, 228 in the feeding direction F. The cutter 236 is operable to cut the stock material 214 transversely with respect to the feeding direction F to cut the selected length of the stock material 214 from a remainder of the stock material 214.

Figure 61:
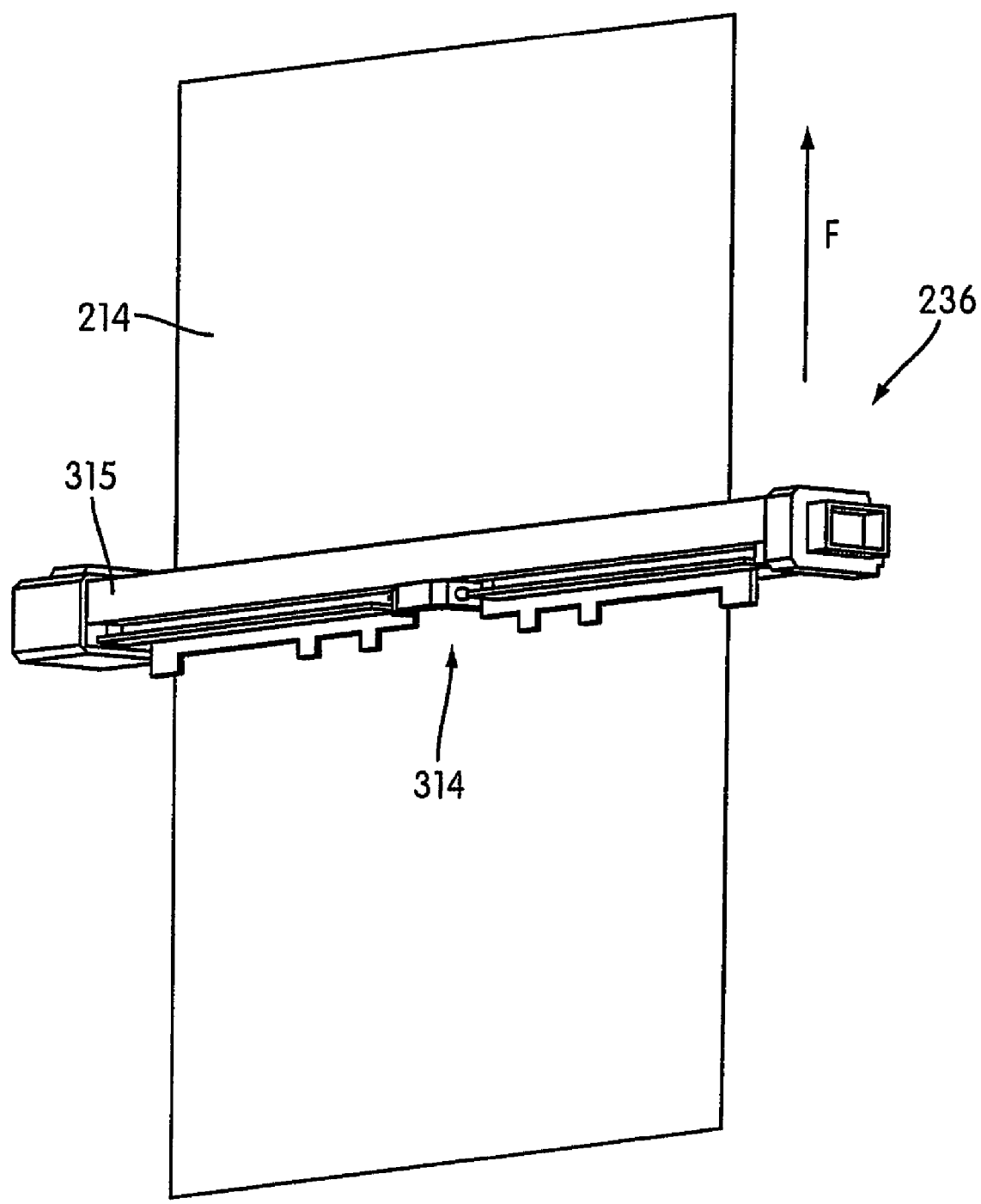
FIG. 61 is a rear and left side perspective view of a cutter assembly of the apparatus of FIG. 34.

The cutter 236 is shown in greater detail in FIG. 61. In the illustrated embodiment, the cutter 236 is of the rotating shear type and includes a roller 314 having a sharpened blade-type edge. The roller 314 and edge thereof cooperate with a die positioned within a frame 315 of the cutter 236 to cut the selected length. The cutter 236 may be operated by the apparatus controller 400 that actuates the roller 314 when the selected length of stock material 214 has been fed from the feed roll 212. Any suitable cutter may be used, and the illustrated embodiment is not intended to be limiting.

Figure 63:
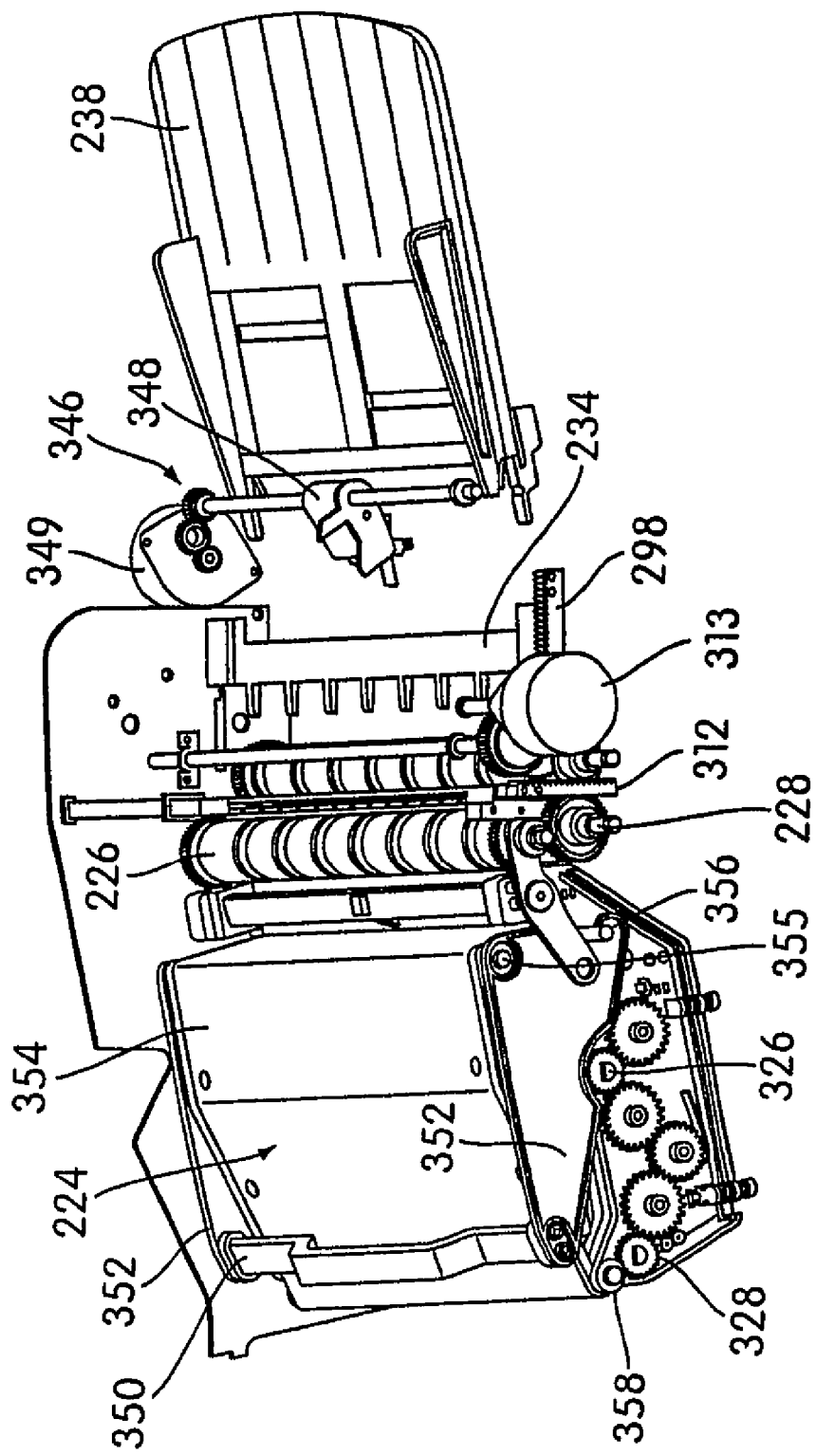
FIG. 63 is a top and left side partially exploded perspective view of the laminator unit, document feed system, and document feed tray of the apparatus of FIG. 34.
Figure 64:
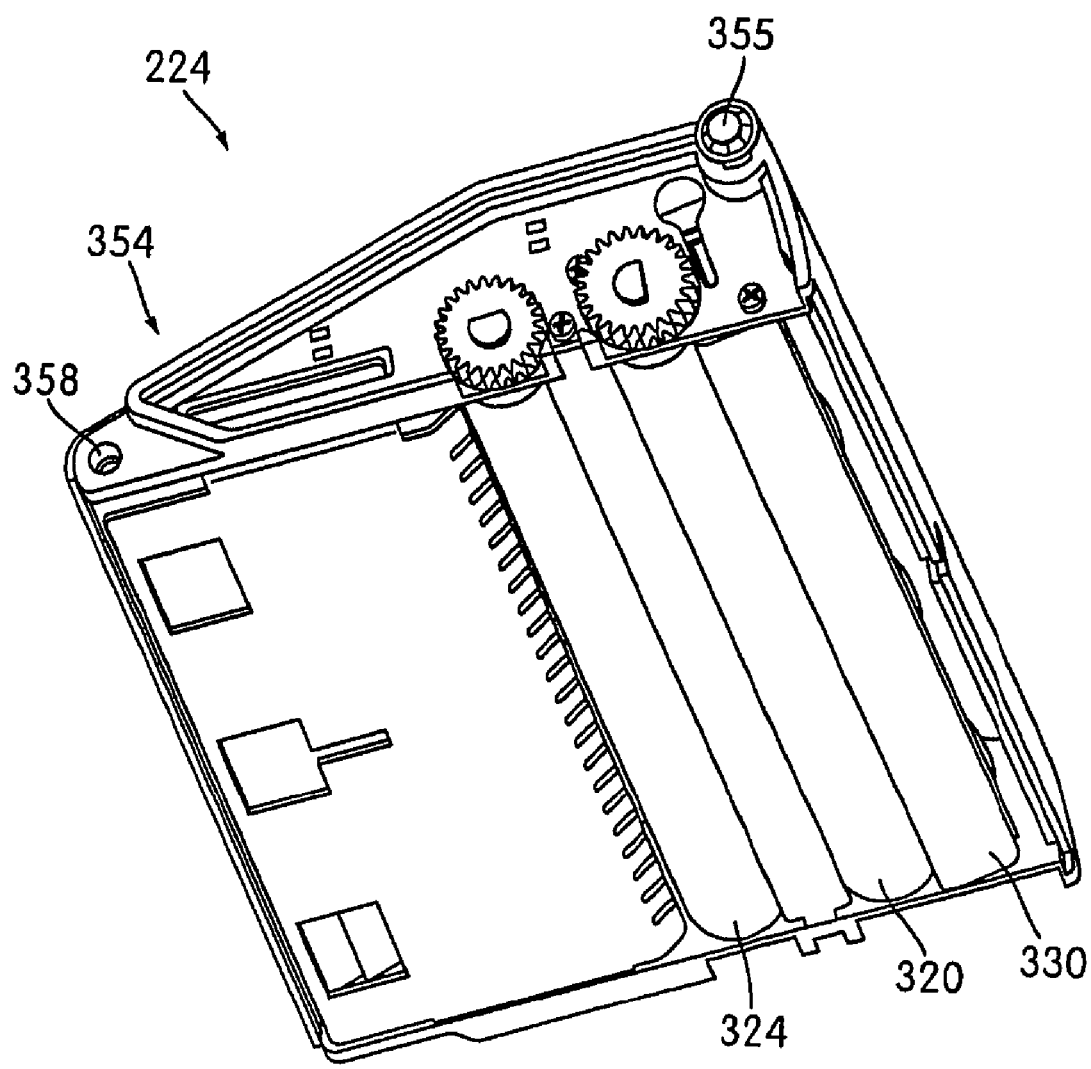
FIG. 64 is a bottom and left side perspective view of a top portion of the laminator unit of FIG. 63.

The laminator unit 224, which is shown in greater detail in FIGS. 62-64, is operable to activate the adhesive as the document and the leading and trailing portions 286, 288 of the selected length of the stock material 214 are advanced therethrough, thereby bonding the leading and trailing portions 286, 288 to the opposing sides of the document. In the illustrated embodiment, the laminator unit 224 includes a first pair of pressure-applying nip rollers 320, 322, a second pair of pressure-applying nip rollers 324, 326, and a discharge roller 328. The nip rollers 320, 322, 324 326, 328 are rotatably mounted between side walls of the frame 222 and cooperate to perform a processing operation. The nip rollers 320, 322, 324, 326, 328 may be driven in any suitable manner to effect operation thereof, e.g., driven by an electric motor.

The nip rollers 320, 322, 324, 326 may be heated nip rollers that are capable of simultaneously heating the stock material 214 and compressing it with the document to facilitate forming a strong bond between the stock material 214 and the document during a processing operation. It is contemplated that one or both pairs of nip rollers 320, 322, 324, 326 may be heated nip rollers. However, the nip rollers 320, 322, 324, 326 may be non-heated nip rollers capable of applying pressure to the stock material 214 and document during the processing operation. Moreover, the laminator unit 224 may have any other suitable construction or configuration and the illustrated embodiment is not intended to be limiting.

When heated nip rollers 320, 322, 324, 326 are provided, the adhesive provided on the stock material 214 may be a heat activated adhesive such that as the document and the stock material 214 pass between the heated nip rollers 320, 322, 324, 326, the heated nip rollers 320, 322, 324, 326 perform a processing operation. The heated nip rollers 320, 322, 324, 326 may emit heat to effectively activate the adhesive and apply pressure to the stock material 214 (and to the document when it is between the nip rollers 320, 322, 324, 326) during the processing operation, which causes adhesive bonding of the adhesive layer provided by the stock material 214. This bonds the document and the stock material 214 to form a final product of the document and the stock material 214. The final product is discharged out the discharge opening 248 by the driving action of the discharge roller 328. Alternatively, heating plates could be used upstream of non-heated rollers, with the plates activating the adhesive and the rollers then applying pressure.

When non-heated nip rollers are provided, the adhesive may be a pressure-sensitive adhesive with the non-heated nip rollers applying pressure to the stock material 214 (and to the document when it is between the nip rollers) during the processing operation, which bonds the document and the stock material 214.

As shown in FIG. 62, a pair of deflecting members 330, 332 may be provided adjacent the first pair of pressure-applying nip rollers 320, 322 to direct the document and stock material 214 in between the nip rollers 320, 322. This allows the nip rollers 320, 322 to positively grab the document and stock material 214 and advance it through the laminator unit 224.

Also, the laminator unit 224 may include a thickness sensing device 334 and an output sensor 336. In the illustrated embodiment, the thickness sensing device 334 is positioned between the cooperating structures 226, 228 and the first pair of pressure-applying nip rollers 320, 322. The thickness sensing device 334 is structured to determine the thickness of the document and stock material 214 on opposing sides thereof as it passes thereby and to transmit this information to the apparatus controller. Based on this information, the apparatus controller 400 may adjust the lamination speed or temperature, for example, for optimal lamination output. However, the thickness sensing device 334 may be positioned at any suitable location along the document path to determine the thickness and feed this information to the apparatus controller. In the illustrated embodiment, the output sensor 336 is positioned adjacent the discharge roller 328 and is structured to verify that a final product is being properly discharged out the laminator unit 224. The apparatus controller 400 may shut down the laminator unit 224, for example, should the output sensor 336 detect an error. However, the thickness sensing device 334 and the output sensor 336 are optional and not to be considered limiting.

In the illustrated embodiment, the laminator unit 224 is configured to be opened by the user so that any jams contained therein may be accessed and cleared. As shown in FIG. 63, the laminator unit 224 includes a handle 350 that is connected to a pair of arms 352. The pair of arms 352 are pivotally connected to an upper portion 354 of the laminator unit 224 at pivot points 355 located on each side of the upper portion 354. The arms 352 may be of any shape. As illustrated, the arms 352 are substantially triangular in shape. For each arm 352, one apex of the triangle is connected to the handle 350, and one apex of the triangle is located at the pivot point 355. Each of the arms 352 also includes a hook 356 that is configured to lack to the frame 22 or another portion of the laminator unit 224, as shown in FIG. 63. This configuration allows the user to open the laminator unit 224 by pulling upward on the handle 350, which causes the arms 352 to pivot on the pivot points 355 as the hooks 356 unlatch. The upper portion 354 of the laminator unit 224 is hinged to the remaining portion of the laminator unit 224 at one end thereof, designated by 358. This way, once the arms 352 are unlatched, the entire upper portion 354 of the laminator unit 224 may be pivoted away from the rest of the apparatus 210. Also, the length of the arms 352 ensures that the handle 350 will be spaced away from the laminator unit 224 so that the user's hand will stay away from the inside of the laminator unit 224 as the unit 224 is being opened. The illustrated embodiment of the laminator unit 224 is not intended to be limiting in any way, and any suitable device may be used.

Returning to FIGS. 57-60, the reservoir 232 is provided beyond the pair of cooperating structures 226, 228 in the feeding direction F. The reservoir 232 is configured to receive the leading portion 286 of the selected length of stock material 214 fed beyond the pair of cooperating structures 226, 228 in a compacted configuration. In the illustrated embodiment, the reservoir 232 includes an arcuate configuration that defines a stock material receiving opening 338 and an inner arcuate surface 340 that defines a stock material receiving space 342, as shown in FIG. 57. The inner arcuate surface 340 of the reservoir 232 enables the leading portion 286 of stock material 214 fed past the cooperating structures 226, 228 to bunch up, e.g., coil, within the reservoir 232. This action provides a space saving feature as the apparatus does not need to provide an extended length receiving area for the stock material 214 fed past the cooperating structures 226, 228. Thus, the apparatus 210 can have a more compact configuration. However, the reservoir 232 may have any other suitable configuration and may be positioned at any suitable location along the feed path to receive the leading portion 286 of stock material 214.

The document guide 240, shown in FIGS. 57-60, is constructed to guide the document D to the pair of cooperating structures 226, 228. This enables a lead end of the document D to be received in the folded intermediate portion 290 of the stock material 214 so that the cooperating structures 226, 228 can feed the document D with the leading and trailing portions 286, 288 of the selected length of stock material 214 on opposing sides thereof into the laminator unit 224. In the illustrated embodiment, the document guide 240 shares a common wall with the reservoir 232 so that the document D passes in between the reservoir 232 and the folder member 234.

It should be understood that the document guide 240 positions the document generally adjacent the cooperating structures 226, 228 such that it can engage the cooperating structures 226, 228 and be guided into the folded intermediate portion 290 of the selected length of stock material 214. It is not necessary for the document to be guided directly between the cooperating structures 226, 228, although this alignment may be preferred in certain applications.

Figure 65:
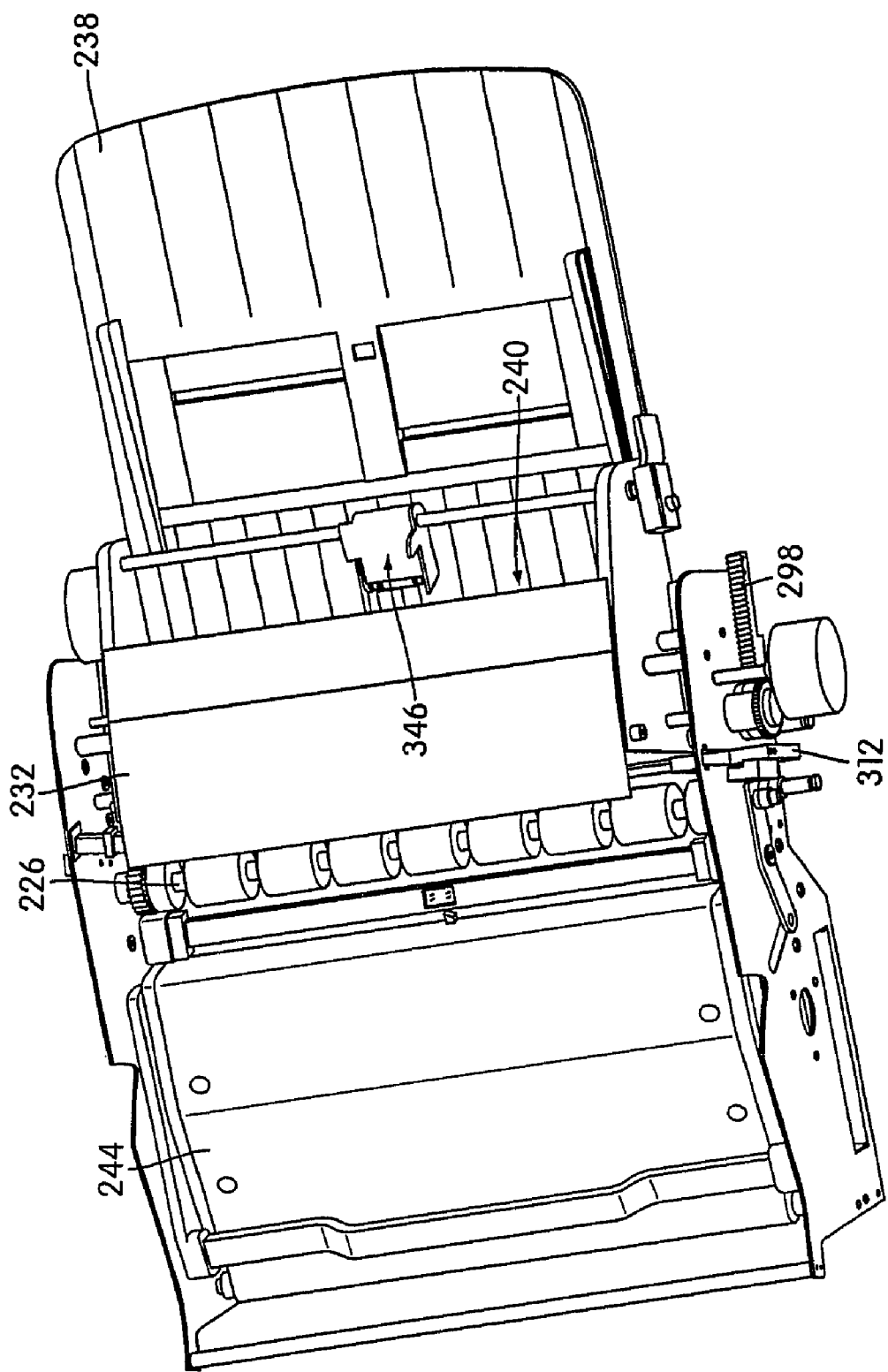
FIG. 65 is a top and left side perspective view of the laminator unit, document feed system, and document feed tray of FIG. 63.
Figure 66:
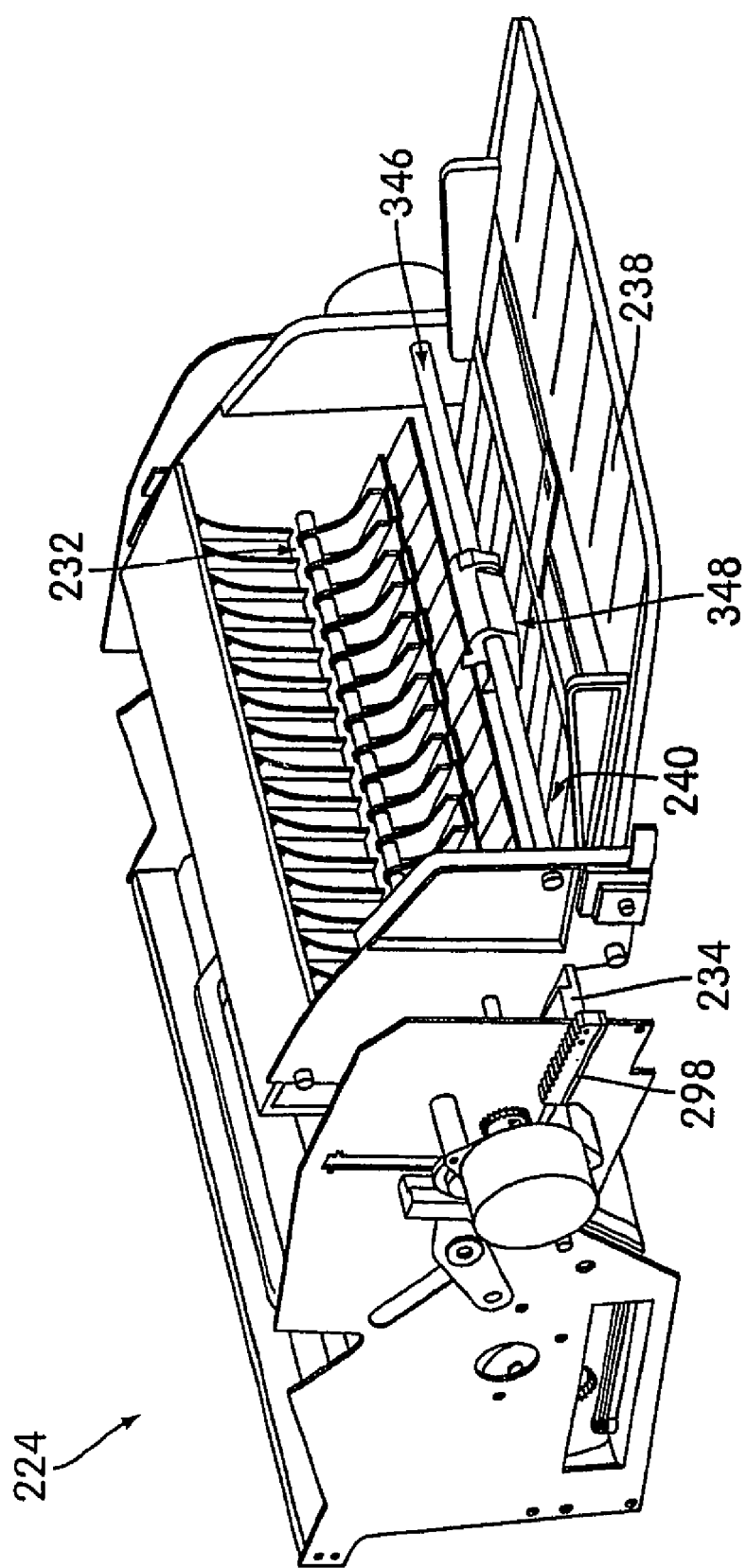
FIG. 66 is a front and left side perspective view of the laminator unit, document feed system, and document feed tray of FIG. 65.

In the illustrated embodiment, the document is advanced into the document guide 240 by a document feeder 346, shown in FIGS. 63, 65, and 66. Specifically, document feeder 346 is provided adjacent the feed opening 246 within the frame 222. The document feeder 346 includes a roller 348 that is operable to advance a document that is inserted into the feed opening 246. As shown in FIG. 63, the roller 348 may be driven by an electric motor 349.

Of course, additional rollers and guiding surfaces may be used throughout the apparatus 210 to ensure smooth movement of the stock material 214 and document D. The illustrated embodiments are not intended to be limiting in any way.

Figure 67:
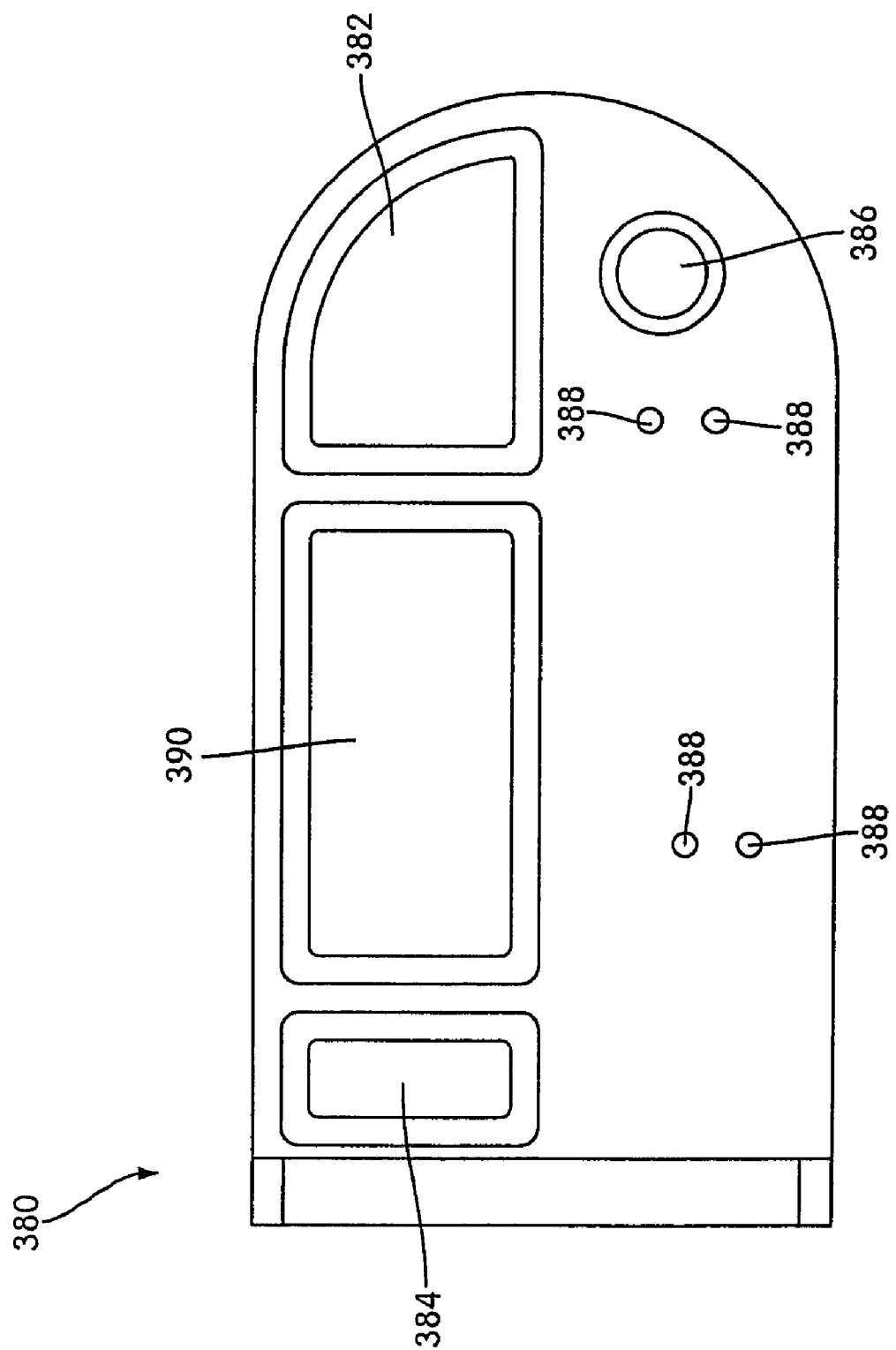
FIG. 67 is a top view of a user interface of the apparatus of FIG. 34.

As shown in FIG. 56, the apparatus 210 also includes a user interface 380 that communicates with the controller 400. As shown in FIG. 67, the user interface 380 includes a start button 382, a cancel button 384, and an eject button 386. The buttons 382, 384, 386 may have any shape and are preferably of different shapes and colors to distinguish themselves to the user. The start button 382 may also include a green LED that turns on when the apparatus 210 is ready to start processing. Engagement of the start button 382 by the user initiates a processing cycle, as described above. The cancel button 384 may also include a red LED that turns on when the apparatus 210 is operating, thereby indicating to the user that engagement of this button will interrupt the operation of the apparatus 210.

The eject button 386 may be engaged by the user when the user would like to eject the cartridge tray 260 to replace the cartridge 252. When the eject button 386 is depressed, a signal goes to the controller 400, which signals the motor to move the locking mechanism 280, thereby rotating the first piece 500 of the locking mechanism 280 and causing the clamp 278 to move into the disengaged, or unclamped position. Movement of the first piece 500 also causes the latch 282 to rotated about the shaft 284, thereby disengaging from the cartridge 252. The controller 400 also causes the latch 279 to unlatch from the base 262 of the tray 260 and the ejector 277 to push the tray 260 away from the supply receiving portion 250. The eject button 386 may also include a red LED, or an LED of a different color, that only turns on when the user presses the eject button 386, but the cartridge tray 260 is unable to eject.

In the illustrated embodiment, the user interface 380 also includes a plurality of indicators 388 that indicate to the user when there are errors in the apparatus 210. Each indicator 388 may represent an error in a different portion of the apparatus 210 and a schematic of the apparatus 210 may be provided next to the indicators 388 so the user may quickly determine the location of an error. The indicators may be LED's of, for example, amber color, that turn on only when there is an error. The user interface 380 may also include an LCD display 390 that may provide additional information to the user, such as an animation of the apparatus and/or specific directions, such as "load document" or "replace cartridge." When the apparatus 210 is first turned on and the laminator unit 224 is heating up, the LCD display 390 may provide a countdown timer that indicates to the user how much time is left before the apparatus 210 is ready to use. The LCD display 390 may also provide information on the stock material supply, roller temperature, etc. The described embodiment is not intended to be limiting in any way.

Figure 68:
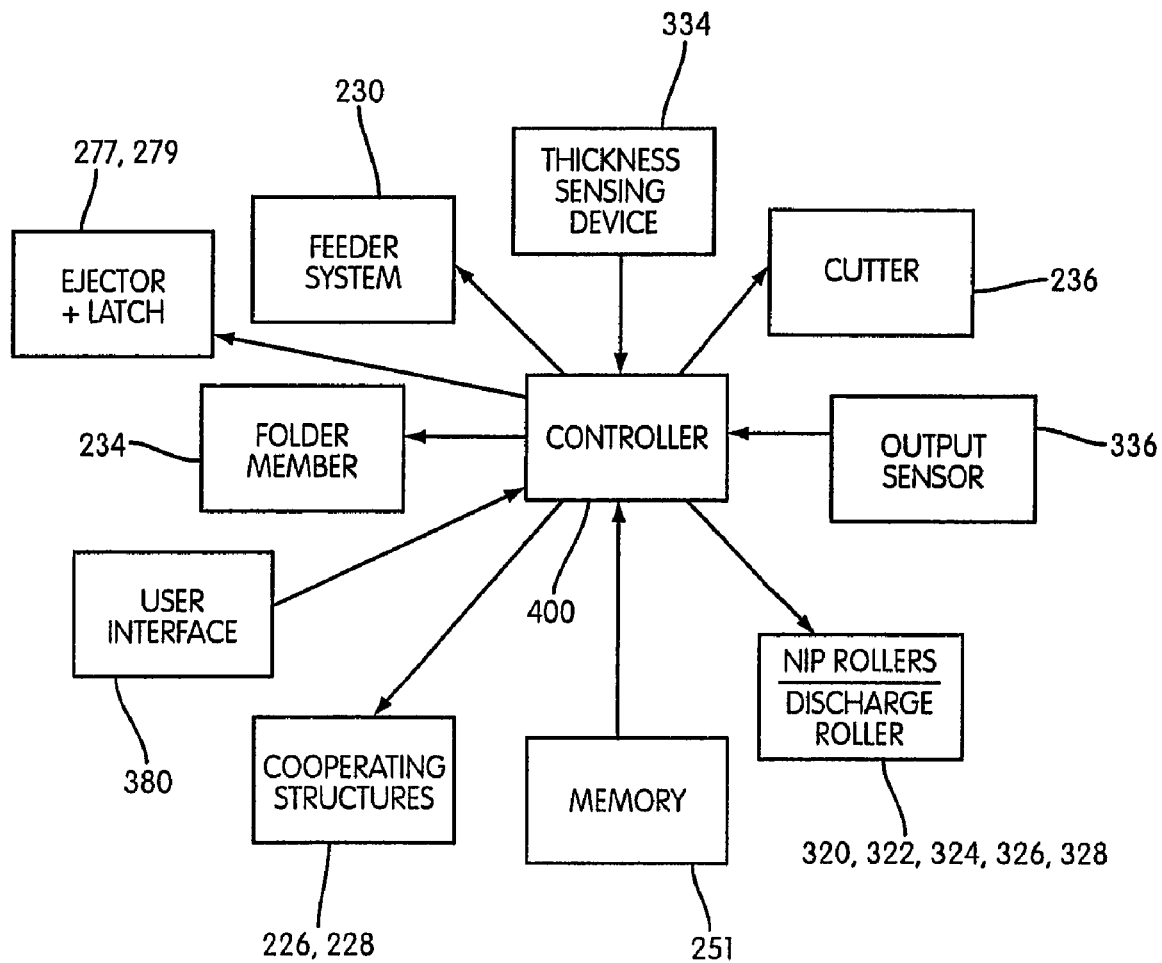
FIG. 68 is a flow chart illustrating an embodiment of the interaction between the controller and various portions of the processing apparatus shown in FIG. 34.

FIG. 68 is a flow chart that illustrates an embodiment of the interaction between the controller 400 and the various components of the apparatus 210. For example, the controller 400 may receive data from the memory 251, the thickness sensing device 334, the output sensor 336, and/or the user interface 380. Based on the received data, the controller 400 may control actuation and operation of the feeder system 230, the folder member 234, the cooperating structures 226, 228, the cutter 236, and the rollers 320, 322, 324, 326, 328. However, operation of the apparatus 210 may be controlled in any other suitable manner. The controller 400 may be a processor-based controller driven by appropriate software, or it may be entirely hardware driven. Also, the controller may be comprised of two separate controllers that each handle certain designated functions.

The memory 251 may be a machine readable/writable non-volatile memory having a data input. Thus, the memory 251 may receive data and enable this data to be read, for example, by the controller 400 for use in operating the apparatus 210. For example, the cartridge 252 may have a sensor (not shown), e.g., encoder, for monitoring the amount of stock material 214 being depleted from the supply. The sensor has a data output communicated to the data input of the memory 251 to establish communication between the sensor and the memory 251. The sensor updates the stock material data relating to the amount of stock material 214 remaining in the supply, e.g., length of stock material 214 remaining, via the communication established by the data output of the sensor and data input of the memory 251 as the amount of stock material 214 in the supply is depleted. The data input and output may be provided in any suitable manner, such as contacts that are engaged when the cartridge 252 is mounted in its operative position, or by a wireless transmission such as BLUETOOTH. The connection between the sensor and the memory 251 may be direct, or indirect, such as through the controller 400. The sensor may also monitor the amount of stock material 214 being dispensed so the controller can determine when the feeder system 230 should cease feeding.

The sensor may monitor the supply of stock material 214 in any suitable manner. For example, the sensor may be positioned adjacent the discharge portion of the cartridge 252 and monitor the exiting stock material 214. In another embodiment, the sensor may monitor motor rotation or motor resistance of the feeder system 230.

For example, the sensor may be a Hall effect sensor on one of the rollers of the feeding system 230. For each rotation of the roller, a periodic pulse may be generated by the Hall effect sensor, and for each pulse, a value in the memory 251 may be increased by one. Since each rotation of the Hall effect sensor corresponds to a specific length being unwound from the supply, the value stored in the memory 251 will correspond to the amount of material that has been unwound. This information may be used to display the amount of material left to the user via a user interface display (such as in terms of percentage or with a bar-type meter). Also, the interface can display a warning when the supply only has a certain amount left (e.g., less than three feet). Because the memory is non-volatile, the cartridge 252 can be removed, and upon replacement the stored information may again be read for the same purposes.

Operation of the apparatus 210 will now be described in greater detail. First, the cartridge 252 is mounted to the cartridge tray 260. If the cartridge 252 is of the larger size 252a, then it is mounted to the cartridge tray 260 in the manner shown in FIG. 50 (with the sidewalls 264 in the "up" position). If the cartridge 252 is of the smaller size 252b, then it is mounted to the cartridge tray 260 in the manner shown in FIG. 51 (with the sidewalls 264 in the "down" position). The cartridge tray 260 is then slid into the frame 222 to the closed position, as shown in FIG. 52. Also, the sensor that senses the presence of the cartridge 252 in the operative position (i.e., the cartridge tray 260 is in the closed position) signals the controller 400. The controller 400 then signals the motor that drives the locking mechanism 280, so that the clamp 278 may be moved into it clamping position, as shown in FIG. 53. The locking mechanism 280 also moves the latch 282 into position so that communication is established between the memory 251 and the data input 285 for enabling the stock material data to be transmitted to the controller 400 for use by the controller 400.

The controller 400 may perform one or more operations based on the stock material data received from the memory 251 via the input device 285. For example, the controller 400 may activate the laminator unit 224 to preheat the nip rollers 320, 322, 324, 326 to an operating temperature and to set the rotating speed of the nip rollers 320, 322, 324, 326. The speed and temperature may be based on the characteristics of the stock material 214, e.g., thickness of the stock material, which are stored in the memory 251.

Then, a selected length of the stock material 214 is fed by the feeder system 230 from the supply in the feeding direction F so that the intermediate portion 290 of the selected length of stock material 214 is positioned adjacent the cooperating structures 226, 228, as shown in FIG. 57. The operation of the feeder system 230 is controlled by the controller 400 to feed the selected length of stock material 214. The selected length of the stock material 214 may be determined from the memory 251 of the cartridge 252. The leading portion 286 of the selected length passes beyond the pair of cooperating structures 226, 228 and is received in the reservoir 232 in a compact configuration, as shown in FIG. 57. The fence 310 prevents the leading portion 286 from being grabbed by the cooperating structures 226, 228. The feeder system 230 ceases feeding stock material 214 when half of the selected length is past the cooperating structures 226, 228 and half of the selected length precedes the cooperating structures 226, 228. The half of the selected length past the cooperating structures 226, 228 constitutes the leading portion 286, and the half of the selected length preceding the cooperating structures 226, 228 constitutes the trailing portion 288.

As shown in FIG. 58, the folder member 234 is actuated by the apparatus controller 400 to move to the engaged position to form the fold in the intermediate portion 290 and to urge the folded intermediate portion 290 in between the cooperating structures 226, 228. The folder member 234 is actuated when the selected length of stock material 214 has been fed by the feeder system 230. Either during the forming of the fold in the intermediate portion 290, or shortly thereafter, as shown in FIGS. 58 and 59, a document D is advanced from the feed tray 238, through the document guide 240, over the folder member 234 into the folded intermediate portion 290 of the stock material 214, and through the cooperating structures 226, 228. The adhesive of the stock material 214 faces generally away from the cooperating structures 226, 228 so that the document D adheres thereto.

Figure 60:
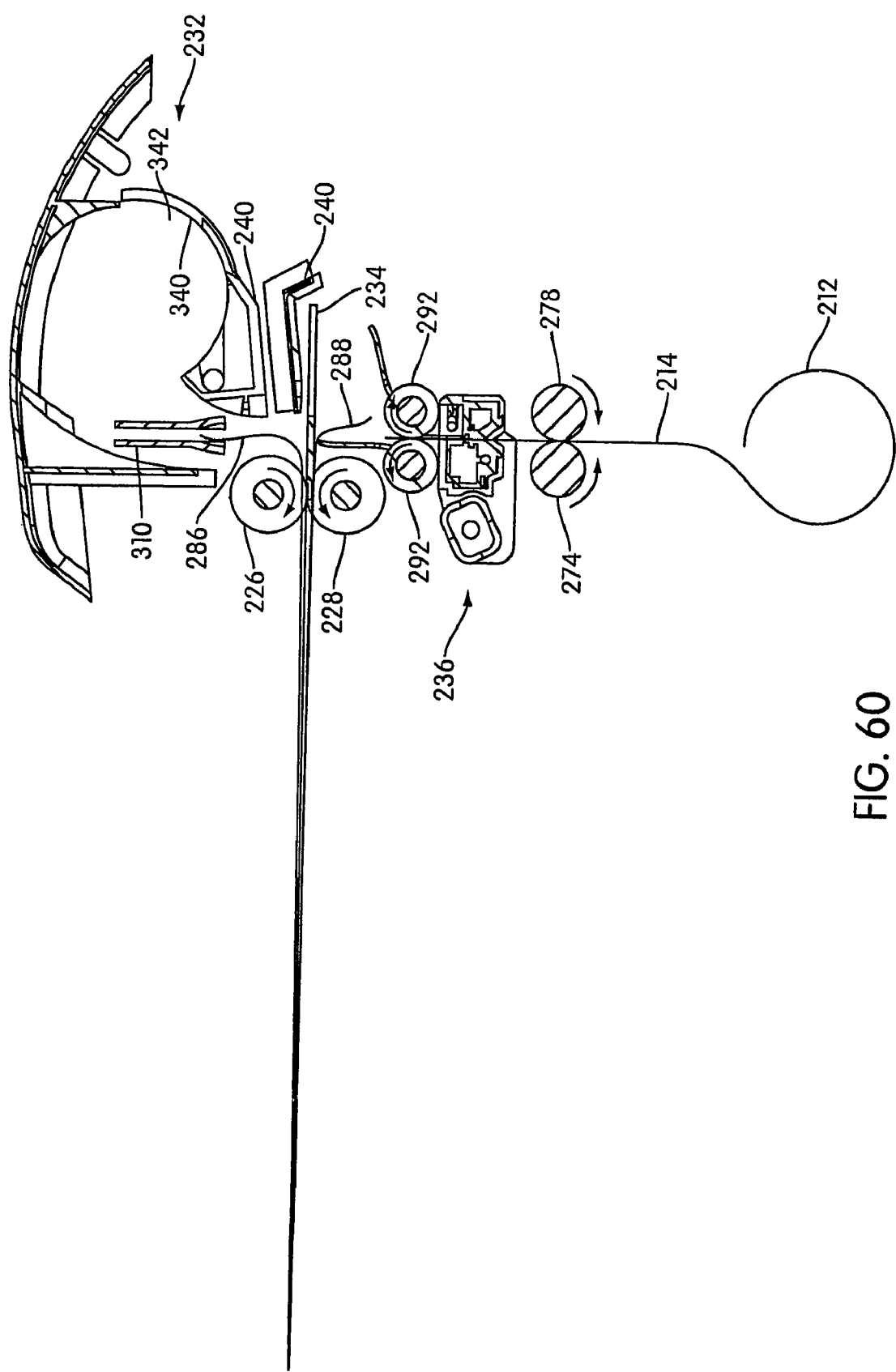

As shown in FIGS. 59 and 60, the pair of cooperating structures 226, 228 are actuated to feed the document D into the laminator unit 224 with the leading and trailing portions 286, 288 of the selected length of stock material 214 on opposing sides of the document D. The document D and leading and trailing portions 286, 288 of the selected length are advanced through the nip rollers 320, 322, 324, 326 of the laminator unit 224 which activates the adhesive, thereby bonding the leading and trailing portions 286, 288 to the opposing sides of the document D. The cutter 236 is actuated by the apparatus controller 400 to cut the selected length from the remainder of the stock material 214, as shown in FIG. 60. Specifically, the apparatus controller 400 determines the selected length of the stock material 214 from the memory 251 of the cartridge 252, and the controller 400 actuates the cutter 236 to cut the trailing portion 288 of the stock material 214 at the appropriate length. The final laminated document D passes through the discharge opening 248 and the discharge tray 242 supports the final laminated document D in a substantially flat condition.

It should be noted that the stock material 214 may be fed longer than needed past the cooperating structures 226, 228, cut by the cutter 236, and then the stock material 214 could be advanced in a direction opposite the feeding direction F until the intermediate portion of the stock material 214 is aligned with the cooperating structures 226, 228. Also, the stock material 214 could be cut at the selected length even after some of the film is being advanced into the laminator unit 224 by the cooperating structures 226, 228. In the embodiment illustrated in FIGS. 57-60, the feeding system 230 is controlled to feed slack 289 (see FIG. 59) into the trailing portion 288 of the stock material 214. This allows the document D to be fed to the lamination unit 224 even before the stock material is cut. Specifically, once the leading portion 286 has been fed past the cooperating structures 226, 228, the speed of rotation of the feeding system 230 may be increased.

When the cartridge 252 needs to be replaced, either because the feed roll 212 has been depleted, or because the user would like to use a stock material 212 of a different width, the user may engage the eject button 386 on the user interface 380. This signals the motor that drives the locking mechanism 280 to initiate movement of the locking mechanism 280 in a reversed direction, which causes the clamp 278 and the latch 282 to move away from the cartridge 252 and out of the way. Once the clamp 278 has been moved out of the way, the user interface 380 may provide a visual or audible signal to the user to indicate the cartridge tray 260 may be moved to the open position so that the cartridge 252 may be accessed.

The interaction between the user and the apparatus 210 during a laminating operation are reflected in FIGS. 29-31. Also, FIG. 32 is a flow chart that illustrates an embodiment of the interaction between the user and the apparatus 210 during an error sequence.

The foregoing embodiments have been provided to illustrate the structural and functional principles of the present invention, and are not intended to be limiting. To the contrary, the present invention is intended to encompass all modifications, alterations and substitutions within the spirit and scope of the appended claims.

Except where expressly limited in the claims, any aspects of the application may be used with either style of supply roll systems or multiple supply roll systems. Likewise, unless expressly limited in the claims, such aspects may also be used with systems or apparatus other than laminating apparatus.

What is claimed is:

1. A laminator system for laminating opposing sides of a document, comprising:
   a frame;

a laminator unit provided on the frame;

a pair of cooperating structures operable to feed substrates into the laminator unit;

a supply of stock material provided on the frame, the stock material having adhesive provided on an adhesive carrying surface thereof;

a feeder system operable to feed a selected length of the stock material from the supply in a feeding direction so that a leading portion of the selected length passes beyond the pair of cooperating structures and a trailing portion of the selected length extends from the pair of cooperating structures towards the supply with an intermediate portion of the selected length between the leading and trailing portions positioned adjacent the cooperating structures, the supply of stock material being oriented such that the adhesive carrying surface at the intermediate portion faces generally away from the cooperating structures;

the pair of cooperating structures being oriented transversely with respect to the feeding direction to receive the intermediate portion of the selected length in a transversely folded relation;

a document guide constructed to guide the document to the pair of cooperating structures, thereby enabling a lead end of the document to be received in the folded intermediate portion so that the cooperating structures can feed the document with the leading and trailing portions of the selected length on opposing sides thereof into the laminator unit; and a cutter positioned between the supply and the pair of cooperating structures in the feeding direction, the cutter being operable to cut the stock material transversely with respect to the feeding direction to cut the selected length of the stock material from a remainder of the stock material;

the laminator unit being operable to activate the adhesive as the document and the leading and trailing portions of the selected length of the stock material are advanced therethrough, thereby bonding the leading and trailing portions to the opposing sides of the document; and a generally upwardly facing feed tray for receiving the document, the tray being provided vertically above the laminator unit and the pair of cooperating structures;

the document guide having an arcuate configuration and including a document receiving end and a document discharging end, the document receiving end being positioned adjacent the feed tray for enabling the document to be advanced from the feed tray into the document guide, the document discharging end being lower than the document receiving end and generally aligned with the pair of cooperating structures to discharge the document to the pair of cooperating structures, the arcuate configuration of the document guide routing the document therethrough in a direction generally away from the pair of cooperating structures past the leading portion of the selected length and then back towards the pair of cooperating structures via the document discharging end.

2. A laminator system according to claim 1, wherein said feed tray is movable between (a) a first position wherein the feed tray is positioned adjacent the document receiving end of the document guide for enabling the document to be advanced from the feed tray into the document guide as aforesaid for enabling the document guide to route the document by its arcuate configuration in the direction generally away from the pair of cooperating structures past the leading portion of the selected length and then back towards the pair of cooperating structures via the document discharging end, and (b) a second position wherein the feed tray is generally aligned with the pair of cooperating structures for enabling the document to be advanced directly from the feed tray to the pair of cooperating structures.

3. A laminator system according to claim 1, further comprising a folder member movable between (a) a disengaged position enabling the stock material to pass beyond the pair of cooperating structures in the feeding direction, and (b) an engaged position urging the intermediate portion in between the cooperating structures in the transversely folded relation, thereby enabling a lead end of the document to be received in the folded intermediate portion so that the cooperating structures can feed the document with the leading and trailing portions of the selected length on opposing sides thereof into the laminator unit.

4. A laminator system according to claim 3, wherein the folder member is a roller.

5. A laminator system according to claim 3, wherein the folder member is a plate-like structure.

6. A method for laminating a document, comprising:

providing a laminator system comprising (i) a frame;

(ii) a laminator unit provided on the frame;

(iii) a supply of stock material provided on the frame, the stock material having adhesive provided on an adhesive carrying surface thereof;

(iv) a feeder system operable to feed the stock material from the supply in a feeding direction;

(v) a pair of cooperating structures operable to feed substrates into the laminator unit, the pair of cooperating structure being oriented transversely with respect to the feeding direction;

(vi) a cutter positioned between the supply and the pair of cooperating structures in the feeding direction;

(vii) a generally upwardly facing feed tray provided vertically above the laminator unit and the pair of cooperating structures;

(viii) a document guide constructed to guide a document to be laminated to the pair of cooperating structures, the document guide having an arcuate configuration and including a document receiving end and a document discharging end, the document receiving end being positioned adjacent the feed tray, the document discharging end being lower than the document receiving end and generally aligned with the pair of cooperating structures;

feeding the stock material with the feeder system from the supply in the feeding direction so that a leading portion of the selected length passes beyond the pair of cooperating structures and a trailing portion of the selected length extends from the pair of cooperating structures towards the supply with an intermediate portion of the selected length between the leading and trailing portions positioned adjacent the cooperating structures, the supply of stock material being oriented such that the adhesive carrying surface at the intermediate portion faces generally away from the cooperating structures;

urging the intermediate portion of the selected length in between the pair of cooperating structures in a transversely folded relation;

advancing the document from the feed tray into the document receiving end of the document guide, through the document guide and out from the discharge end of the document guide to the pair of cooperating structures and into the folded intermediate portion of the selected length, wherein the arcuate configuration of the document guide routes the document by its arcuate configuration in a direction generally away from the pair of cooperating structures past the leading portion of the selected length and then back towards the pair of cooperating structures via the document discharging end;

feeding the document using the pair of cooperating structures with the leading and trailing portions of the selected length on opposing sides thereof into the laminator unit;

cutting the stock material with the cutter transversely with respect to the feeding direction to cut the selected length from the remainder of the stock material; and advancing the document and the leading and trailing portions of the selected length through the laminator unit and activating the adhesive with the laminator unit, thereby bonding the leading and trailing portions to the opposing sides of the document.

7. A method according to claim 6, wherein the cutting and the advancing are performed simultaneously while there is slack in the trailing portion.

8. A method according to claim 6, wherein the laminator system further comprises a folder member and said urging the intermediate portion of the selected length comprises moving the folder member towards the pair of cooperating structures.

9. A laminator for laminating opposing sides of a document in conjunction with a supply of stock material having adhesive provided on an adhesive carrying surface thereof, the laminator comprising:

a frame having a supply receiving portion constructed to receive the supply in an operative position;

a laminator unit provided on the frame;

a pair of cooperating structures operable to feed substrates into the laminator unit;

a feeder system operable to feed a selected length of the stock material from the supply in a feeding direction so that a leading portion of the selected length passes beyond the pair of cooperating structures and a trailing portion of the selected length extends from the pair of cooperating structures towards the supply with an intermediate portion of the selected length between the leading and trailing portions positioned adjacent the cooperating structures, the supply of stock material being oriented such that the adhesive carrying surface at the intermediate portion faces generally away from the cooperating structures;

the pair of cooperating structures being oriented transversely with respect to the feeding direction to receive the intermediate portion of the selected length in a transversely folded relation;

a document guide constructed to guide the document to the pair of cooperating structures, thereby enabling a lead end of the document to be received in the folded intermediate portion so that the cooperating structures can feed the document with the leading and trailing portions of the selected length on opposing sides thereof into the laminator unit; and a cutter positioned between the supply and the pair of cooperating structures in the feeding direction, the cutter being operable to cut the stock material transversely with respect to the feeding direction to cut the selected length of the stock material from a remainder of the stock material;

the laminator unit being operable to activate the adhesive as the document and the leading and trailing portions of the selected length of the stock material are advanced therethrough, thereby bonding the leading and trailing portions to the opposing sides of the document; and a generally upwardly facing feed tray for receiving the document, the tray being provided vertically above the laminator unit and the pair of cooperating structures;

the document guide having an arcuate configuration and including a document receiving end and a document discharging end, the document receiving end being positioned adjacent the feed tray for enabling the document to be advanced from the feed tray into the document guide, the document discharging end being lower than the document receiving end and generally aligned with the pair of cooperating structures to discharge the document to the pair of cooperating structures, the arcuate configuration of the document guide routing the document therethrough in a direction generally away from the pair of cooperating structures past the leading portion of the selected length and then back towards the pair of cooperating structures via the document discharging end.

10. A laminator system according to claim 9, further comprising a folder member movable between (a) a disengaged position enabling the stock material to pass beyond the pair of cooperating structures in the feeding direction, and (b) an engaged position urging the intermediate portion in between the cooperating structures in the transversely folded relation, thereby enabling a lead end of the document to be received in the folded intermediate portion so that the cooperating structures can feed the document with the leading and trailing portions of the selected length on opposing sides thereof into the laminator unit.

11. A laminator system according to claim 10, wherein the folder member is a roller.

12. A laminator system according to claim 10, wherein the folder member is a plate-like structure.

13. A laminator system for laminating opposing sides of a document, comprising:

a frame;

a laminator unit provided on the frame;

a pair of cooperating structures operable to feed substrates into the laminator unit;

a supply of stock material provided on the frame, the stock material having adhesive provided on an adhesive carrying surface thereof;

a feeder system operable to feed a selected length of the stock material from the supply in a feeding direction so that a leading portion of the selected length passes beyond the pair of cooperating structures and a trailing portion of the selected length extends from the pair of cooperating structures towards the supply with an intermediate portion of the selected length between the leading and trailing portions positioned adjacent the cooperating structures, the supply of stock material being oriented such that the adhesive carrying surface at the intermediate portion faces generally away from the cooperating structures;

a reservoir provided beyond the pair of cooperating structures in the feeding direction, the reservoir being configured to receive the leading portion of the selected length fed beyond the pair of cooperating structures in a compacted configuration;

the pair of cooperating structures being oriented transversely with respect to the feeding direction to receive the intermediate portion of the selected length in a transversely folded relation; and a cutter positioned between the supply and the pair of cooperating structures in the feeding direction, the cutter being operable to cut the stock material transversely with respect to the feeding direction to cut the selected length of the stock material from a remainder of the stock material;

the laminator unit being operable to activate the adhesive as the document and the leading and trailing portions of the selected length of the stock material are advanced therethrough, thereby bonding the leading and trailing portions to the opposing sides of the document.

14. A laminator system according to claim 13, further comprising:

a document guide constructed to guide the document to the pair of cooperating structures, thereby enabling a lead end of the document to be received in the folded intermediate portion so that the cooperating structures can feed the document with the leading and trailing portions of the selected length on opposing sides thereof into the laminator unit;

a generally upwardly facing feed tray for receiving the document, the tray being provided vertically above the laminator unit and the pair of cooperating structures;

the document guide having an arcuate configuration and including a document receiving end and a document discharging end, the document receiving end being positioned adjacent the feed tray for enabling the document to be advanced from the feed tray into the document guide, the document discharging end being lower than the document receiving end and generally aligned with the pair of cooperating structures to discharge the document to the pair of cooperating structures, the arcuate configuration of the document guide routing the document therethrough in a direction generally away from the pair of cooperating structures past the leading portion of the selected length and then back towards the pair of cooperating structures via the document discharging end;

the document guide having a surface defining a portion of the reservoir.

15. A laminator system according to claim 13, further comprising a folder member movable between (a) a disengaged position enabling the stock material to pass beyond the pair of cooperating structures in the feeding direction, and (b) an engaged position urging the intermediate portion in between the cooperating structures in the transversely folded relation, thereby enabling a lead end of the document to be received in the folded intermediate portion so that the cooperating structures can feed the document with the leading and trailing portions of the selected length on opposing sides thereof into the laminator unit.

16. A laminator system according to claim 15, wherein the folder member is a roller.

17. A laminator system according to claim 15, wherein the folder member is a plate-like structure.

18. A method for laminating a document, comprising:
providing a laminator system comprising:
(i) a frame;
(ii) a laminator unit provided on the frame;
(iii) a supply of stock material provided on the frame, the stock material having adhesive provided on an adhesive carrying surface thereof;
(iv) a feeder system operable to feed the stock material from the supply in a feeding direction;
(v) a pair of cooperating structures operable to feed substrates into the laminator unit, the pair of cooperating structure being oriented transversely with respect to the feeding direction;
(vi) a reservoir provided beyond the pair of cooperating structures in the feeding direction;
(vii) a cutter positioned between the supply and the pair of cooperating structures in the feeding direction;

feeding the stock material with the feeder system from the supply in the feeding direction so that (a) a leading portion of the selected length passes beyond the pair of cooperating structures and is received in the reservoir in a compact configuration and (b) a trailing portion of the selected length extends from the pair of cooperating structures towards the supply with an intermediate portion of the selected length between the leading and trailing portions positioned adjacent the cooperating structures, the supply of stock material being oriented such that the adhesive carrying surface at the intermediate portion faces generally away from the cooperating structures;

urging the intermediate portion of the selected length in between the pair of cooperating structures in a transversely folded relation;

positioning a lead end of the document into the folded intermediate portion;

feeding the document using the pair of cooperating structures with the leading and trailing portions of the selected length on opposing sides thereof into the laminator unit;

cutting the stock material with the cutter transversely with respect to the feeding direction to cut the selected length from the remainder of the stock material; and advancing the document and the leading and trailing portions of the selected length through the laminator unit and activating the adhesive with the laminator unit, thereby bonding the leading and trailing portions to the opposing sides of the document.

19. A method according to claim 18, wherein the cutting and the advancing are performed simultaneously while there is slack in the trailing portion.

20. A method according to claim 18, wherein the laminator system further comprises a folder member and said urging the intermediate portion of the selected length comprises moving the folder member towards the pair of cooperating structures.

21. A laminator for laminating opposing sides of a document in conjunction with a supply of stock material having adhesive provided on an adhesive carrying surface thereof, the laminator comprising:

a frame having a supply receiving portion constructed to receive the supply in an operative position;

a laminator unit provided on the frame;

a pair of cooperating structures operable to feed substrates into the laminator unit;

a feeder system operable, when the supply is in its operative position, to feed a selected length of the stock material from the supply in a feeding direction so that a leading portion of the selected length passes beyond the pair of cooperating structures and a trailing portion of the selected length extends from the pair of cooperating structures towards the supply with an intermediate portion of the selected length between the leading and trailing portions positioned adjacent the cooperating structures, the supply of stock material being oriented such that the adhesive carrying surface at the intermediate portion faces generally away from the cooperating structures;

a reservoir provided beyond the pair of cooperating structures in the feeding direction, the reservoir being configured to receive the leading portion of the selected length fed beyond the pair of cooperating structures in a compacted configuration;

the pair of cooperating structures being oriented transversely with respect to the feeding direction to receive the intermediate portion of the selected length in a transversely folded relation; and a cutter positioned between the supply and the pair of cooperating structures in the feeding direction, the cutter being operable to cut the stock material transversely with respect to the feeding direction to cut the selected length of the stock material from a remainder of the stock material;

the laminator unit being operable to activate the adhesive as the document and the leading and trailing portions of the selected length of the stock material are advanced therethrough, thereby bonding the leading and trailing portions to the opposing sides of the document.

22. A laminator system for laminating opposing sides of a document, comprising:

a frame;

a laminator unit provided on the frame;

a pair of cooperating structures operable to feed substrates into the laminator unit;

a cartridge tray movably received by the frame, the cartridge tray being movable between an open position and a closed position;

a cartridge comprising a cartridge body and a supply of stock material having adhesive provided on an adhesive carrying surface thereof;

the cartridge tray being configured to receive the cartridge when the cartridge tray is in the open position, and position the cartridge into an operative position when the cartridge tray is in the closed position;

a feeder system operable to feed a selected length of the stock material from the cartridge in its operative position in a feeding direction so that a leading portion of the selected length passes beyond the pair of cooperating structures and a trailing portion of the selected length extends from the pair of cooperating structures towards the cartridge with an intermediate portion of the selected length between the leading and trailing portions positioned adjacent the cooperating structures, the stock material being oriented such that the adhesive carrying surface at the intermediate portion faces generally away from the cooperating structures;

the pair of cooperating structures being oriented transversely with respect to the feeding direction to receive the intermediate portion of the selected length in a transversely folded relation and to receive a lead end of the document in the folded intermediate portion so that the cooperating structures can feed the document with the leading and trailing portions of the selected length on opposing sides thereof into the laminator unit; and a cutter positioned between the cartridge and the pair of cooperating structures in the feeding direction, the cutter being operable to cut the stock material transversely with respect to the feeding direction to cut the selected length of the stock material from a remainder of the stock material.

23. A laminator system according to claim 22, wherein the cartridge tray is configured to receive at least two sizes of cartridges such that the cartridges are substantially centered in the cartridge tray with respect to the feeding direction.

24. A laminator system according to claim 23, wherein the cartridge tray comprises a base, and a pair of sidewalls on opposite sides of the base, at least a portion of the sidewalls being movable between a first position and a second position, such that (1) when the sidewalls are in the first position, a cartridge of a first size is substantially centered in the cartridge tray by the sidewalls, and (2) when the sidewalls are in the second position, a cartridge of a second size that is different from the first size is substantially centered in the cartridge tray by the side walls.

25. A laminator system according to claim 24, wherein the cartridge of the second size is wider than the cartridge of the first size, wherein in the first position the sidewalls extend toward one another for receiving the cartridge of the first size therebetween, and wherein in the second position the sidewalls are raised so as to be generally parallel to one another for receiving the cartridge of the second size therebetween.

26. A laminator system according to claim 25, wherein a top of each sidewall comprises a notch configured to receive a portion of the cartridge of the first size when the sidewalls are in the first position, thereby substantially centering the cartridge of the first size in the cartridge tray.

27. A processing apparatus for laminating opposing sides of a document with a supply of stock material having adhesive provided on an adhesive carrying surface thereof, the supply of stock material being carried by a cartridge, the apparatus comprising:

a frame;

a laminator unit provided on the frame;

a pair of cooperating structures operable to feed substrates into the laminator unit;

a cartridge tray movably received by the frame, the cartridge tray being movable between an open position and a closed position, the cartridge tray being configured to receive the cartridge when the cartridge tray is in the open position, and position the cartridge into an operative position when the cartridge tray is in the closed position;

a feeder system operable to feed a selected length of the stock material from the cartridge in its operative position in a feeding direction so that a leading portion of the selected length passes beyond the pair of cooperating structures and a trailing portion of the selected length extends from the pair of cooperating structures towards the cartridge with an intermediate portion of the selected length between the leading and trailing portions positioned adjacent the cooperating structures, the stock material being oriented such that the adhesive carrying surface at the intermediate portion faces generally away from the cooperating structures;

the pair of cooperating structures being oriented transversely with respect to the feeding direction to receive the intermediate portion of the selected length in a transversely folded relation and to receive a lead end of the document in the folded intermediate portion so that the cooperating structures can feed the document with the leading and trailing portions of the selected length on opposing sides thereof into the laminator unit; and a cutter positioned between the cartridge tray and the pair of cooperating structures in the feeding direction, the cutter being operable to cut the stock material transversely with respect to the feeding direction to cut the selected length of the stock material from a remainder of the stock material.

28. A processing apparatus according to claim 27, wherein the cartridge tray is configured to receive at least two sizes of cartridges such that the cartridges are substantially centered in the cartridge tray with respect to the feeding direction.

29. A processing apparatus according to claim 28, wherein the cartridge tray comprises a base, and a pair of sidewalls on opposite sides of the base, at least a portion of the sidewalls being movable between a first position and a second position, such that (1) when the sidewalls are in the first position, a cartridge of a first size is substantially centered in the cartridge tray by the sidewalls, and (2) when the sidewalls are in the second position, a cartridge of a second size that is different from the first size is substantially centered in the cartridge tray by the side walls.

30. A processing apparatus according to claim 29, wherein the cartridge of the second size is wider than the cartridge of the first size, wherein in the first position the sidewalls extend toward one another for receiving the cartridge of the first size therebetween, and wherein in the second position the sidewalls are raised so as to be generally parallel to one another for receiving the cartridge of the second size therebetween.

31. A processing apparatus according to claim 30, wherein a top of each sidewall comprises a notch configured to receive a portion of the cartridge of the first size when the sidewalls are in the first position, thereby substantially centering the cartridge of the first size in the cartridge tray.

32. A processing apparatus according to claim 27, wherein the cartridge tray is configured to receive at least two sizes of cartridges such that the supply of stock material of each cartridge is substantially centered relative to the pair of cooperating structures so that the document is centered relative to the selected length of the stock material in a direction transverse to the feeding direction when the document is received by the pair of cooperating structures.

33. A processing apparatus for laminating opposing sides of a document with a supply of stock material having adhesive provided on an adhesive carrying surface thereof, the apparatus comprising:
 a frame;
 a laminator unit provided on the frame;
 a pair of cooperating structures operable to feed substrates into the laminator unit;
 a feeder system operable to feed a selected length of the stock material in a feeding direction so that a leading portion of the selected length passes beyond the pair of cooperating structures and a trailing portion of the selected length extends from the pair of cooperating structures towards the cartridge with an intermediate portion of the selected length between the leading and trailing portions positioned adjacent the cooperating structures, the stock material being oriented such that the adhesive carrying surface at the intermediate portion faces generally away from the cooperating structures;
 the pair of cooperating structures being oriented transversely with respect to the feeding direction to receive the intermediate portion of the selected length in a transversely folded relation and to receive a lead end of the document in the folded intermediate portion so that the cooperating structures can feed the document with the leading and trailing portions of the selected length on opposing sides thereof into the laminator unit;
 a cutter positioned between the supply and the pair of cooperating structures in the feeding direction, the cutter being operable to cut the stock material transversely with respect to the feeding direction to cut the selected length of the stock material from a remainder of the stock material; and
 a clamp located on the frame, the clamp being movable between an engaging position and a non-engaging position,
 wherein when the clamp is in the engaging position, the clamp nip engages a lead end portion of the supply.

34. A processing apparatus according to claim 33, wherein the clamp moves between the engaging and non-engaging positions along an arcuate path.

35. A processing apparatus according to claim 33, wherein the clamp comprises a nip.

36. A laminator system for laminating opposing sides of a document, comprising:
 a frame;
 a laminator unit provided on the frame;
 a pair of cooperating structures operable to feed substrates into the laminator unit;
 a supply of stock material provided on the frame, the stock material having adhesive provided on an adhesive carrying surface thereof;
 a feeder system operable to feed a selected length of the stock material from the supply in a feeding direction so that a leading portion of the selected length passes beyond the pair of cooperating structures and a trailing portion of the selected length extends from the pair of cooperating structures towards the supply with an intermediate portion of the selected length between the leading and trailing portions positioned adjacent the cooperating structures, the supply of stock material being oriented such that the adhesive carrying surface at the intermediate portion faces generally away from the cooperating structures, the pair of cooperating structures being oriented transversely with respect to the feeding direction;
 a folder member being movable between (a) a disengaged position enabling the stock material to pass beyond the pair of cooperating structures in the feeding direction, and (b) an engaged position urging the intermediate portion in between the cooperating structures in a transversely folded relation, thereby enabling a lead end of the document to be received in the folded intermediate portion so that the cooperating structures can feed the document with the leading and trailing portions of the selected length on opposing sides thereof into the laminator unit;
 a fence positioned between the folder member and the cooperating structures, the fence being movable between (a) a blocking position preventing the stock material from being engaged by the cooperating structures, and (b) a retracted position enabling the stock material to be engaged by the cooperating structures; and
 a cutter positioned between the supply and the pair of cooperating structures in the feeding direction, the cutter being operable to cut the stock material transversely with respect to the feeding direction to cut the selected length of the stock material from a remainder of the stock material;
 the laminator unit being operable to activate the adhesive as the document and the leading and trailing portions of the selected length of the stock material are advanced therethrough, thereby bonding the leading and trailing portions to the opposing sides of the document.

37. A laminator system according to claim 36, wherein the folder member and the fence are operatively connected to each other such that (1) when the folder member is in the disengaged position, the fence is in the closed position, and (2) when the folder member is in the engaged position, the fence is in the open position.

38. A laminator system according to claim 37, wherein the folder member and the fence are operatively connected to each other with a plurality of gears.

39. A laminator system according, to claim 36, wherein the folder member moves substantially linearly between the disengaged position and the engaged position.

40. A processing apparatus for laminating opposing sides of a document with a supply of stock material, the stock material having adhesive provided on an adhesive carrying surface thereof, the apparatus comprising:

a frame;

a laminator unit provided on the frame;

a pair of cooperating structures operable to feed substrates into the laminator unit;

a feeder system operable to feed a selected length of the stock material from the supply in a feeding direction so that a leading portion of the selected length passes beyond the pair of cooperating structures and a trailing portion of the selected length extends from the pair of cooperating structures towards the supply with an intermediate portion of the selected length between the leading and trailing portions positioned adjacent the cooperating structures, the supply of stock material being oriented such that the adhesive carrying surface at the intermediate portion faces generally away from the cooperating structures, the pair of cooperating structures being oriented transversely with respect to the feeding direction,;

a folder member being movable between (a) a disengaged position enabling the stock material to pass beyond the pair of cooperating structures in the feeding direction, and (b) an engaged position urging the intermediate portion in between the cooperating structures in a transversely folded relation, thereby enabling a lead end of the document to be received in the folded intermediate portion so that the cooperating structures can feed the document with the leading and trailing portions of the selected length on opposing sides thereof into the laminator unit;

a fence positioned between the folder member and the cooperating structures, the fence being movable between (a) a blocking position preventing the stock material from being engaged by the cooperating structures, and (b) a retracted position enabling the stock material to be engaged by the cooperating structures; and a cutter positioned between the supply and the pair of cooperating structures in the feeding direction, the cutter being operable to cut the stock material transversely with respect to the feeding direction to cut the selected length of the stock material from a remainder of the stock material;

the laminator unit being operable to activate the adhesive as the document and the leading and trailing portions of the selected length of the stock material are advanced therethrough, thereby bonding the leading and trailing portions to the opposing sides of the document.

41. A laminator system according to claim 40, wherein the folder member and the fence are operatively connected to each other such that (1) when the folder member is in the disengaged position, the fence is in the closed position, and (2) when the folder member is in the engaged position, the fence is in the open position.

42. A laminator system according to claim 41, wherein the folder member and the fence are operatively connected to each other with a plurality of gears.

43. A method for laminating a document, comprising:
providing a laminator system comprising
(i) a frame;
(ii) a laminator unit provided on the frame;
(iii) a pair of cooperating structures operable to feed substrates into the laminator unit;
(iv) a supply of stock material provided on the frame, the stock material having adhesive provided on an adhesive carrying surface thereof;
(v) a feeder system operable to feed the stock material from the supply in a feeding direction; and
(vi) a cutter positioned between the supply and the pair of cooperating structures in the feeding direction;

feeding a selected length of the stock material with the feeder system from the supply in the feeding direction so that a leading portion of the selected length passes beyond the pair of cooperating structures and a trailing portion of the selected length extends from the pair of cooperating structures towards the supply with an intermediate portion of the selected length between the leading and trailing portions positioned adjacent the cooperating structures, the supply of stock material being oriented such that the adhesive carrying surface at the intermediate portion faces generally away from the cooperating structures;

positioning a lead end of the document into the intermediate portion;

feeding the document using the pair of cooperating structures with the leading and trailing portions of the selected length on opposing sides thereof into the laminator unit;

feeding a remaining part of the trailing portion at a rate faster than said feeding the selected length of the stock material to create slack in the trailing portion;

cutting the trailing portion of the stock material with the cutter transversely with respect to the feeding direction to cut the selected length from the supply of the stock material; and advancing the document and the leading and trailing portions of the selected length through the laminator unit and activating the adhesive with the laminator unit, thereby bonding the leading and trailing portions to the opposing sides of the document;

wherein the cutting and advancing are performed simultaneously while there is slack in the trailing portion.

44. A method according to claim 43, further comprising sensing another document for lamination, and feeding another selected length of stock material with the feeder system.

* * * * *